United States Patent [19]
Scott et al.

[11] Patent Number: 5,625,276
[45] Date of Patent: Apr. 29, 1997

[54] CONTROLLER FOR PERMANENT MAGNET GENERATOR

[75] Inventors: Harold C. Scott; William Anderson, both of Alamogordo, N.M.

[73] Assignee: Coleman Powermate, Inc., Kearney, Nebr.

[21] Appl. No.: 370,577

[22] Filed: Jan. 9, 1995

Related U.S. Application Data

[63] Continuation-in-part of Ser. No. 322,012, Oct. 11, 1994, abandoned, and Ser. No. 306,120, Sep. 14, 1994.

[51] Int. Cl.$^6$ .................................................. H02P 9/00
[52] U.S. Cl. ................................ 322/24; 322/90; 322/1; 310/156; 310/114; 310/179
[58] Field of Search ............................ 322/1, 24, 28, 322/47, 90; 310/114, 156, 179

[56] References Cited

U.S. PATENT DOCUMENTS

| | | | |
|---|---|---|---|
| 3,340,448 | 9/1967 | Thiessen. | |
| 4,163,187 | 7/1979 | Thomas | 322/29 |
| 4,217,538 | 8/1980 | Ziemacki | 322/29 |
| 4,239,978 | 12/1980 | Kofink | 307/16 |
| 4,379,990 | 4/1983 | Sievers et al. | 322/99 |
| 4,625,160 | 11/1986 | Hucker | 322/32 |
| 4,654,577 | 3/1987 | Howard | 322/28 |
| 4,728,841 | 3/1988 | Sugden | 310/114 |
| 4,766,362 | 8/1988 | Sedvary | 322/50 |
| 4,780,659 | 10/1988 | Bansal et al. | 322/58 |
| 4,782,257 | 11/1988 | Secher et al. | 310/114 |
| 4,788,486 | 11/1988 | Mashino et al. | 320/17 |
| 4,827,393 | 5/1989 | Clark | 363/79 |
| 4,882,513 | 11/1989 | Flygare et al. | 310/114 |
| 4,885,493 | 12/1989 | Gokhale | 310/190 |
| 4,947,100 | 8/1990 | Dhyanchand et al. | 322/10 |
| 4,950,973 | 8/1990 | Kouba | 322/69 |
| 4,968,926 | 11/1990 | Dhyanchand | 322/10 |
| 4,992,920 | 2/1991 | Davis | 363/36 |
| 5,093,611 | 3/1992 | Nakamura et al. | 322/90 |
| 5,168,208 | 12/1992 | Schultz et al. | 322/25 |
| 5,214,371 | 5/1993 | Naidu | 322/29 |
| 5,254,936 | 10/1993 | Leaf et al. | 322/90 |
| 5,327,069 | 7/1994 | Radun et al. | 322/10 |
| 5,444,355 | 8/1995 | Kaneyuki et al. | 322/58 |

*Primary Examiner*—Steven L. Stephan
*Assistant Examiner*—Nicholas Ponomarenko
*Attorney, Agent, or Firm*—Michael A. Lechter; Squire, Sanders & Dempsey

[57] ABSTRACT

A generator according to the disclosure includes a control system for regulating the output of the generator. The generator, such as a permanent magnet generator, includes multiple windings. For high current applications, the windings are connected in parallel. For high voltage applications, each three-phase set of windings is connected in series. The various windings may be selectively and individually activated by the control system to achieve a desired output current or voltage.

150 Claims, 38 Drawing Sheets

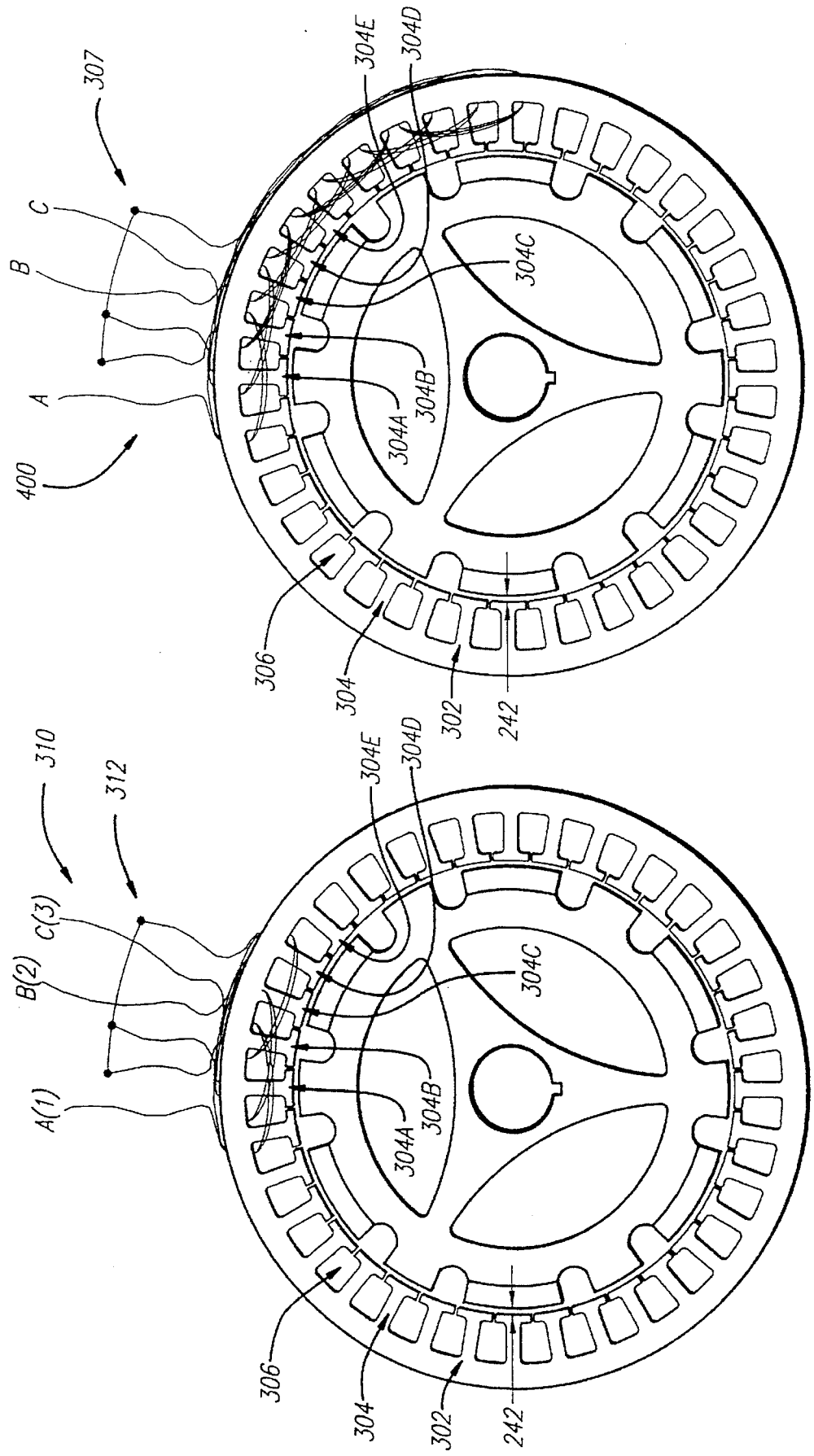

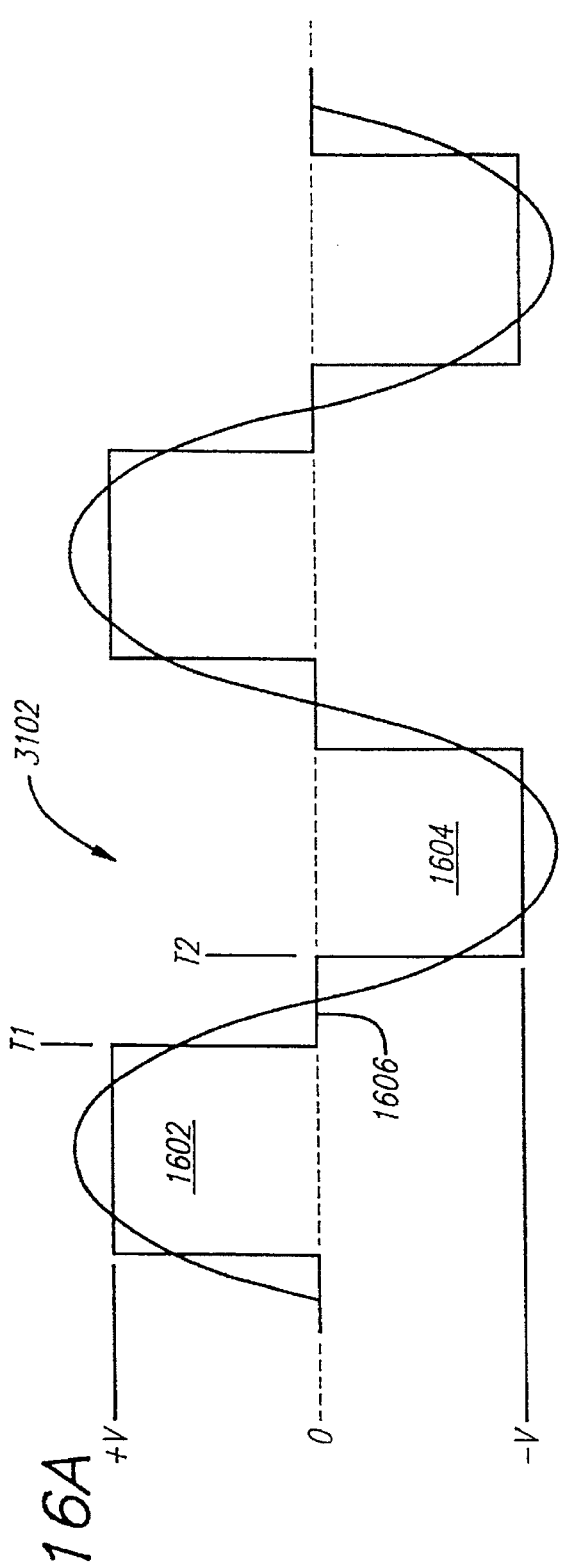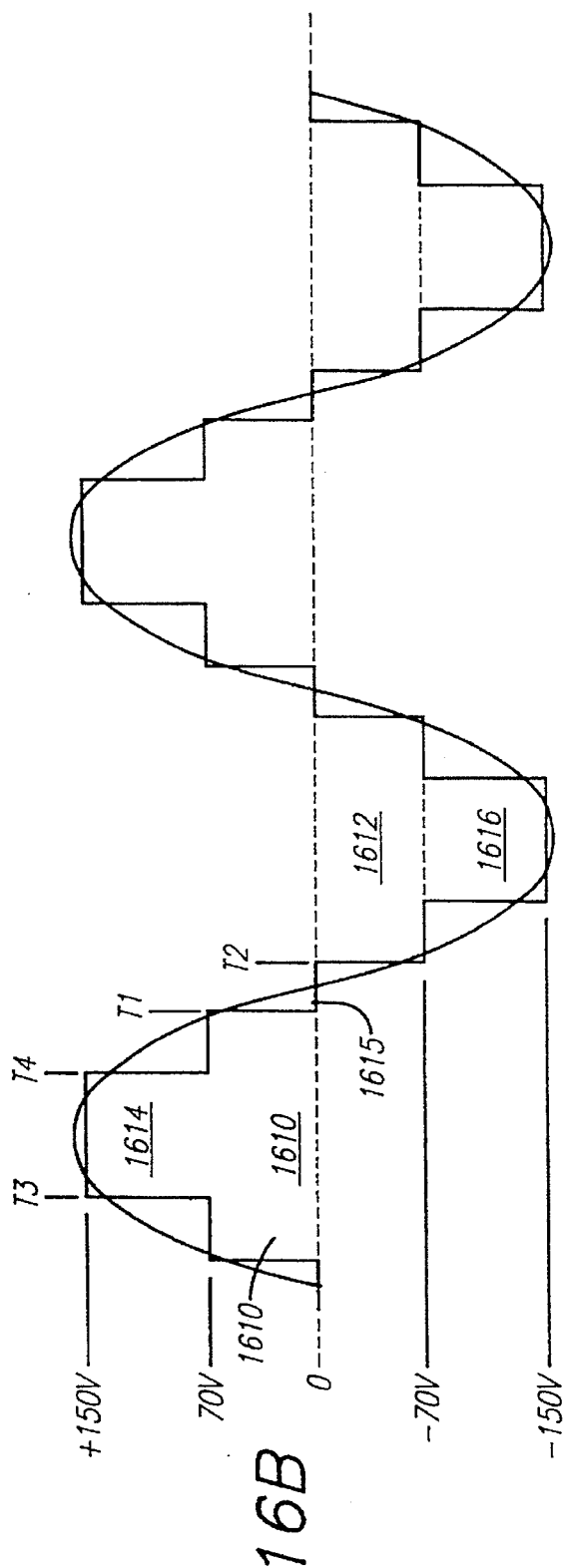
FIG. 16A
FIG. 16B

FIG. 19

| A to D | | | 1902 |
|---|---|---|---|
| Rvolt | | | 1904 |
| Cvolt | | | 1906 |
| Vac | | | 1907 |
| ISEN | | | 1908 |
| Tvolt | | | 1909 |
| Iac | | | 1910 |
| RPM | | | 1912 |
| POINT | | | 1920 |
| SCR1-8 | | | 1922 |
| SCR9-14 | | | 1924 |
| INV CTRL | | | 1925 |
| SCRLEN | | | 1926 |
| SCRHEN | | | 1928 |
| PHAZ1CNT | | | 1930 |
| PHAZ2CNT | | | 1932 |
| PHAZ3CNT | | | 1934 |
| CNTRLCT | | | 1936 |
| Rvolt1 | | | 1938 |
| * | Cvolt1 | | 1940 |
| * | * | Vac1 | 1942 |
| Rvolt8 | * | * | |
| | Cvolt8 | * | |
| | | Vac8 | |
| 1/2 cyc | 1st cyc | byte | FLAG ONE |
| I  V | INC | DEC | 1942 |
| MODEREG | | | 1943 |
| PBTN | | | 1944 |
| OLDPBTN | | | 1946 |
| PBTNCT | | | 1948 |
| TPW | | | 1950 |
| TPWCNT | | | 1951 |
| Vtarget | | | 1952 |
| Itarget | | | 1954 |
| PHZFTR | | | 1956 |
| CPHZFTR | | | 1957 |
| OUTPUT SHIFT REG | | | 1958 |
| SHIFTCNT | | | 1960 |
| AC CNT | | | 1962 |
| T1 | | | 1964 |
| T2 | | | 1966 |
| T3 | | | 1968 |
| T4 | | | 1970 |

FIG. 18

FIXED FUNCTION REGISTERS

| TIMER MODE (TMR) | 1802 |
|---|---|
| TIMER 0 (T0) | 1804 |
| TIMER 1 (T1) | 1806 |
| PRESCALER 0 (PRE0) | 1808 |
| PRESCALER 1 (PRE1) | 1810 |
| PORT 2 MODE (P2M) | 1820 |
| PORT 3 MODE (P3M) | 1822 |
| PORT 0 & 1 MODE (P01M) | 1824 |
| INTERRUPT MASK (IMR) | 1826 |
| INTERRUPT PRIORITY (IPR) | 1828 |
| INTERRUPT REQUEST (IRQ) | 1830 |
| STACK POINTER (SPL) | 1832 |
| REGISTER POINTER (RP) | 1834 |
| FLAGS | 1836 |

CONTROLLER FOR PERMANENT MAGNET GENERATOR

REFERENCES TO RELATED APPLICATIONS

The present application is a continuation-in-part of U.S. patent application Ser. No. 08/322,012, filed Oct. 11, 1994, now abandoned entitled CONTROLLER FOR PERMANENT MAGNET GENERATOR, the contents of which are incorporated by reference as if set forth herein, and a continuation-in-part of U.S. patent application Ser. No. 08/306,120, filed on Sep. 14, 1994, entitled LIGHT WEIGHT GENSET.

BACKGROUND OF THE INVENTION

The invention generally relates to electric machines, and more specifically, to permanent magnet electric generators and to voltage and current control systems for such generators.

Electric generators are well known in a variety of applications. Small generators are commonly used for automobile electrical systems, portable machines, and emergency systems. Similarly, larger generators provide power to large equipment, structures, and communities. Because of the wide variety of applications and needs, generators continue to develop, providing greater and higher quality power for a wide range of applications.

Regardless of its size or application, a generator typically comprises a rotor mounted on a rotating shaft and disposed concentrically relative to a stationary stator. Alternatively, a stationary rotor may be positioned concentrically within a rotating stator. An external energy source, such as a motor or turbine, commonly drives the rotating element. Both the stator and the rotor have a series of poles. Either the rotor or the stator generates a magnetic field, which interacts with windings on the poles of the other structure. As the magnetic field intercepts the windings, an electrical current is generated, which is provided to a suitable load. The induced current is typically applied to a bridge rectifier, sometimes regulated, and provided as an output. While typically not found in portable units, an AC output can be provided by applying the DC signal to an inverter.

Permanent magnet generators, as their name suggests, use permanent magnets to generate the requisite magnetic field. Permanent magnet generators tend to be much lighter and smaller than traditional wound field generators. The power supplied by a permanent magnet generator is difficult to regulate or control. First, the voltage supplied by the generator varies significantly according to the speed of the rotor. In many applications, changes in the rotor speed are common due to, for example, engine speed variations in an automobile, or changes in the load characteristics. In addition, the voltage of a permanent magnet generator varies inversely with the current delivered, i.e. as the current increases, the voltage drops. Such variations in the voltage are generally unacceptable for conventional loads, and must be strictly controlled.

This is particularly true in automotive applications. For example, an automotive engine typically idles at speeds on the order of 600 RPM. However, at highway speeds, the engine often runs at speeds an order of magnitude higher, e.g., 6,000 RPM. Accordingly, if a conventional permanent magnet alternator is required to provide operating voltage (e.g. 12 volts) while at idle speeds, it will provide multiples of the operating voltage, e.g., ten (10) times that voltage, at full engine RPM, e.g., 120 volts. Where the voltage at idle is 120 V, e.g. for electric drive air conditioning, the voltage at full engine RPM would be, e.g., 1200 volts. Such voltage levels are difficult and, indeed, dangerous to handle. In addition, such extreme variations in the voltage and current may require more expensive components; components rated for the high voltages and currents produced at high engine RPM (e.g., highway speeds) are considerably more expensive, than components rated for more moderate voltages.

Consequently, automobiles typically use claw-pole type alternators, notwithstanding the fact that a claw-pole type generator for a given power output is significantly larger and heaver than a corresponding permanent magnet alternator, and claw-pole type alternators are subject to size constraints that make such alternators difficult to use in high output applications, e.g., 5 kw, for powering air conditioning or refrigeration. In addition, claw-type generators are also disadvantageous in that voltage regulation is by modulating the rotating field. Such modulation effects all of the windings. Accordingly, voltage regulation and control of individual windings is impractical.

Similar problems arise with respect to the use of permanent magnet generators in other applications. It would be desirable to employ permanent magnet generators in electric welders. However, electric welders typically require a particular current to voltage relationship. For example, arc welders require an inverse slope of current to voltage, whereas metal inert gas (MIG) welders (wire feed welders) require a constant voltage and variable current and tungsten inert gas (TIG) welders require a constant current and variable voltage. Since permanent magnet generator's outputs are dependant upon motor speed, they are typically not suitable for electric welder applications. This is particularly true with respect to multipurpose welders that provide a plurality of electrical welding types.

SUMMARY OF THE INVENTION

The present invention provides a generator capable of providing a regulated voltage regardless of speed and current fluctuations. The generator is light weight and compact, while at the same suitable for high output applications.

In accordance with one aspect of the present invention, a generator is implemented using a controller which selectively activates individual windings to achieve a desired output. The windings may be connected in a fully parallel configuration to provide high current at relatively low voltage levels, or in series to provide high voltage capacity.

In accordance with another aspect of the present invention, the controller varies the power output of the generator according to system parameters, such as current or temperature. For example, a limiting feature to prevent current overload or system overheating may be provided.

In accordance with another aspect of the invention, the controller varies the order in which the windings are activated and deactivated. Varying the activation tends to provide optimal heat distribution among the several windings.

Another aspect of the invention provides a system for generating a plurality of regulated DC rail voltages, responsive to a wide range of input drive RPM. Such a system finds particular utility in multi-mode welders.

Another aspect of the invention provides a system for generating a plurality of regulated DC rail voltages, and an AC signal.

Another aspect of the present invention provides a particularly advantageous method of controlling the firing angle the SCR's employed in the rectifier bridges of a multi-phase system.

In accordance with yet another aspect of the present invention, a relatively simple microcomputer is employed to generate output signals to a multiplicity of SCRs.

In accordance with yet another aspect of the present invention, throttle control is effected in accordance with load to facilitate fuel economy and noise abatement.

BRIEF DESCRIPTION OF THE DRAWING

The present invention will hereinafter be described in conjunction with the figures of the appended drawing, wherein like designations denote like elements, and:

FIG. 3 is a schematic side view of a partially wound stator in accordance with various aspects of the present invention employing a one-pole winding group in a twelve pole system;

FIG. 4 is a schematic side view of a partially wound stator in accordance with various aspects of the present invention employing a three-pole winding group in a twelve pole system;

FIG. 16A, is an illustration of a sine wave simulated by first and second pulses of opposite polarity;

FIG. 16B is an illustration of a sine wave simulated by stacked sets of pulses;

FIG. 18 is a schematic representation of the fixed function registers employed by the microcomputer of FIG. 17;

FIG. 19 is a schematic representation of the variable registers employed by the microcomputer of FIG. 17;

DETAILED DESCRIPTION OF A PREFERRED EXEMPLARY EMBODIMENT

Figure 1:
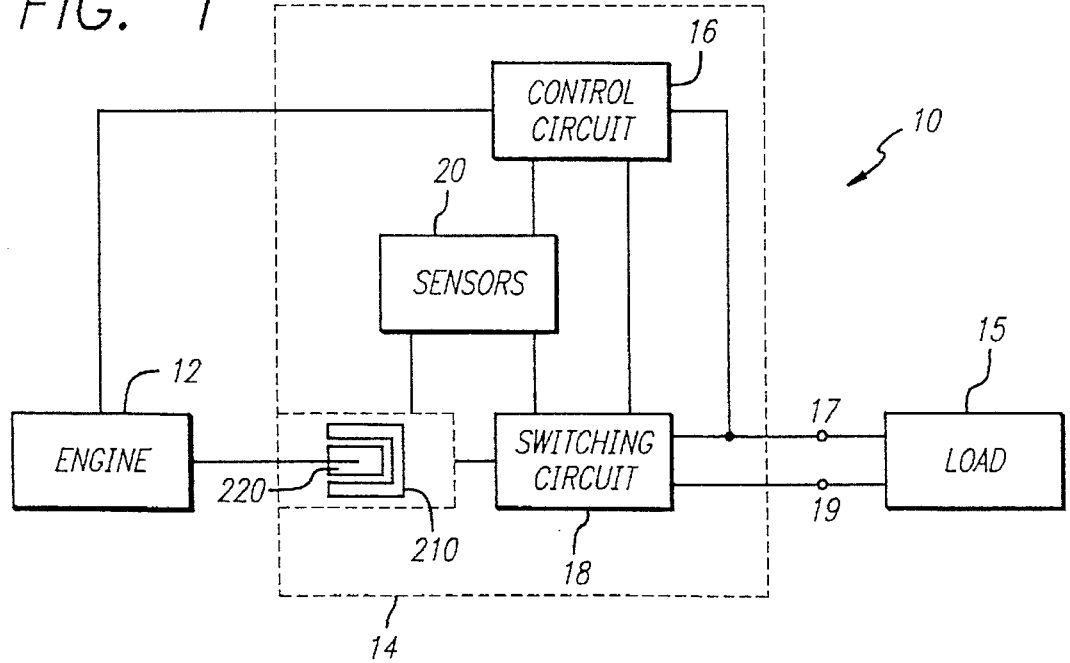
FIG. 1 is a block diagram of an exemplary generator system according to various aspects of the present invention.
Figure 2:
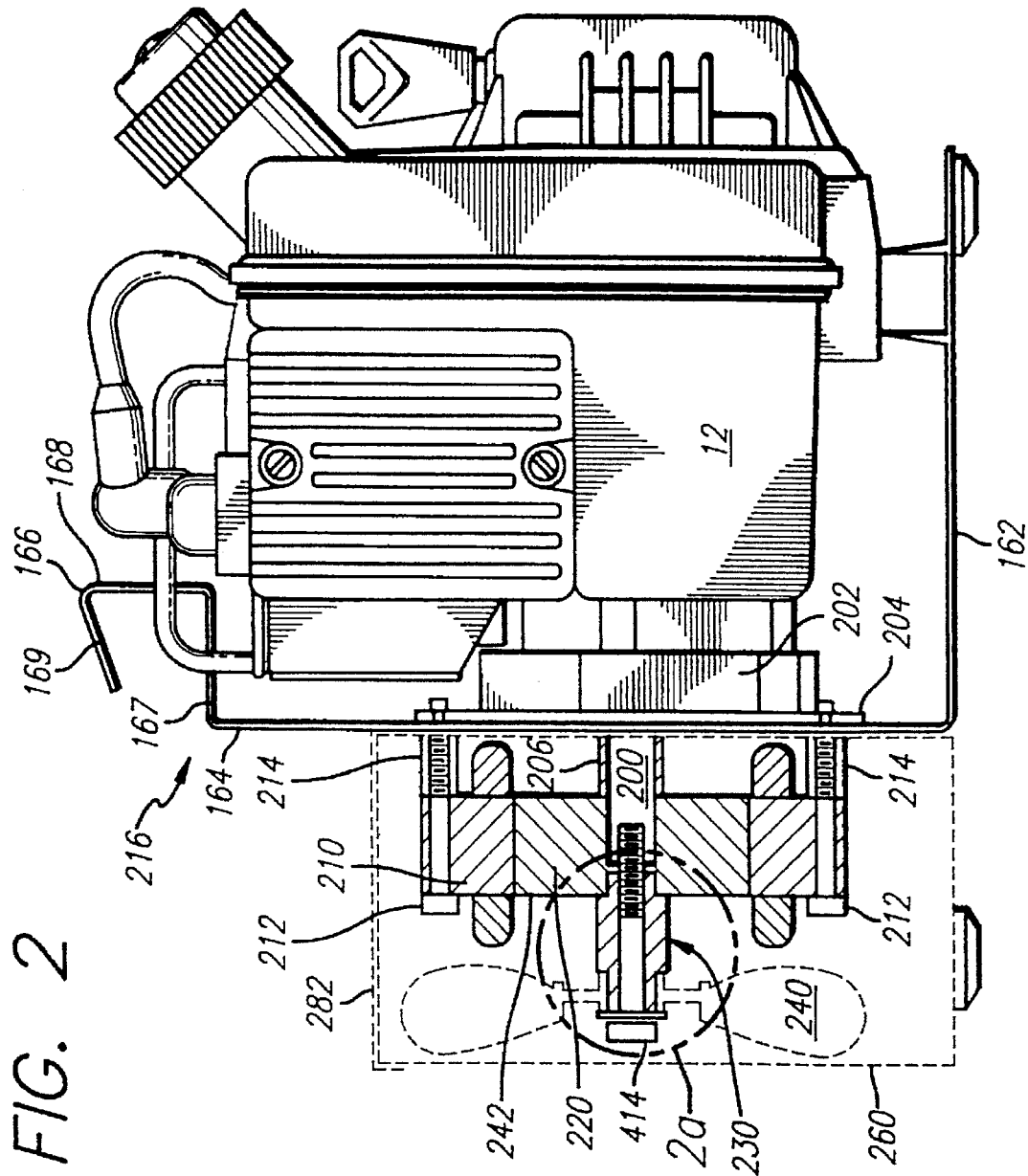
FIG. 2 is a partial sectional side view of a portable generator system in accordance with various aspects of the present invention.
Figure 2A:
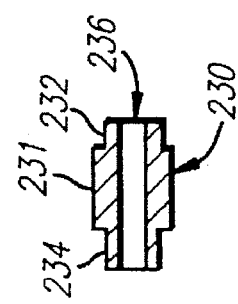

Referring now to FIGS. 1 and 2, a system 10 according to various aspects of the present invention is connected to a load 15. System 10 suitably comprises an energy source, such as an internal combustion engine 12; and a generator unit 14. Generator unit 14 suitably includes a multi-winding stator 210; a rotor 220; a control circuit 16; a switching circuit 18; output terminals 17 and 19; and at least one sensor 20.

Energy source 12 may comprise any source of rotational energy, such as, for example, a conventional steam-driven turbine, a conventional diesel engine, or internal combustion engine 12 which transfers power to generator unit 14 by causing a shaft 200 (FIG. 2) to rotate.

Generator unit 14 converts mechanical energy, e.g. rotation of shaft 200, into electrical energy to selectively supply load 15. Stator 210 and rotor 220 are disposed such that rotation of rotor 210 induces current in the windings of stator 210. Switching circuit 18, under the auspices of control circuit 16, selectively connects the respective stator windings to the generator output (and hence load 15) to achieve a desired output characteristic. The control is suitably effected in accordance with feedback provided by sensor 20.

Engine 12 and generator 14 may be directly coupled, i.e., shaft 200 may be the engine shaft, or may be indirectly coupled, e.g., as in an automotive application where shaft 200 is a separate belt driven shaft. If desired, engine 12 and generator 14 may be mounted together as a unit on a common frame, e.g. as in a genset. For example, as shown in FIG. 2, a genset may employ a frame 216 to provide a lightweight common mount for engine 12 and generator unit 14. Such a frame 216 is suitably formed of a lightweight, rigid, electrically and thermally conductive material such as, for example, aluminum, with engine 12 and generator unit 14 mounted on opposing sides of a frame upright 164.

Stator 210 and rotor 220 are suitably coaxially disposed. Rotor 220 is suitably mounted for rotation with, e.g. on, rotating shaft 200. Stator 210 is suitably fixedly mounted, e.g., to frame upright 164 (and hence engine 12), disposed concentrically with rotating shaft 200, offset by a predetermined distance from frame upright 164. Concentricity with shaft 200 is maintained by respective bolts 212, with the offset maintained by respective spacers 214. Rotor 220 is received within a central bore in stator 210. A spacer 206 is disposed on shaft 200 to axially align rotor 220 with stator 210.

Rotor 220 is preferably a permanent magnet rotor of sufficiently light weight that it can be maintained in axial alignment with, and rotated in close proximity to, stator 210 (i.e. with a relatively small predetermined air gap 242, e.g., in the range of 0.020 to 0.060 inch, and preferably 0.030 inch) without the necessity of any bearings in addition to those conventionally included within engine 12. Rotor 220 suitably manifests a generator output power to rotor weight ratio in excess of 150 or 200 watts per pound, preferably in excess of 500, more preferably in excess of 700, and most preferably in excess of 800. The preferred embodiment manifests a generator output power to rotor weight ratio in the range of 800 to 900 in watts per pound. For example, for a 2-kilowatt unit, rotor 220 would suitably weigh no more than approximately 2.40 pounds. Similarly, for a 900-watt unit rotor 220 preferably weighs no more than 1.06 pounds. This is achieved economically by employing high energy product magnets and consequence poles, as discussed in detail below.

A fan extension 230, disposed in axial alignment with shaft 200, is employed to couple a fan 240 to shaft 200. Fan 240 is mounted for rotation with shaft 200, to generate air movement to cool the various elements of generator unit 14, particularly stator 210 and circuitry 16 and 18. Fan 240 is suitably formed of a relatively lightweight plastic such as, for example, Celcon. Rotor 220, extension 230, and fan 240 are suitably secured as a unit to shaft 200 by a bolt 414 and a tensioning mechanism, such as a washer and a split washer. Bolt 414 is journaled through the washers and through the central bore of fan shaft extension 230. Threads on bolt 414 engage a threaded axial bore 420 in the end of shaft 200. The tensioning mechanism tends to prevent bolt 414 from disengaging with shaft 200.

The use of a fan directly coupled to engine shaft 200 is particularly advantageous in that airflow varies as a function of need. The higher the revolution rate of engine 12, the more power is generated, and concomitantly, more heat is generated by the components. However, as the engine revolution rate increases, the airflow generated by fan 240 also increases to accommodate the additional heat generated.

Figure 10:
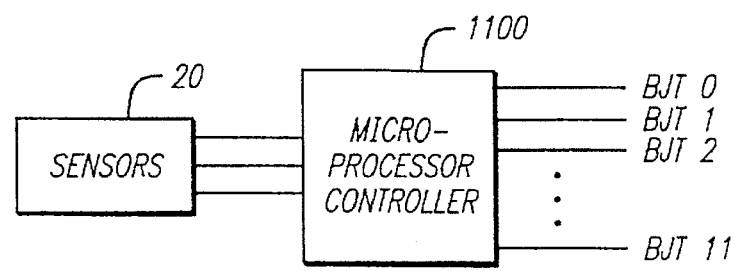
FIG. 10 is a block schematic of a digital control circuit including a microprocessor.

Stator 210 preferably includes a plurality of three-phase windings to generate low voltage, high current outputs, preferably wound with the respective coils of each phase grouped together, and concurrently wound about a laminate core as a unit to provide particularly advantageous heat dissipation characteristics. In the present embodiment, stator 210 includes twelve windings configured as four sets of three-phase star windings 400 (as schematically shown in FIG. 10, for example). Windings 400 include a predetermined number of turns corresponding to the voltage output associated with windings 400.

More specifically, referring to FIGS. 3 and 4, stator 210 includes a soft magnet core 302 having a crenelated inner periphery with a pre-determined number of equally spaced teeth 304 and slots 306. The number of slots 306 is equal to a predetermined multiple of the number of poles of rotor 220 times the number of phases. The minimum number of slots 306 is equal to the number of poles times the number of phases, i.e., the minimum number of teeth provided per pole is equal to the number of phases. For a 3-phase generator employing a rotor having 12 poles, at least 36 slots 306 will be provided in stator core 302. A predetermined number of independent groups of windings are provided on core 302, wound through slots 306 about pre-determined numbers of teeth 306. The predetermined number of groups of windings is an integer fraction of the number of poles, i.e., for 12 poles, there could be a single group using all 12 poles (conventional); two groups using six poles each; three groups using four poles each; four groups using three poles each; six groups using two poles each; or twelve groups using one pole each. The power provided by each group is relatively unaffected by the status of the other groups. As will be more fully explained, controller circuit 16 selectively completes current paths to the individual groups of windings to achieve a desired output.

Referring specifically to FIG. 3, a one-pole winding group 310 in a three-phase system comprises respective phase windings, A, B and C connected together at one end, 312, in a star configuration. The winding corresponding to each phase is wound about the pre-determined number of teeth corresponding to a pole, e.g. 3, with each successive phase winding shifted by one slot, and wound in the opposite direction from the preceding phase winding. The one pole group is therefore wound about a group of five teeth: first phase A winding is wound about teeth 304A, 304B, and 304C; phase B is wound about teeth 304B, 304C, and 304D; and phase C is wound about teeth 304C, 304D, and 304E.

In a one pole group configuration, twelve such one pole winding groups 310 (only one shown) would be provided about stator core 302. As will be discussed, a separate controlled current path is provided with respect to each winding group to provide output control.

Figure 5:
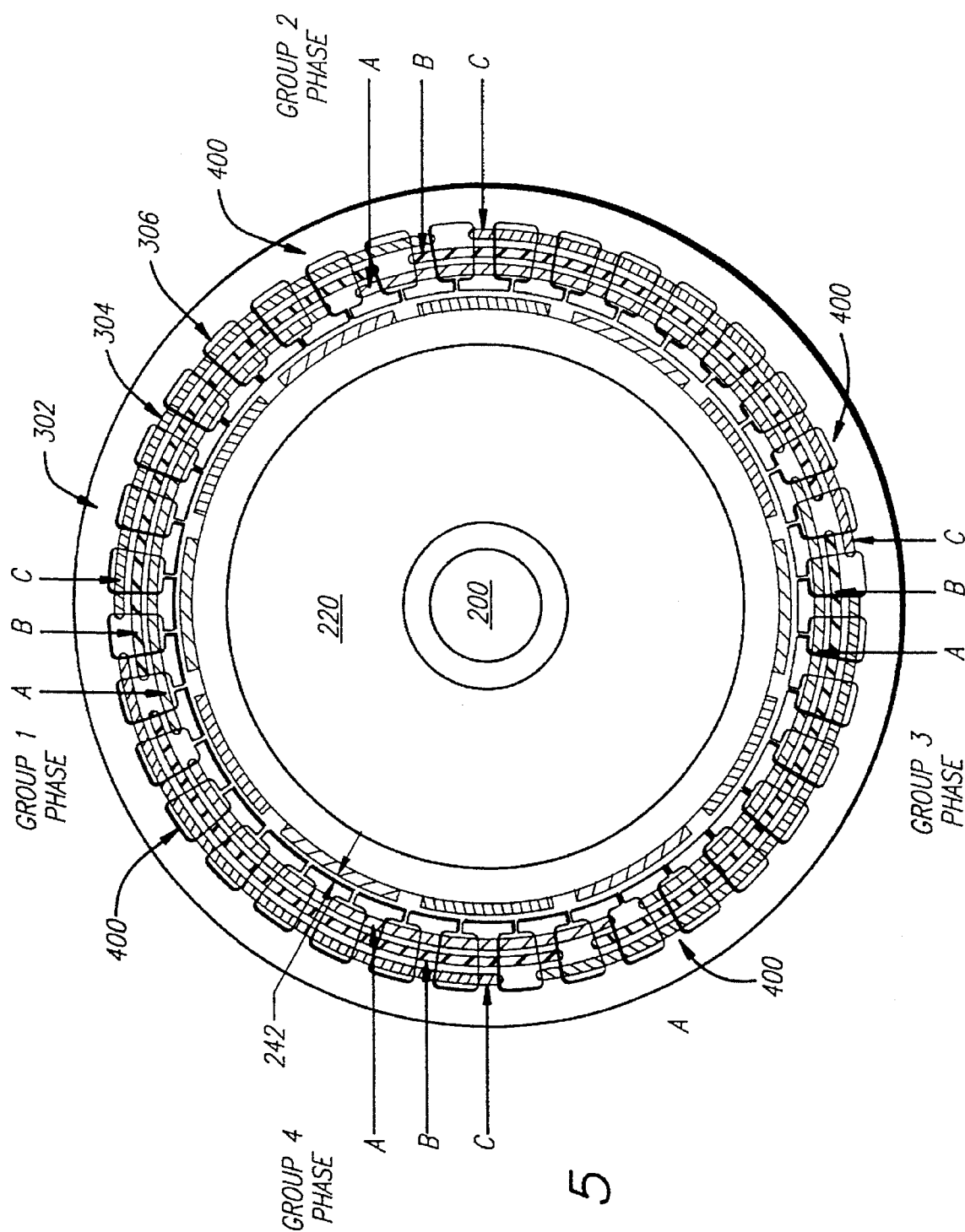
FIG. 5 is a schematic side view representation of a fully wound stator in accordance with various aspects of the present invention employing three-pole winding groups in a twelve pole system.

Referring to FIGS. 4 and 5, in the preferred embodiment the stator employs four three-pole winding groups 400 (only one shown in FIG. 4). Each phase winding (A, B, C) of each group 400 is wound in alternating directions about three successive three-tooth groups (each three-tooth group corresponding to a pole), with each successive phase winding shifted by one slot. As shown schematically in FIG. 5, the winding of one group corresponding to a given phase may partially overlap the windings of an adjacent group corresponding to the other phases, i.e., the winding of one group corresponding to a given phase may share two (the number of phases) teeth with the windings of an adjacent group.

The overlap of the windings causes some small magnetic interaction between adjacent groups. However, there is no magnetic interaction between non-adjacent groups, and the little interaction between adjacent groups has no substantial affect on the operation of the system.

Figure 6C:
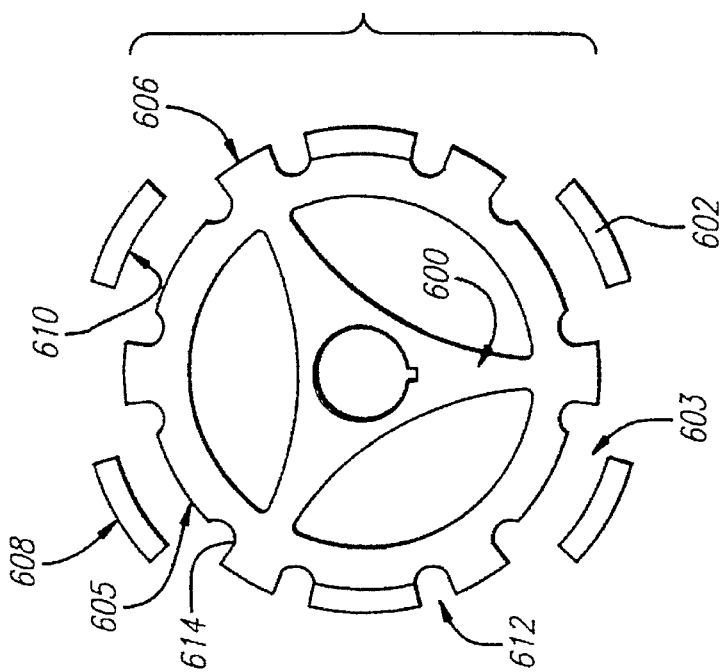
FIGS. 6A, 6B, and 6C are front, side sectional, and exploded front views of a 12-pole rotor in accordance with one aspect of the present invention.
Figure 6B:
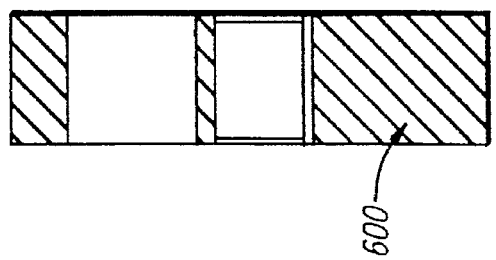
Figure 6A:
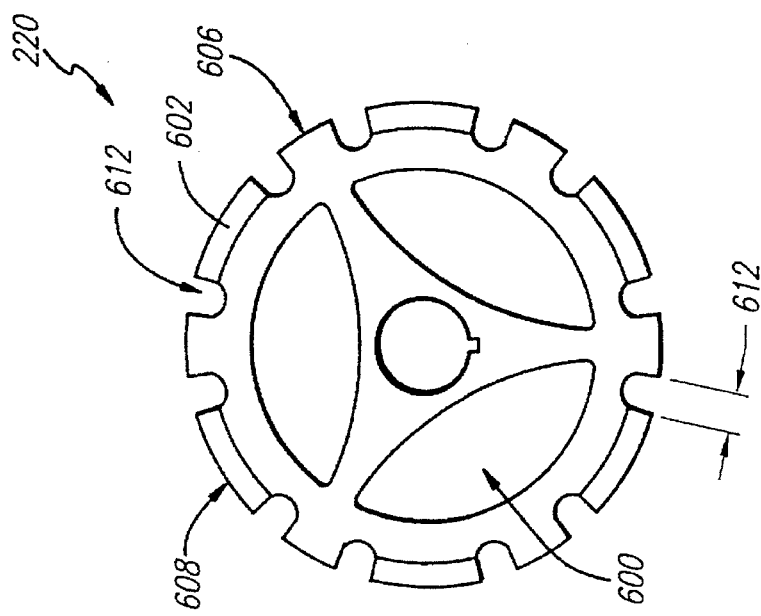

As previously noted, rotor 220 is preferably a permanent magnet rotor of sufficiently light weight that it can be maintained in axial alignment with, and rotated relative to, stator 210 without the necessity of any bearings in addition to those conventionally included within engine 12. In the preferred embodiment, this is achieved by employing high energy product magnets and consequence poles. Referring to FIGS. 6A, 6B, and 6C, rotor 220 preferably comprises a generally disc-shaped core 600 bearing a plurality of high energy product magnets 602 disposed on its circumferential surface. Magnets 602 are preferably disposed within insets 603 in the circumferential surface, with the intervening portions of core 600 comprising consequence poles 606.

Magnets 602 include an outer face 608 and an inner face 610. Magnets 602 are disposed within inset 603 with inner surface 610 seated on a conforming surface 605 of core 600, offset from adjacent consequence poles 606 by a predetermined gap 612. Magnets 602 preferably comprise high energy product magnets having a flux density of at least on the order of five kilogauss, and are suitably formed of a rare earth alloy such as neodymium iron boron or samarium cobalt. Such rare earth materials tend to be extremely expensive, and, accordingly, it is desirable to minimize the amount of material used. Nonetheless, it is desirable to generate relatively high flux densities. In the preferred embodiment, magnets 602 are relatively thin, e.g. on the order of 0.2 of an inch thick, but present a relatively large area, e.g. ¾ of an inch by approximately one inch, to minimize the amount of high energy product magnet used.

In accordance with one aspect of the present invention, the overall size of the device and amount of high energy product magnetic material is minimized for a given total flux. Specifically, the area of magnet face 608 is greater than the area of the face 606 of consequence poles by approximately the ratio of the flux density produced by the permanent magnet to the allowed flux density of the consequence pole. Thus, by maximizing the area of the permanent magnet relative to the consequence pole, a smaller diameter core is required for a given total flux. A smaller diameter core results in less weight and less magnetic material being required for a given total flux.

Inner faces 610 (FIG. 6C) and corresponding inset surface 605 of inset 603 are preferably curved along a radius concentric with magnet outer surfaces 608 and the outer surfaces of consequence poles 606. Respective gaps 612 are maintained between each magnet 602 and adjacent consequence pole 606. Gap 612 is preferably significantly larger than air gap 242 (FIGS. 2, 3 and 4) between rotor 220 and stator 210, e.g., five or six times greater, to ensure that the majority of magnetic energy is directed into stator 210.

Magnets 602 are suitably secured to core 600 with a suitable adhesive. If desired, rotor 220 can be wrapped in a non-metallic material, e.g. fiberglass tape, to secure magnets 602 against inertial/centrifugal forces generated by rotation.

Magnet inner face 610 and corresponding inset surface 605 may be any configuration, so long as they conform to each other. For example, inner face 610 of magnet 602 and mating surface 605 on core 600 may be planar. In addition, it has been determined that it is sometimes desirable to include a notch 614 extending radially below surface 605 in the vicinity of magnet consequence pole air gaps 612. Notch 614 has been found to increase the amount of flux directed into the stator from rotor 220.

Figure 7:
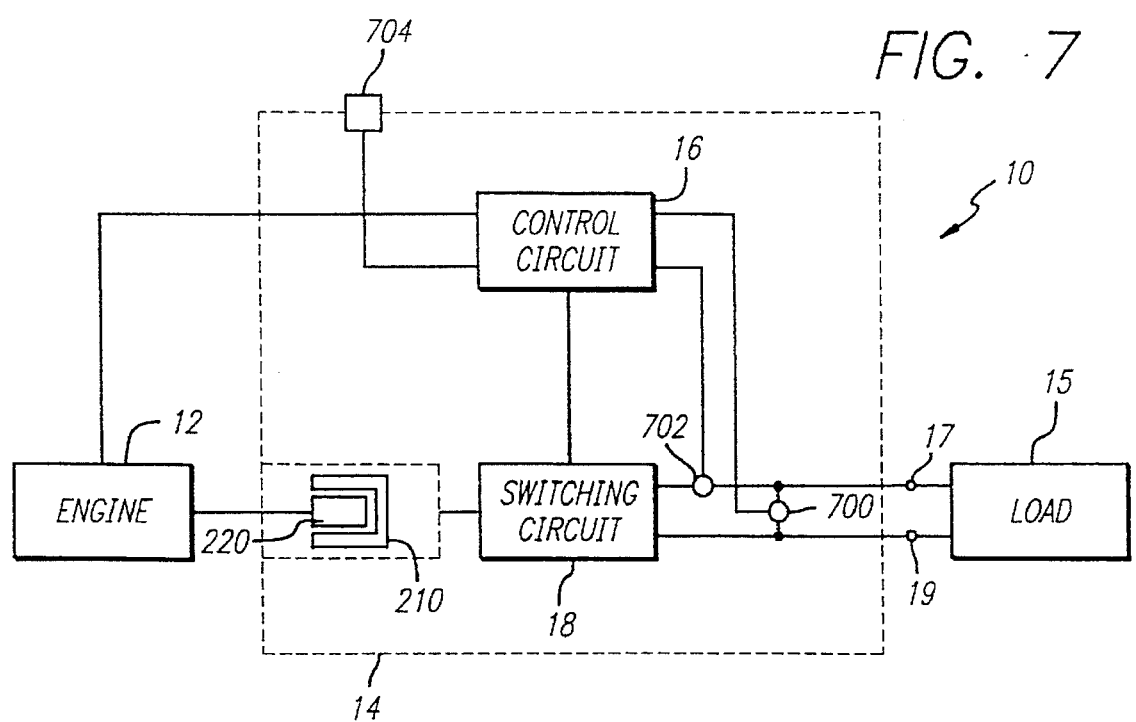
FIG. 7 is a block diagram of various components and the connection of sensors.

Referring again to FIG. 1, the current status of system 10 is measured by sensors 20. Sensors 20 suitably measure various system 10 parameters, such as voltage output, current output, and/or temperature. For example, referring to FIG. 7, a voltage sensor 700 is suitably connected to output terminals 17, 19 of switching circuit 18 for measuring the output voltage of system 10. Voltage sensor 700 generates a corresponding signal indicative of the output voltage, which is provided to control circuit 16. In addition, a current sensor 702 may be connected to one of terminals 17, 19 to measure the current output of system 10, which is similarly connected to control circuit 16. System 10 may further include a temperature sensor 704 appropriately positioned on generator unit 14, for example on a housing 260 (FIG. 2), to determine whether generator unit 14 is in danger of overheating. Each of these sensors 700, 702, 704 provides appropriate signals to control circuit 16 to indicate, for example, whether system 10 is providing appropriate output voltage or current, or whether a preselected maximum voltage, current, or temperature has been exceeded.

Based on the signals generated by sensors 700, 702, 704, control circuit 16 suitably activates and deactivates each of the various windings 400 to achieve the desired output or temperature. For example, if signals from voltage sensor 700 indicate that system 10 output voltage is below the desired voltage, control circuit 16 activates more windings 400, thus adding the current generated by other windings 400 and raising the overall current and voltage to the desired level. Conversely, if too much current is being produced or if the voltage is too high, one or more windings 400 may be deactivated to reduce the number of windings 400 supplying load 15.

Figure 8A:
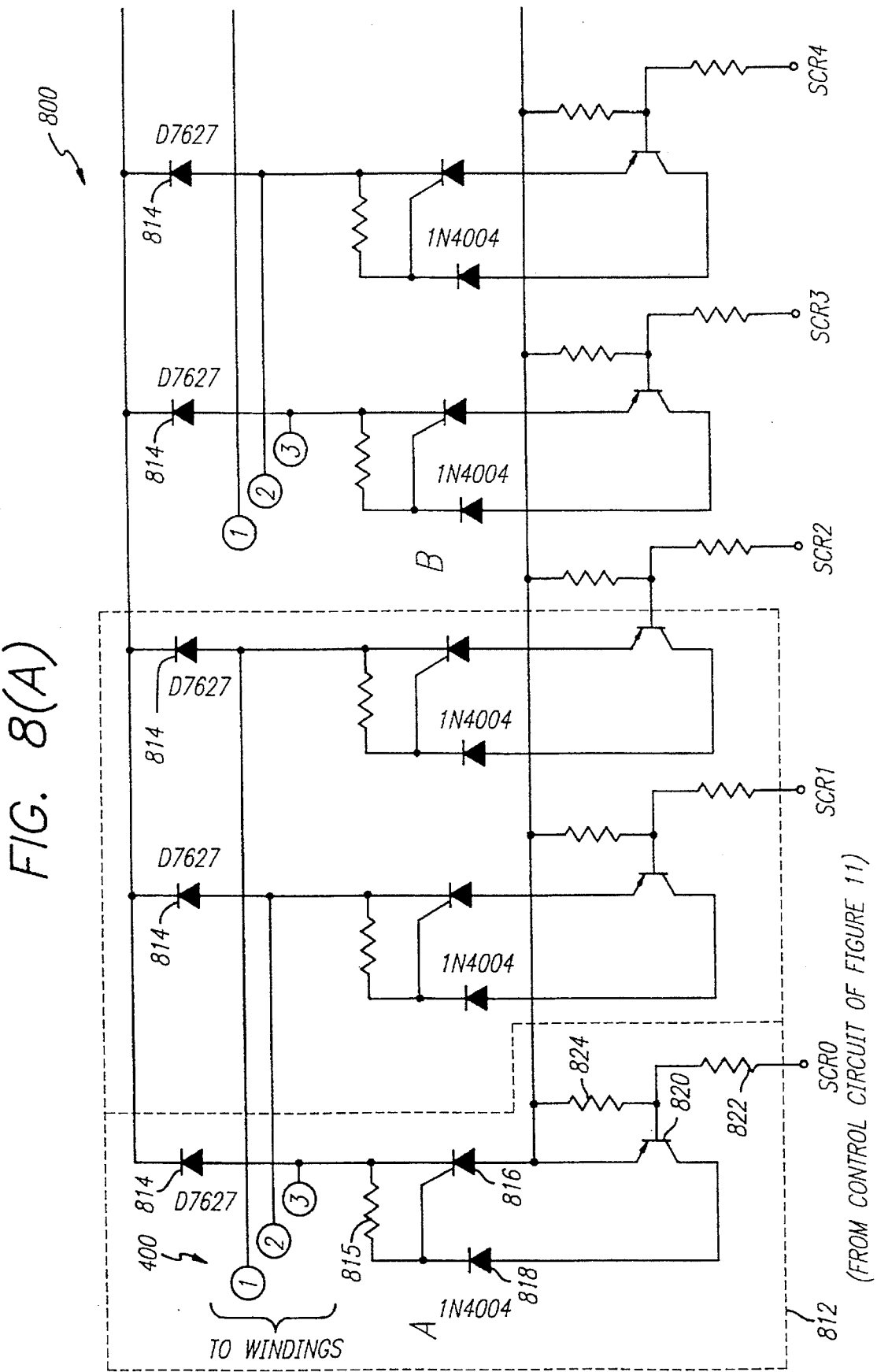
FIG. 8 is a circuit diagram of a digitally controlled switching circuit suitable for relatively high current, low voltage applications.
Figure 8B:
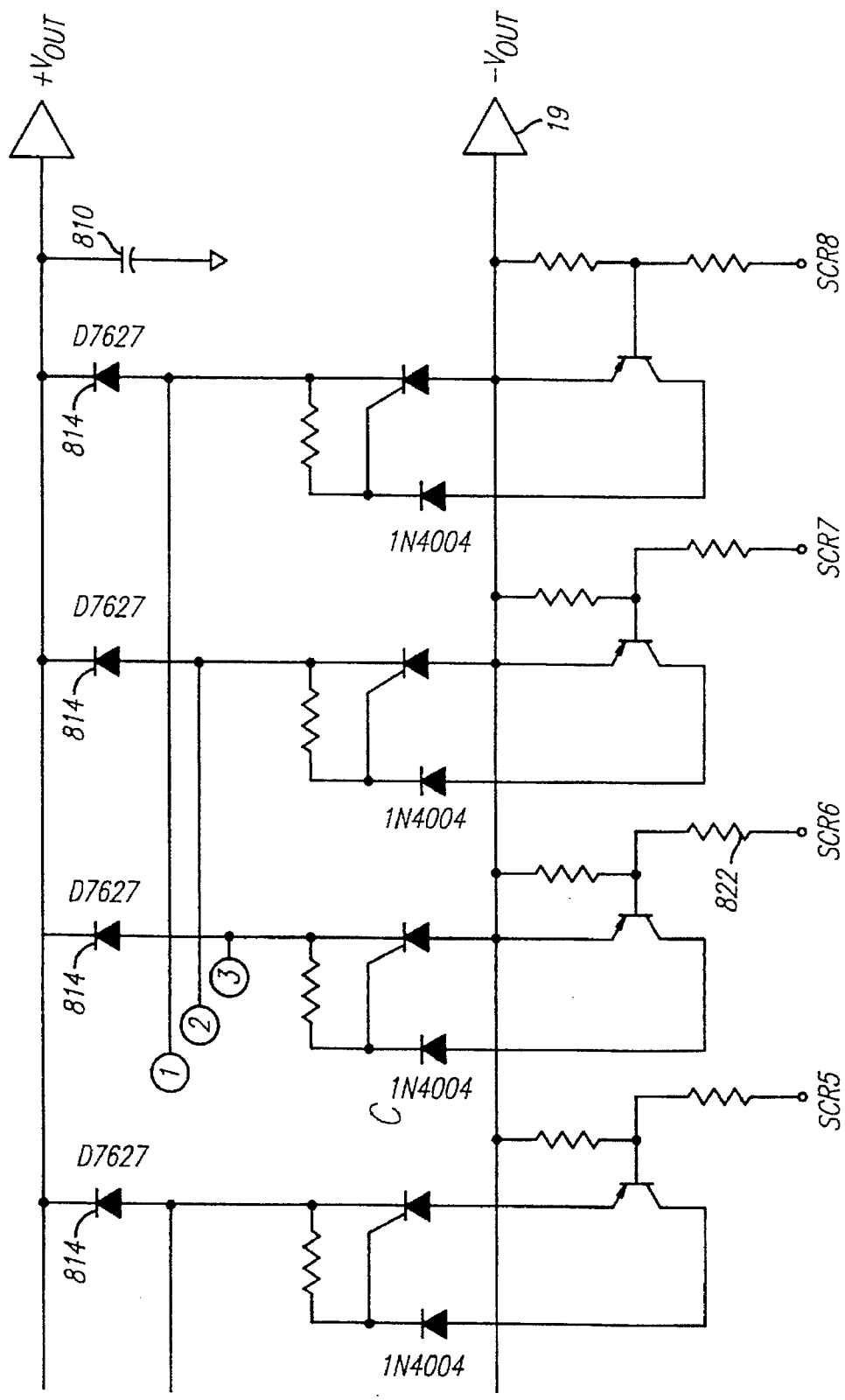
Figure 9:
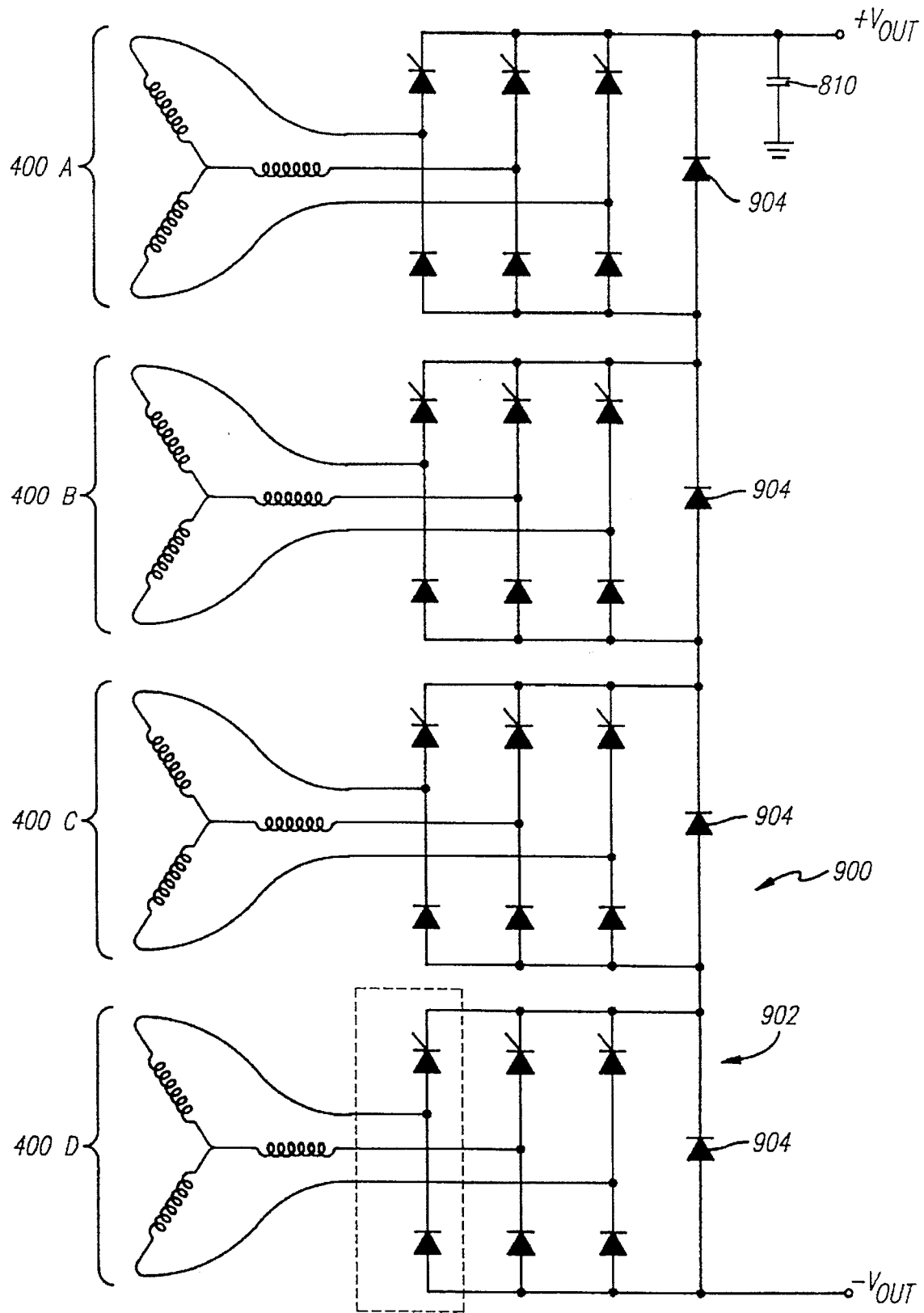
FIG. 9 is a circuit diagram of an analog controlled switching circuit suitable for relatively high voltage, low current applications.

Thus, switching circuit 18, under the auspices of control circuit 16, selectively completes current paths through the respective winding groups to achieve desired output characteristics or temperature. Switching circuit 18 may be configured to effectively connect the windings in parallel to provide a high current output at relatively low voltage levels (FIG. 8), or may be configured to effectively connect the windings in series to provide high voltage capacity (FIG. 9).

Figure 11A:
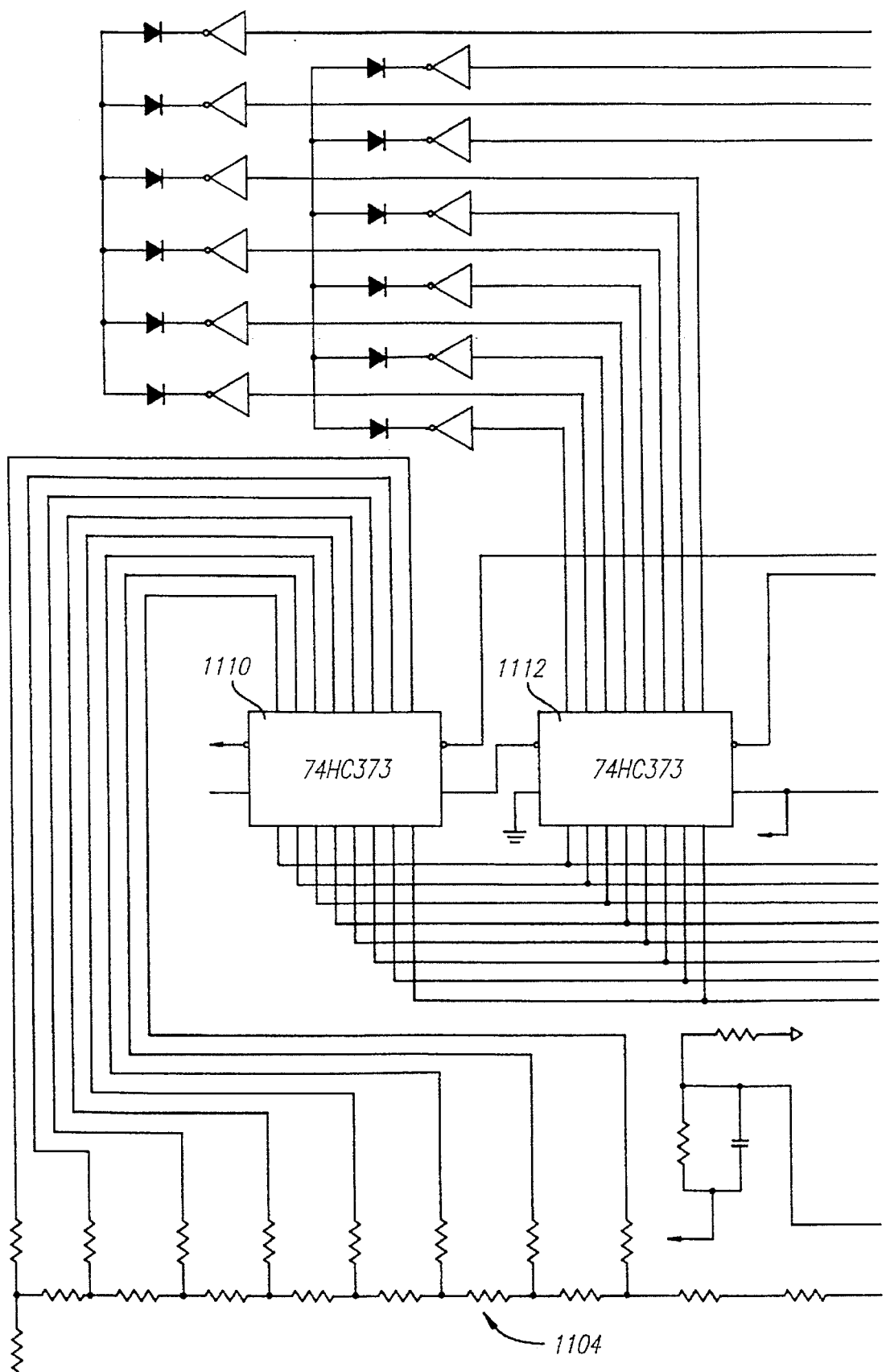
FIG. 11 is a schematic diagram of an exemplary microprocessor-based digital control circuit.

Switching circuit 18 may be responsive to digitally generated control signals or to analog generated control signals. Referring now to FIG. 8, a suitable digitally-controlled switching circuit 800 configured to effectively connect the windings 400 in parallel to provide a high current output at relatively low voltage levels, comprises: a capacitor 810 and a plurality of controlled rectifying circuits 812. More specifically, one electronically controlled 3-phase rectifier bridge 812 is provided for (connected to) each winding group 400 (here 4). For clarity of illustration, however, only three of the four rectifying circuits 812 of the present embodiment are shown in FIG. 8. Capacitor 810 is suitably charged by windings 400 during the positive cycle of each winding 400 as the voltage of winding 400 exceeds the voltage of capacitor 810, and discharges to load 15 when the voltage of level of windings 400 is less than the voltage level of capacitor 810. Thus, capacitor 810 supports the output voltage of generator unit 14 and provides a smoother, less variable output voltage to load 15. Rectifying circuits 812 convert the AC signal provided by generator unit 14 into a DC signal. Each rectifying circuit 812 comprises a respective leg for each phase: a power diode 814; a connecting switch or relay, such as a semiconductor controlled rectifier (SCR) 816; a control diode 818; and a control switch or relay, such as a transistor 820. Each leg of rectifier 812 is responsive to a control signal, suitably from digital control circuit 16, discussed in detail below with reference to FIGS. 10 and 11.

Each of rectifying circuits 812 is suitably substantially identical; therefore, only one of rectifying circuits 812 is described herein. The cathode of power diode 814 is connected to capacitor 810 (and load 15), and its anode is connected to an associated winding 400 and the cathode of the associated SCR 816. Basically, when the voltage at the anode of power diode 814 is greater than the cathode voltage, current flows through power diode 814. When the anode voltage is less than the cathode voltage, however, power diode 814 operates as an open circuit. Thus, power diode 814 conducts only when winding 400 provides a higher voltage than capacitor 810.

Each transistor 820 suitably comprises a pnp bi-polar junction small signal transistor (BJT) and controls corresponding SCR 816. The base of each BJT 820 is connected through a first resistor 822 to a digital control circuit 16, such as control circuit 1100 (FIG. 10), which generates signals to activate and deactivate BJTs 820. The base of BJT 820 is connected to negative terminal 19 through a second resistor 824, which forms a voltage divider at the base of BJT 820. First and second resistors 822, 824 have appropriate values such that a control signal asserted by control circuit 16 activates BJT 820. The collector of BJT 820 is connected to the anode of control diode 818, and BJT's 820 emitter is connected to the anode of SCR 816 and negative terminal 19. To protect control circuit 16, a buffer (not shown) may be interposed between control circuit 16 and switching circuit 800.

The gate of SCR 816 is connected to: the cathode of control diode 818; the cathode of SCR 816 through a resistor 815; and winding 400 through resistor 815. When winding 400 generates a positive voltage, the state of SCR 816 is irrelevant; SCR 816 and control diode 818 prevent significant current from flowing from SCR's 816 cathode to its anode. Consequently, SCR 816 operates virtually as an open circuit, while current flows through power diode 814 to load 15. In its active state, however, SCR 816 operates like a diode, allowing current to flow from anode to cathode, but inhibiting current flow from cathode to anode. Thus, when winding 400 provides a negative voltage, the state of SCR 816 determines whether current flows to winding 400.

When BJT 820 is deactivated, no signal is asserted via control diode 818 at the gate of SCR 816, and winding 400 drives the gate voltage through resistor 815. Thus, the gate voltage remains substantially identical to that of winding 400, and SCR 816 remains deactivated. When BJT 820 is activated by a signal from control circuit 16, however, the anodes of control diode 818 and SCR 816 are connected through BJT 820, which activates SCR 816. The anode of SCR 816 is connected to negative terminal 19 of generator unit 14, so that the negative voltage at winding 400 causes current to flow through SCR 816 to winding 400. Thus, when SCR 816 is activated, winding 400 drives negative terminal 19 of generator unit 14.

By appropriately switching BJTs 820, a desired voltage or current may be maintained. If the output voltage or current of system 10 is less than desired, more BJTs 820 may be activated, adding more windings 400 to drive load 15. Conversely, if system 10 output voltage or current is too high, BJTs 820 may be deactivated to remove windings 400, decreasing the voltage or current to the desired level.

Figure 11B:
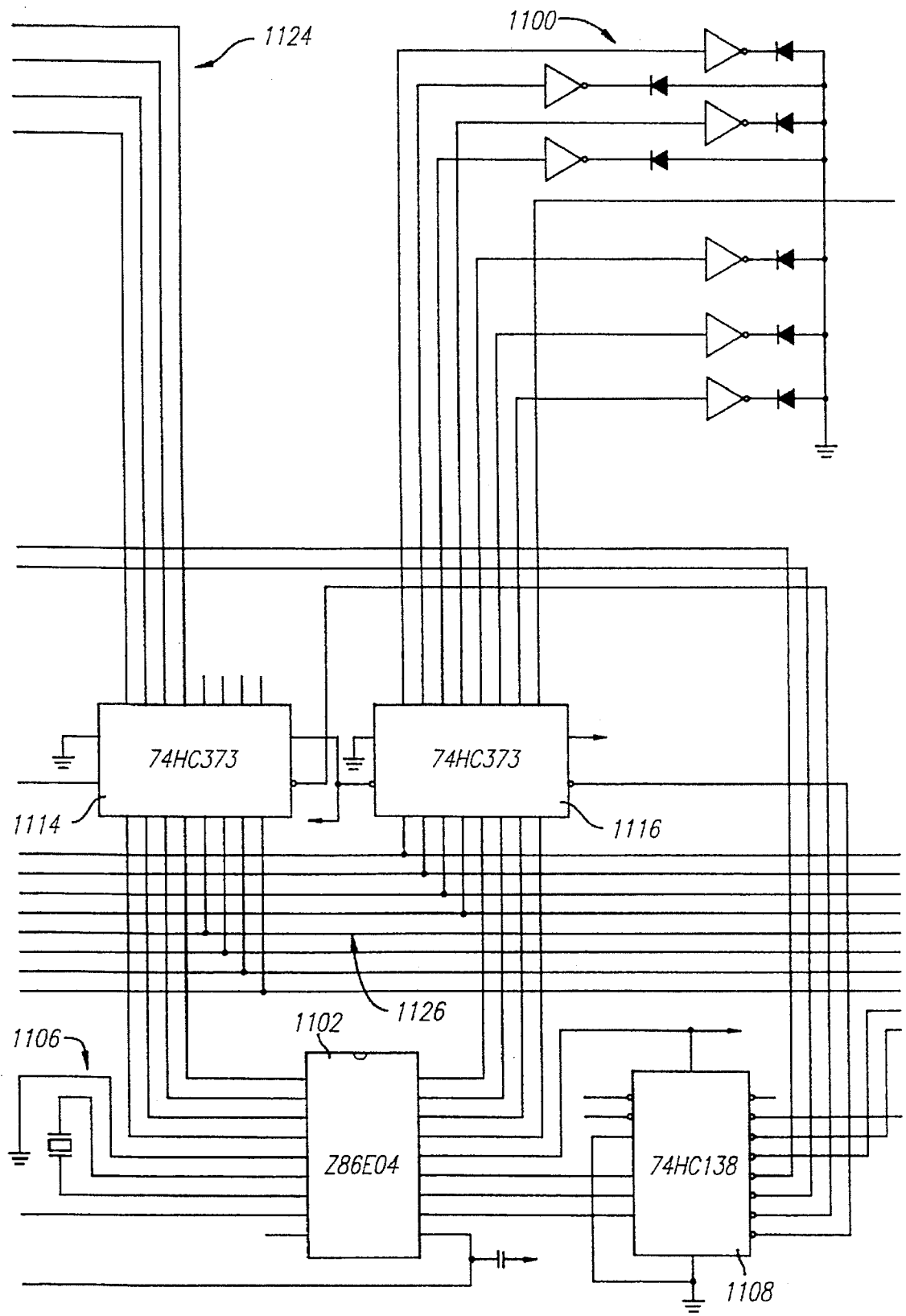
Figure 11C:
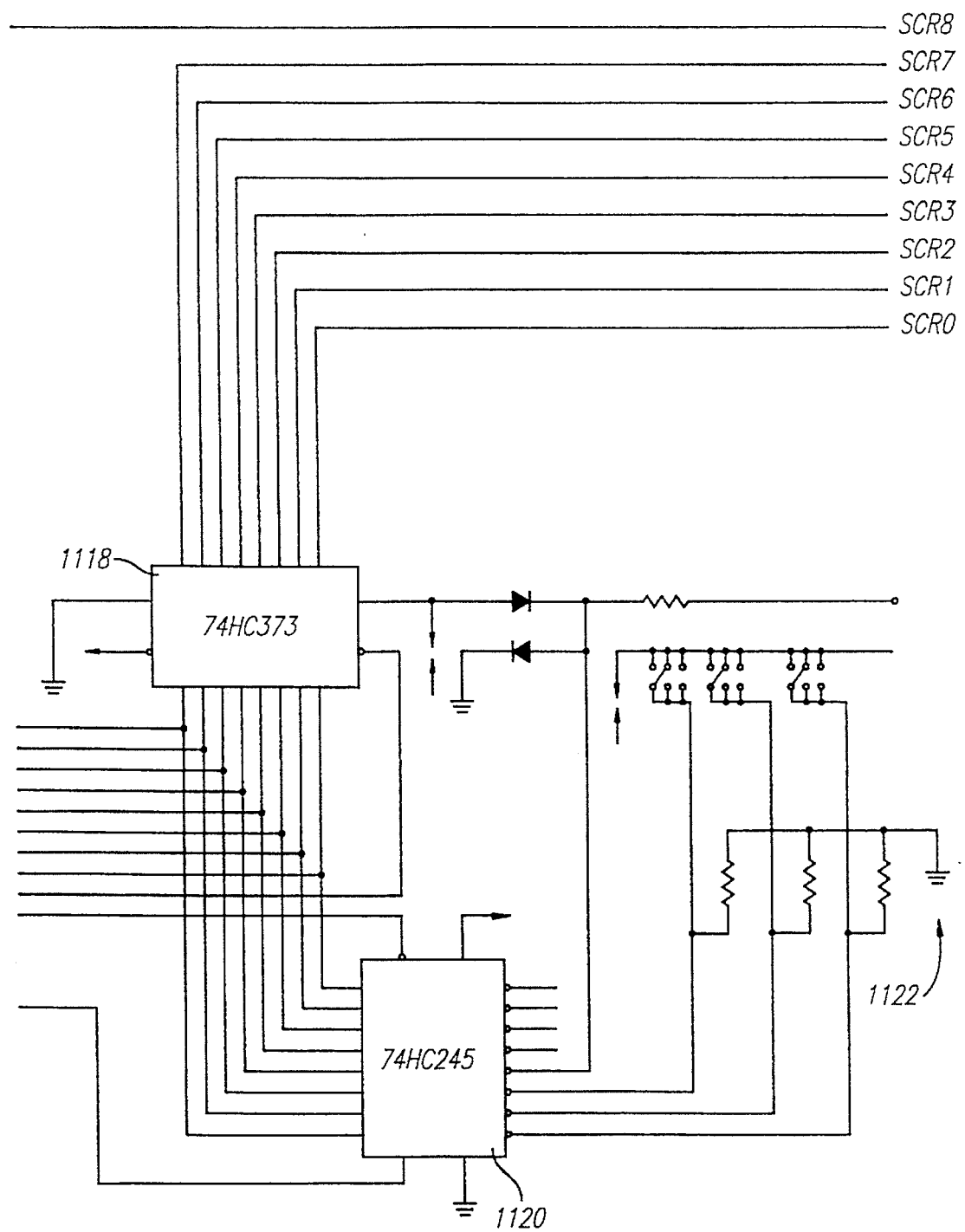

Control circuit 16 suitably comprises a microprocessor-based system for receiving data from sensors 20 and activating or deactivating BJTs 820 of switching circuit accordingly. Referring to FIGS. 10 and 11, an exemplary microprocessor-based system 1100 comprises a conventional microcomputer 1102 receptive of data from sensors 20, such as by polling or based on interrupts, and adjust BJTs 820 accordingly to provide the appropriate output. An exemplary microprocessor based system for a three winding group system (control for only three winding groups provided as is the case of the switching circuit of FIG. 8) is disclosed in FIG. 11. As is apparent from FIG. 11, control system 1100 suitably comprises: a conventional microcomputer, such as, for example, a Zialog Z86E04 1102; a resistor ladder 1104; a suitable crystal 1106 of pre-determined resonant frequency, e.g. 4 megahertz; an one of eight decoder 1108 such as, for example, a 74HC138; respective output latches 1110–1118 such as, for example, 74HC373 latches; a bidirectional latch 1120, such as, for example, a 74HC245; input switches 1122 and suitable indicator circuitry 1124, comprising light emitting diodes and drivers circuitry 1124. The pins (P20–P27) of one output port (port 2) of microcomputer 1102 are connected to the input pins of each of latches 1110–1118. The latch control pins of latches 1110–1118 are connected to respective output pins (11–15) of decoder 1108. The output pins of latch 1110 are connected to the respective resistors of ladder 1104. The output pins of latch 1118 and one output pin of latch 1116 are connected to the respective control inputs (SCR0–SCR8) of switching circuit 800 (FIG. 8). The output pins of latch 1114 and the remaining output pins of latch 1116 are connected to indicator circuitry 1124.

Microcomputer 1102 is suitably a conventional microcomputer, such as, for example, a Zialog Z86E04, including: internal random access memory (RAM); counters and registers (which can be implemented in the RAM in accordance with standard techniques); respective internal comparators capable of generating interrupts; and respective port registers for controlling the output signals at various output terminals (pin) with the microcomputer. (For convenience of reference, corresponding port registers will sometimes be referred to synonymously.) More particularly, microcomputer 1102 suitably includes at least one internal comparator, comparing the voltage applied at pin P31 (indicia of the output current) to that applied at pin P33. As will be explained, the voltage at pin P33 is suitably a controlled ramp voltage generated by resister ladder 1104, used as a common reference signal by microcomputer 1102.

Decoder 1108 and latches 1110–1120 cooperate as a bus to selectively couple Port 2 (pins P20–P27) of microcomputer 1102 to multiple devices, e.g. resistor ladder 1104, indicator circuitry 1124, the respective control inputs (SCR0–SCR8) of switching circuit 800 (FIG. 8), and switches 1122. Microcomputer 1102 generates, at e.g. Port 0 (pins P01–P02), an address count indicative of the particular latch corresponding to the desired recipient of the output generated at Port 2. The address is applied to decoder 1108, which generates a latch (capture) control signal to the designated latch. Thus, the output provided at Port 2 of microcomputer 1102 is selectively provided to the desired device.

Microcomputer 1102 generates a count (AtoD, FIG. 11A) which is selectively provided at Port 2 (pins P20–P27). The count is applied through latch 1110 to resistor ladder 1104. Resistor ladder 1104 generates a ramp reference signal reflecting that count. The voltage across the R2R ladder is filtered and applied as the common comparator reference signal at microcomputer pin 10. As will be described, comparisons of various parameters, (e.g., indicia of output current (pin P31)) against the ramp signal are employed to generate digital indicia of the parameters or specified functions; the instantaneous value of count AtoD when the parameter and reference voltage are equal is indicative of the value of the parameter. The comparisons are also employed to selectively initiate interrupt functions. Microcomputer 1102 is suitably interrupt driven; various interrupt signals are generated to effect pre-determined functions. For example, interrupts are generated in response to a comparison of the ramp reference signal to the indicia of output current from sensor 702 (FIG. 7) and periodically in response to clocked internal counts. In response to the interrupt, the AtoD count, indicative of the output current, is captured, and the SCRs associated with respective winding groups 400 enabled or disabled to couple the appropriate number of winding groups into the operative circuit to provide the desired output.

Switches 1122 are employed to provide operator input to microcomputer 1102. Switches 1122 are connected between a respective corresponding pin of latch 1120 and a logic high voltage source. Microcomputer 1102 periodically addresses bidirectional latch 1120. Latch 1120 captures the state of the switches; a count is captured by latch 1120 corresponding to logic high signals in the latch bits corresponding to the switches. Then, responsive to a control signal from microcomputer 1102 via decoder 1108, the switch state count in latch 1120 is placed on the bus, i.e. provided at Port P2 of microcomputer 1102. Microprocessor 1102 then senses the state of port P2, to determine which of the switches, if any, has been actuated.

Switching circuit 800 is suitable for relatively low voltage, high current applications (e.g., about 12 volts, 200 amperes). Switching circuit 18 can also be configured for relatively high voltage, low current systems by effectively connecting the individual winding groups 400 in series. Referring now to FIG. 9, a suitable analog controlled, high voltage switching circuit 900 comprises capacitor 810 and a series of rectifying circuits 902. Although switching circuit 800 is shown as a digitally controlled circuit and switching circuit 900 is shown as an analog controlled circuit, either circuit may be suitably modified to be controlled by a different type of circuit; the present configurations are shown for illustrative purposes only.

Each rectifying circuit 902 suitably includes, for each phase, a power diode 814; and a connecting switch or relay, such as a semiconductor controlled rectifier (SCR) 816.

Switching circuit 900 is configured so that windings 400 within a group of three-phase windings are connected in parallel. Each group of windings 400A-D, however, is connected in series with respect to the other groups. A set of supplemental diodes 904 connected to the cathodes of each set of power diodes 814 and the anodes of each set of SCRs 816 is provided to maintain DC current flow. The series configuration provides higher voltage capacity for system 10 without increasing the voltage output of any individual three-phase group of windings 400. As a result, the voltage capacity of system 10 may be increased without adding costly high performance components. SCR's 816 are selectively actuated by control 16 to control the particular groups of windings 400 that are operatively connected into the circuit, and thus control the output voltage.

Figure 12:
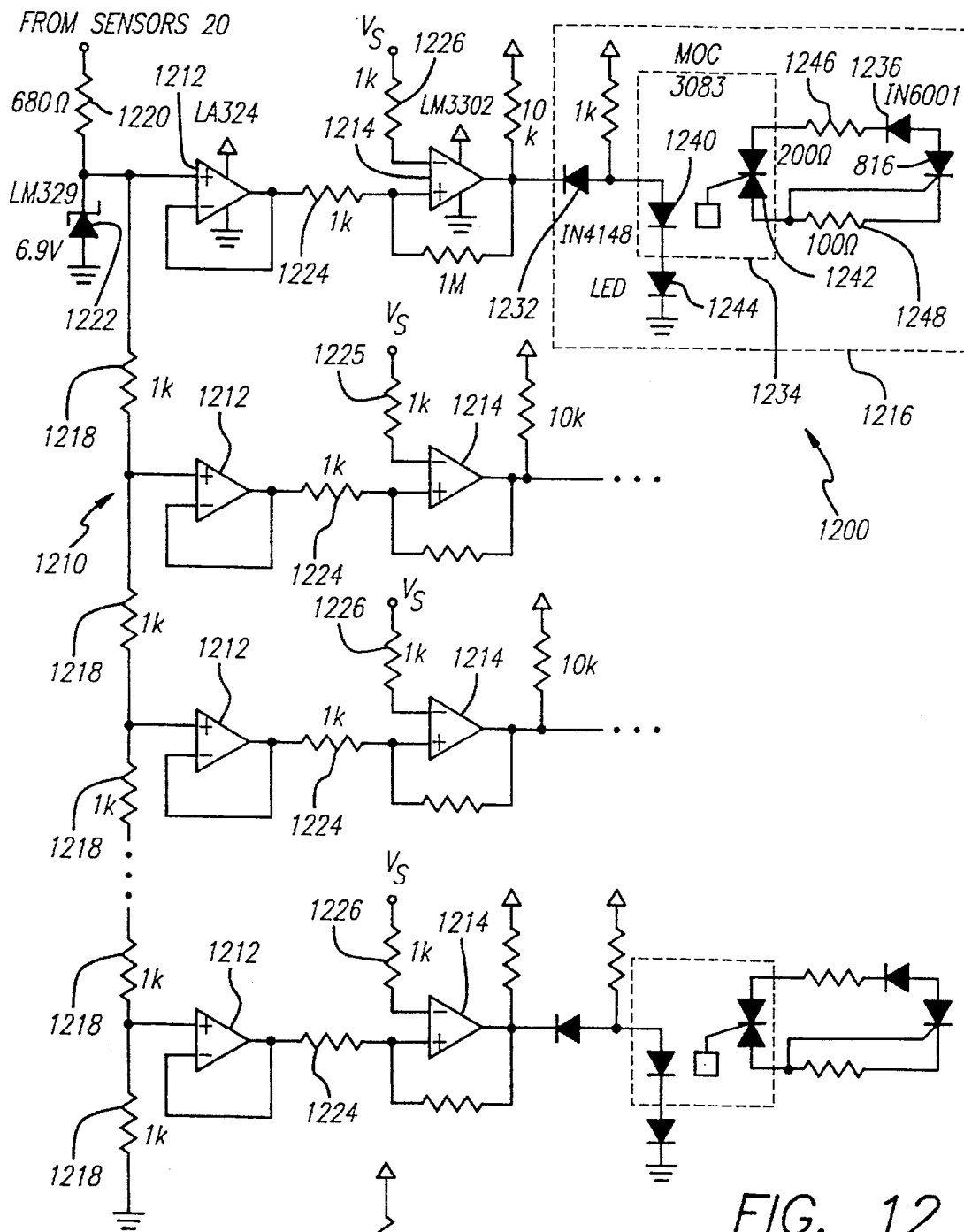
FIG. 12 is a schematic diagram of an analog control circuit including discrete logic components.

Control of SCR's 816 in the series configuration of FIG. 9 may be effected by any suitable control circuit 16, e.g. a microprocessor controlled circuit, or by a "hardwired" analog control circuit that generates control signals in accordance with sensed conditions, such as output voltage. For example, referring to a FIG. 12, a suitable "hardwired" control circuit 1200 responsive to, e.g., output voltage sensor 700 (FIG. 7) comprises a voltage divider 1210 with a pre-determined number of steps (preferably corresponding to the number of stator windings), and for each step, an associated buffer 1212, an associated comparator 1214, and an associated switching system 904 (coupled to the corresponding SCR 2116). Control circuit 800 generates control signals to SCR's 816 to selectively connect or disconnect the respective winding groups into the operative circuit in accordance with the level of output voltage.

Indicia of (e.g., a voltage indicative of) the output voltage of generator unit 14 (from sensor 1250), is applied through a resistor 1220 (e.g., 680 Ohms) to voltage divider 1210. Voltage divider 1210 suitably comprises a plurality of resistors 1218, one corresponding to each stator winding (here 12). Preferably all of the resistors are of equal pre-determined value (e.g., 1K Ohm).

If desired, over-voltage protection can be provided by connecting a Zener diode 1222 of pre-determined breakdown voltage corresponding to the divider input voltage indicative of a maximum permitted output voltage. Thus, if the output voltage of generator unit 14 exceeds the permitted maximum, the voltage applied to divider 1210, and Zener diode 1222, will exceed the breakdown voltage of Zener diode 1222. Accordingly, the voltage asserted at the voltage divider 1210 drops to zero, thus deactivating all of windings 400.

Each of buffers 1212 is connected to a node between resistors 1218 in voltage divider 1210. Buffers 1212 suitably comprise operational amplifiers (op amps) having a noninverting input connected to a voltage divider 1210 node and an inverting input connected directly to the op amp output. Buffers 1212 generate an output signal identical to the signal asserted at their inputs, but only within the range of buffers' 1212 positive and negative supply (or "rail") voltages. Thus, buffers 1212 electrically isolate the remainder of control circuit 16 from windings 400.

The outputs of buffers 1212 are suitably connected to inputs of comparators 1214. Comparators 1214 suitably comprise a plurality of op amps configured for very high gain. Buffer 1212 output terminals are suitably connected to the noninverting inputs of comparator 1214 op amps through a first set of resistors 1224, and comparators' 1214 inverting inputs are connected to a reference voltage $V_s$ through a second set of resistors 1226. Because of its exceptionally high gain, each comparator 1214 generates an output signal substantially equal to its positive or negative rail voltage according to whether the noninverting input signal or the inverting input signal, respectively, is higher.

Figure 13:
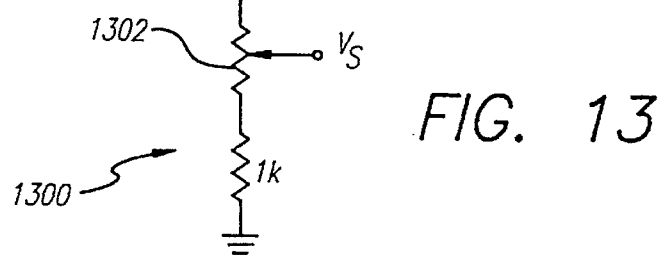
FIG. 13 is a schematic diagram of a voltage divider circuit for generating a reference voltage.

Referring to FIG. 13, the reference voltage $V_s$ provided to the inverting input of each comparator 1214 is suitably generated by a second voltage divider 1300 including a manually adjustable potentiometer 1302, and connected to an internal, substantially constant voltage and ground. The reference $V_s$ voltage is generated at the output of potentiometer 1302. This reference voltage $V_s$ may be adjusted by the user or the manufacturer to achieve the desired output voltage of system 10.

Referring again to FIG. 12, the output signal of comparator 1214 is provided to the associated switching system 904. Each switching system 904 provides control signals to switching circuit 18 in accordance with the output signal asserted by comparator 1214 to activate and deactivate windings 400. Switching system 1214 suitably comprises a first diode 1232; a coupler, suitably an optically controlled thyristor 1234; and a second diode 1236 coupled to SCR 816. The cathode of first diode 1232 is connected to the output of comparator 1214, and its anode is connected to one of the inputs to optically controlled thyristor 1234. Both the anode and the cathode are connected to pull-up resistors. When the output of comparator 1214 is low (i.e. the voltage of buffer 1212 signal is lower than the reference voltage $V_s$), the signal asserted at the input of optically controlled thyristor 1234 is low. In contrast, when the output of comparator 1214 is high, the signal asserted at the input of optically controlled thyristor 1234 is high.

Optically controlled thyristor 1234 is a buffer for electrically isolating the various elements of control circuit 16 from windings 400. Essentially, a high signal at the input of optically controlled thyristor 1234 activates an internal light emitting diode (LED) 1240. The illumination of LED 1240 activates an internal thyristor 1242 connected to the outputs. Thus, optically controlled thyristor 1234 provides total electrical isolation from windings 400 to the rest of control circuit. In addition, a second LED 1244 visible to the user may be provided for user reference.

The outputs of optically controlled thyristor 1234 are connected to the cathode of second diode 1236 through a resistor 1246, and to the gate of SCR 816 (of the rectifier circuit) and the cathode of SCR 816 through a second resistor 1248. When thyristor 1242 is activated, and when winding 400 is generating a positive voltage relative to system 10 output, the voltage at the gate and anode of SCR 816 is substantially identical, thus activating SCR 816 and allowing current to flow from winding 400. Contrastingly, when thyristor 1242 is deactivated, the gate and cathode voltages of SCR 816 are different, thus deactivating SCR 816 and removing corresponding winding 400 output from system 10 output.

The output signal of comparator 1214 determines whether each winding 400 should be activated or deactivated. When the output signal of comparator is low (i.e. reference voltage $V_s$ is higher than the corresponding divider voltage), winding 400 is deactivated. Conversely, when the output signal of comparator is high (i.e. reference voltage $V_s$ is lower than the corresponding divider voltage), winding 400 is activated. If the system output voltage drops below reference voltage $V_s$, the voltage at each node in voltage divider drops accordingly. Consequently, the reference voltage may be higher than the divider voltage for a greater number of comparators, and more windings 400 are activated to compensate for the voltage drop. Similarly, if the system voltage exceeds reference voltage $V_s$, the divider voltages increase as well, so that more divider voltages may be higher than reference voltage $V_s$. As a result, one or more windings 400 may be deactivated to reduce system 10 output voltage.

In the present embodiment, control circuit 900 is suitably voltage regulated, i.e. the control circuit activates and deactivates the various windings to achieve the desired voltage. In addition, control circuit 16 may be current and temperature limiting, so that if either the current or the temperature exceeds a preselected threshold, control circuit 16 automatically reduces the number of activated windings 400, regardless of the voltage output. The current and temperature limiting functions diminish the likelihood of overloading or burning out components of generator unit 14. These functions could be varied, of course, to regulate the output according to any parameter, and limit output according to any others.

In addition, control circuit 16 may suitably be designed to alternate which windings 400 and BJTs 820 are activated and deactivated and the duration for which they remain activated. For example, to avoid overheating any individual winding 400, BJTs 820 may be activated and deactivated on a first in, first out (FIFO) basis. Thus, BJT 820 that has been activated for the longest time is the first to be deactivated as required. Similarly, BJT 820 that has been deactivated for the longest time is the first to be activated as required. As a result, none of the windings 400 remains activated significantly longer than any other winding 400 so that heat generation is distributed more or less evenly among windings 400.

Figure 14:
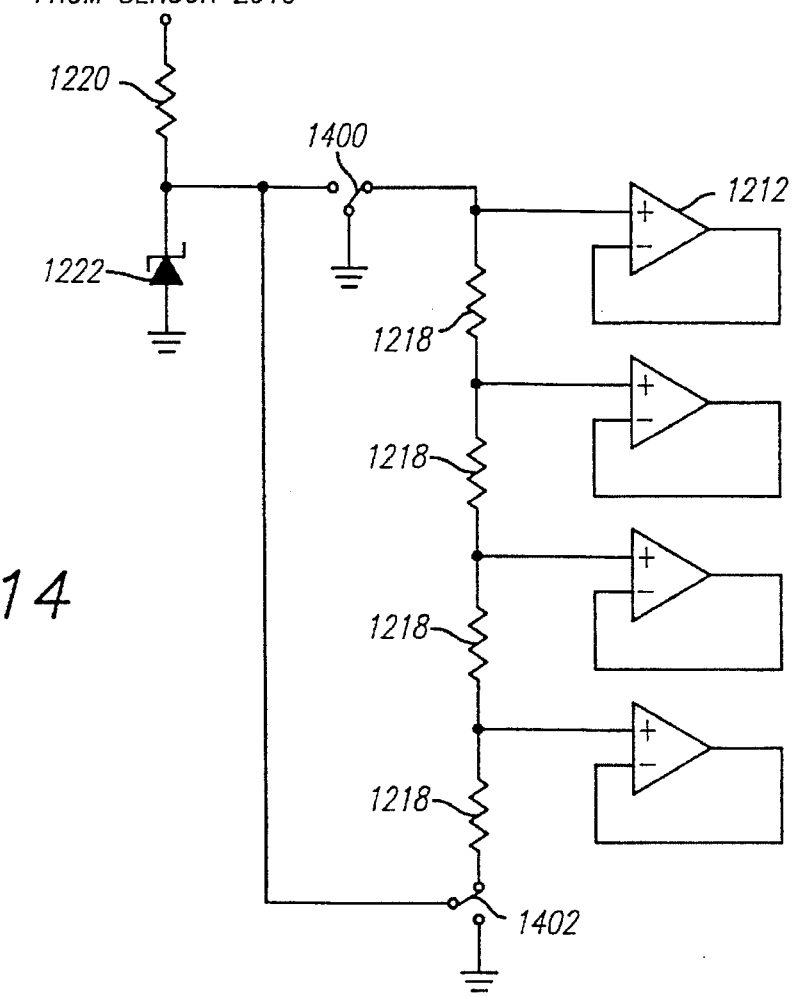
FIG. 14 is a schematic diagram of a voltage divider having switches for varying which windings are activated.

Alternatively, a third gate may be added to the SCR firing selection that selects the group to sequence. Every few seconds, the group may be changed to select a new group so that no single group overheats. According to another alternative, referring to FIG. 14, system 10 output voltage may be applied to the opposite end of voltage divider using switches 1400 and 1402. By periodically activating the switch, the activated windings 400 may be varied, thus effectively distributing heat among windings 400.

As previously noted, a stator winding control system in accordance with various aspects of the present invention can be utilized in a number of different applications and is of particular utility where a rotary source (e.g., engine) is driven over a wide range of RPMs, or in which voltage or current must be controlled or varied over a significant range. Examples of such applications include multi-mode welders, and generators and inverters operating over a wide range of rotor RPMs because of the nature of the power source, e.g., an inverter powered by a diesel engine utilized in a refrigeration truck, or as a result of throttle control employed to facilitate noise abatement and/or fuel efficiency.

Figure 15A:
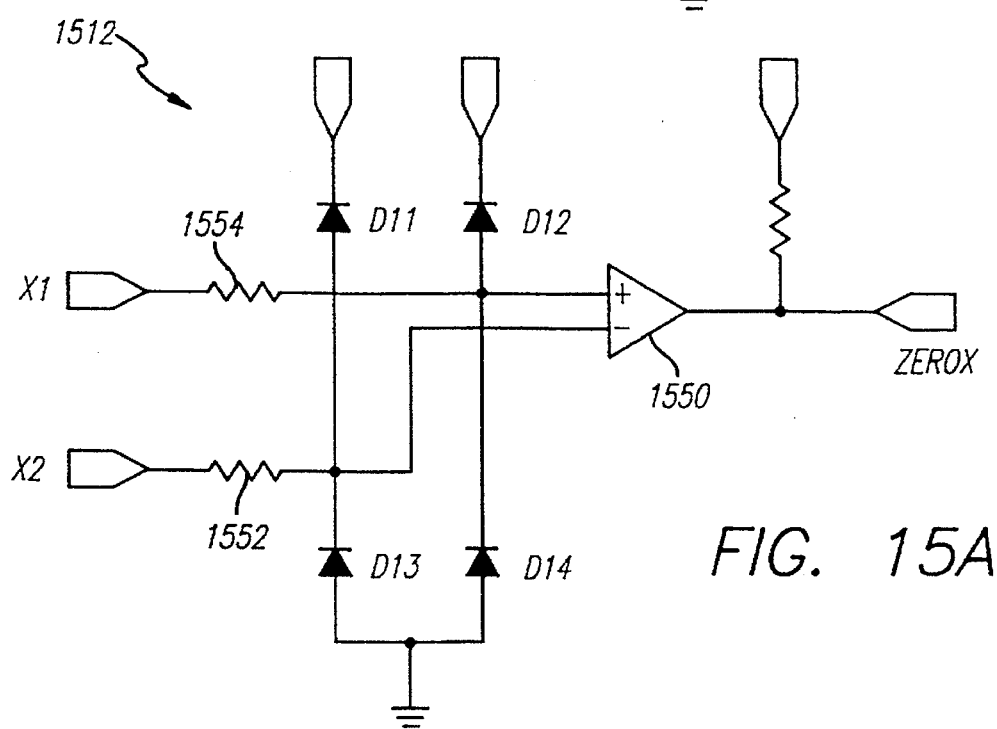
FIG. 15A is a schematic diagram of a zero crossing detector suitable for use in the system of FIG. 15.
Figure 15:
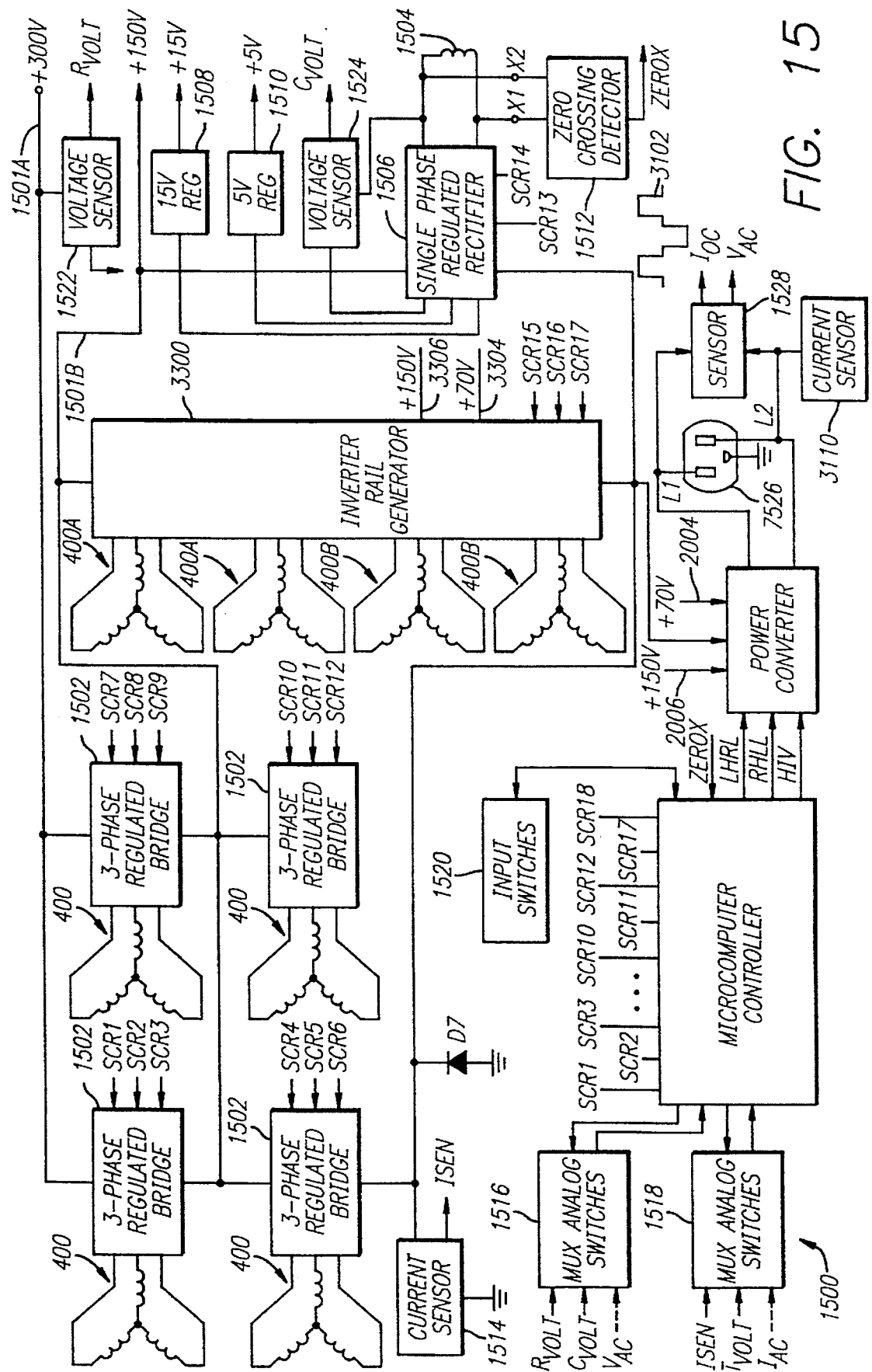
FIG. 15 is a block schematic diagram of a multi-coil system for generating a plurality of regulated DCrail voltages and an AC output.

Referring now to FIG. 15, a system 1500 for generating a plurality of regulated DC rail voltages responsive to a wide range of input drive RPMs, may be formed utilizing: a pre-determined number, e.g. four (4), of winding groups 400 to supply respective positive DC rails 1501A, 1501B; respective three-phase regulators (e.g., regulated rectifier bridges) 1502, one associated with each winding group 400; a single phase control winding 1504; a single phase regulator (e.g., regulated rectifier bridge 1506), cooperating with control winding 1504; respective conventional regulator devices 1508 and 1510 (such as, e.g., Motorola 78LXX series pass three lead regulator devices) to provide stable regulated DC outputs at designated levels (e.g., 15 volts, 5 volts); a suitable zero crossing detector 1512; a suitable microcomputer controller 1700; a suitable current sensor 1514; respective sets of conventional analog switches 1516 and 1518 (e.g., CD4055) (or a suitable analog multiplexer chip), operating under the control of microcomputer controller 1700; respective push button input switches 1520, analogous to switches 1122 of FIG. 11; and respective voltage sensors 1522 and 1524, e.g. voltage dividers, to generate indicia (Rvolt) of the DC rail and (Cvolt) control coil voltages at suitable voltage levels. Respective DC voltages of predetermined values e.g. 300 V and 150 V or 150 V and 75 V, are provided on positive DC rails 1501A and 1501B, relative to a negative rail 1501C (suitably floating relative to system ground, via a diode D7).

If desired, system 1500 can also include a suitable power converter (inverter) 3100 to generate an AC signal 3102 at the terminals L1, L2 of a conventional outlet 1526. In this connection, suitable sensor circuits 1528 for providing indicia of the voltage (Vac), and 3110 for providing indicia of the current (Iac), of output signal 3102 would also be provided. Converter 3100 may derive power from one or more of DC rails 1501A and 1501B. Preferably, however, an inverter rail generation system 3300 is provided to establish one or more independent inverter rails (3304, 3306).

Inverter rail generation system 3300, as will be more fully described, suitably comprises a separate set of one or more winding groups 400A, 400B on stator core 302 and cooperating three-phase rectifiers (e.g., regulated rectifier bridges and/or unregulated rectifier bridges), which do not contribute to the voltages on DC rails 1501A or 1501B, but rather establish separate, generally independent inverter rails (3304, 3306). Use of independent winding groups 400A, 400B and cooperating rectifiers to establish substantially independent DC voltage(s) to supply inverter 3100 facilitates concurrent operation of inverter and, e.g., welder operation.

Three-phase regulators 1502 may be any regulated three-phase regulator, e.g. three-phase SCR rectifier bridge, responsive to input control signals associated with the respective phases, and capable of accommodating the voltage and currents at which the system is intended to operate. For example, a three-phase regulated bridge similar to bridge 812, employing high power rating components, can be employed as bridge 1502.

To achieve generation of the desired voltages and current control, a predetermined number (e.g., 2) of regulators 1502 are connected in parallel and a predetermined number (e.g., 2) of groups of parallel-connected regulators 1502 are connected in series. Rotation of the rotor induces current in each of the windings of groups 400 (and inverter winding groups 400A and 400B). Controller 1700 provides signals to regulators 1502 to effectively connect or disconnect respective coils in the operative circuit to provide a desired level of current, and adjust the relative firing angles of the respective phases to control voltage output. Rotor and stator are designed such that the unit is capable of generating a DC output signal meeting certain criteria (and if inverter 3100 is employed, also an AC output signal meeting certain criteria) even at the lowest operational rotor RPM (e.g., idle speed). At the minimum operational speed (RPM), all (or at least most) of winding groups 400 (and 400A and 400B) would typically be connected in the operative circuit, and the regulator SCRs "full on" for maximum firing angle. The respective coils are then connected into or disconnected from the operative circuit to provide a desired level of current, and the SCR firing angles are varied to attain and maintain the desired output voltage at higher RPM.

Control signals for regulators 1502 and 1506, (and inverter 3100 and inverter rail generator 3300, if employed) are provided by microcomputer controller 1700. As will be discussed, controller 1700 is responsive to: signals from zero crossing detector 1512; signals indicative of the state of input switches 1520; and respective sensor signals, selectively applied to controller 1700 through analog switch sets (MUXs) 1516 and 1518. Sensor signals suitably include: a signal (Rvolt) indicative of the level of high DC rail 1501A; a signal (Cvolt) indicative of the level of the voltage across control coil 1504; a signal (ISEN) indicative of the output current from current sensor 1514; a signal (Tvolt) indicative of the temperature of the unit, from temperature sensor 704 (FIG. 7) and a signal (Vac) indicative of the average voltage of the AC output signal of power converter 3100.

Indicia (Rvolt) of DC rail voltage and indicia of control coil voltage (Cvolt) are provided by voltage sensors 1522 and 1524, respectively, suitably signals having a voltage (within appropriate ranges) indicative of the measured voltage. Sensors 1522 and 1524 may be any device capable providing a signal (e.g., voltage within appropriate ranges) indicative of the magnitude of the measured voltage.

Indicia (ISEN) of DC output current is provided by current sensor 1514, suitably a signal having a voltage indicative of the current output of the system. Current sensor 1514 may be any device capable providing a signal (voltage within appropriate ranges) indicative of current magnitude. In high current applications, it is advantageous to utilize a Hall effect sensor to avoid power loss. In lower current systems, the voltage generated by current flow through a small resistor (e.g., 0.1 ohm) may be measured to develop indicia of the current.

Indicia (Vac) of the voltage of output signal 3102 is provided by sensor circuit 1528. Sensor circuit 1528 may be any device capable of suitably generates a signal (e.g., voltage within a suitable range) proportional to the average voltage of output 3102. For example, a suitable sensor circuit 1528 may be formed of: a single phase diode bridge connected to output terminals L1 and L2; a suitable low pass filter circuits; a Zener diode; and a voltage divider. Output signal 3102, as provided at output terminals L1 and L2 is applied to the bridge to generate an average DC signal. The DC signal is filtered, smoothed and limited by the filters and Zener diode, and applied to the voltage divider to generate a signal proportional to the average voltage of output 3102. The signal is applied to analog multiplexer (switch set) 1516 for selective application to pin 8 of micro-computer 1102, and comparison against the reference ramp.

Figure 31:
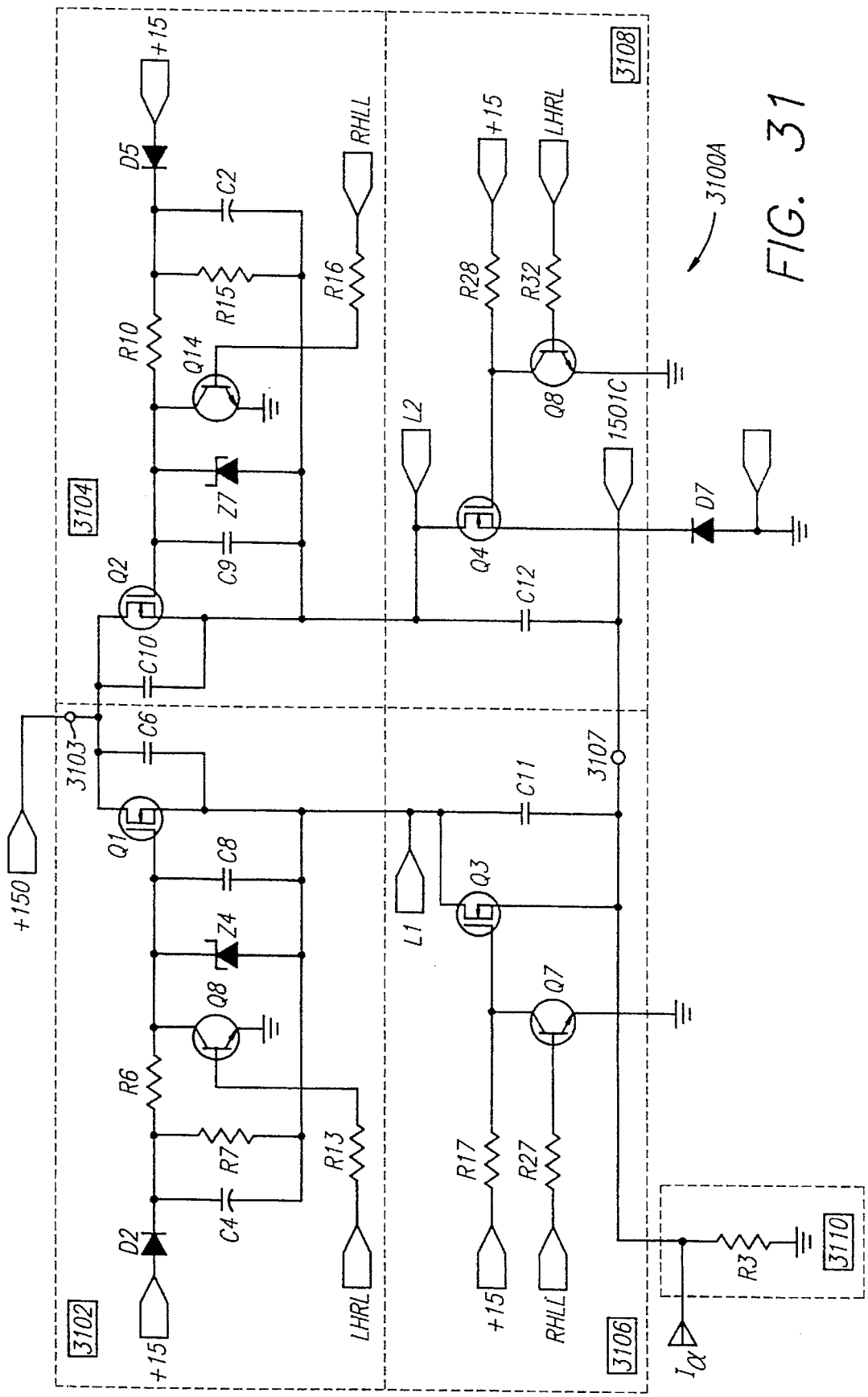
FIG. 31 is a schematic diagram of a power converter suitable for use in the system of FIG. 15.

Indicia (Iac) of the AC output current level of signal 3102 is provided by current sensor 3110 to analog MUX 1518. Current sensor 3110 may be any device capable providing a voltage indicative of current. In typical systems, the Iac voltage may be generated by current flow through a small resistor (e.g., 0.1 ohm) R3 (FIG. 31). In high current applications, it is advantageous to utilize a Hall effect sensor to avoid power loss.

Control winding 1504 is suitably wound concurrently on stator core 302 with a pre-determined one of the phases (e.g., phase A) of one of the winding groups 400. Although physically wound with a winding group 400, control winding 1502 is independently controlled (by regulator 1506), and is operatively connected in the system irrespective of the status of the winding group 400 with which it is wound.

Control winding 1504 cooperates with regulator 1506 and regulator devices 1508 and 1510 to generate stable supply voltages (e.g., 5 volts, 15 volts) for the various circuitry. Regulator 1506 may be any suitable regulated single phase regulator, e.g. SCR rectifier bridge, of appropriate power rating. In applications where rotor RPM varies over a substantial range, a regulated rectifier is preferable to an unregulated bridge to accommodate the range of induced voltages, and assure suitably stable supply voltages over the entire range of operation. As with respect to windings 400, the parameters of coil 1504 are chosen such that it generates a sufficient current to generate the supply voltages at the minimum operational speed (RPM), e.g. at idle speed, with regulator SCRs "full on". The SCR firing angles are then varied to maintain the desired control voltage at higher RPM. In applications where the expected range of rotor speeds is sufficiently narrow, an unregulated rectifier may be used.

Control winding 1504 also provides a signal from which indicia of phase can be derived. Since control coil 1504 is physically wound with one of the phases of a winding group 400, winding 1504 is in phase with the particular group phase winding. Accordingly, zero crossings in the signal induced in coil 1504 are concurrent with those in the group phase winding with which control winding 1504 is wound. Accordingly, the indicia of zero crossings generated by zero crossing detector 1512, with respect to the control winding voltage, can be utilized to derive the relative phases of the respective windings of groups 400, 400A, and 400B (since physical disposition is fixed, the respective corresponding phase windings of each group are in phase with each other).

Referring to FIG. 15A, a suitable zero crossing detector 1512 comprises a suitable comparator 1550, with the respective inputs thereof connected across control coil 1504 (at terminals X1 and X2) through respective resistors 1552 and 1554. The inputs are suitably clamped by diodes D11, D12, D13, and D14, to prevent the inputs from exceeding supply voltages of the comparator. When the voltage at input X1 exceeds input X2, comparator 1550 will generate a logic high output. Conversely, when input X1 is less than the input X2, comparator 1550 will generator a logic low output. Accordingly, zero crossings are signified by transitions in the output (ZEROX) of comparator 1550. To transition between supply voltage levels of different components of the system, comparator 1550 is suitably an open drain or open collector device; when a low logic output is generated, the output is effectively connected to ground. When a high level output is indicated, the connection to ground is opened and the output effectively connected to a power supply of the desired logic high level.

Microcomputer 1700 generates suitable control signals (SCR1–SCR12) to 3-phase regulators 1502 to generate the desired output, and (SCR13–SCR14) to regulator 1506 to ensure the availability of a stable power source for the various components of the system. In addition, when inverter 3100 is included in the system, controller 1700 generates switching control signals (LHRL, RHLL, and, in various embodiments, HIV) to power converter 3100. Controller 1700 also suitably generates switching control signals (e.g., SCR15, SCR16, SCR17, SCR18) to inverter rail generator 3300, when employed.

Power converter 3100 (in the preferred embodiment, in effect, a variable frequency inverter) generates an output signal 3102 at terminals L1 and L2 of a conventional outlet 1526 with a predetermined waveform simulating (e.g., having the same RMS value as) the desired AC signal (e.g., 120 v 60 Hz in the U.S.; v 50 Hz in Europe). Referring to briefly to FIG. 16A, a sine wave is simulated by generating first and second pulses of opposite polarity 1602, 1604, with an intervening deadtime 1606 from the trailing edge of the first pulse at time T1, to the leading edge of the second pulse at time T2. The RMS value of the signal is a function of dead time 1606. Control of the dead time in relationship to the voltage levels provides an RMS value approximately equal to that of the desired sine wave.

A desired sine wave output can be more closely approximated by shaping the waveform of output signal 3102, e.g. using stacked sets of a predetermined number of pulses. For example, referring to FIG. 16B, a sine wave is more closely simulated by generating first and second base pulses of opposite polarity 1610, and 1612, with an intervening deadtime 1615 from the trailing edge of the first pulse 1610 at time T1, to the leading edge of second pulse 1612 at time T2. A third pulse 1614 is provided effectively stacked on pulse 1610, with a leading edge at time T3 and trailing edge at time T4. A fourth pulse 1616 is similarly provided effectively stacked on pulse 1612. Control of the pulse widths, and dead time in relationship to the voltage levels provides an RMS value approximately equal to that of the desired sine wave. The larger the number of pulses the more closely the sine wave can be simulated.

Since the AC signal is developed synthetically by power converter 3100, it is independent of the RPM of engine 12. Accordingly, power converter 3100 can be adjusted to provide full power at various predetermined frequencies, e.g., 60 Hertz in the United States, and 50 Hertz in most European countries.

The use of a variable frequency inverter is particularly advantageous in a number of respects. By varying the frequency of the output as a function of load current draw to accommodate extraordinary transient demands from loads, unit 10 is made capable of operating with much larger devices than would typically be the case. Particularly, it has been determined that the current required to start a large motor, such as, for example, the refrigeration compressor on an air conditioner, is much greater than the current required to maintain operation of the motor once it has been started. When the load, e.g. motor, draws a current higher than the rated output of the system, the DC rail voltage applied to power converter 3100 tends to drop. It has been determined that by reducing the frequency of the AC output signal as a function of, e.g. proportionately with, the reduction in voltage, unit 10 can be used to start, and maintain in operation, motors that would typically require a much larger generator. Lowering the frequency at the applied signal effectively lowers the operating RPM of the motor, e.g. compressor, to be started. This lowers the load on the motor and therefore decreases the current required to start the motor. The frequency can then be increased, increasing the motor RPM to the designed operating speed. For example, when the voltage drops below a predetermined level, e.g. approximately 110 volts, frequency is decreased, preferably linearly tracking voltage down to about 30 hertz and 50 volts. Once the motor is running, the current drawn by the motor reduces, the DC rail voltage rises, and the normal operating frequency is resumed. For example, 2 kilowatt generator in accordance with the present invention is capable of starting and maintaining a 13,000 BTU air conditioner which, previously, in order to accommodate the starting loads, required a 4 or 5 kilowatt generator. An implementation of frequency adjustment as a function of load current draw to accommodate extraordinary transient demands from loads, is described in parent-in-part U.S. patent application Ser. No. 08/306,120, filed Sep. 14, 1994, entitled LIGHT WEIGHT GENSET, incorporated herein by reference.

Figure 17A:
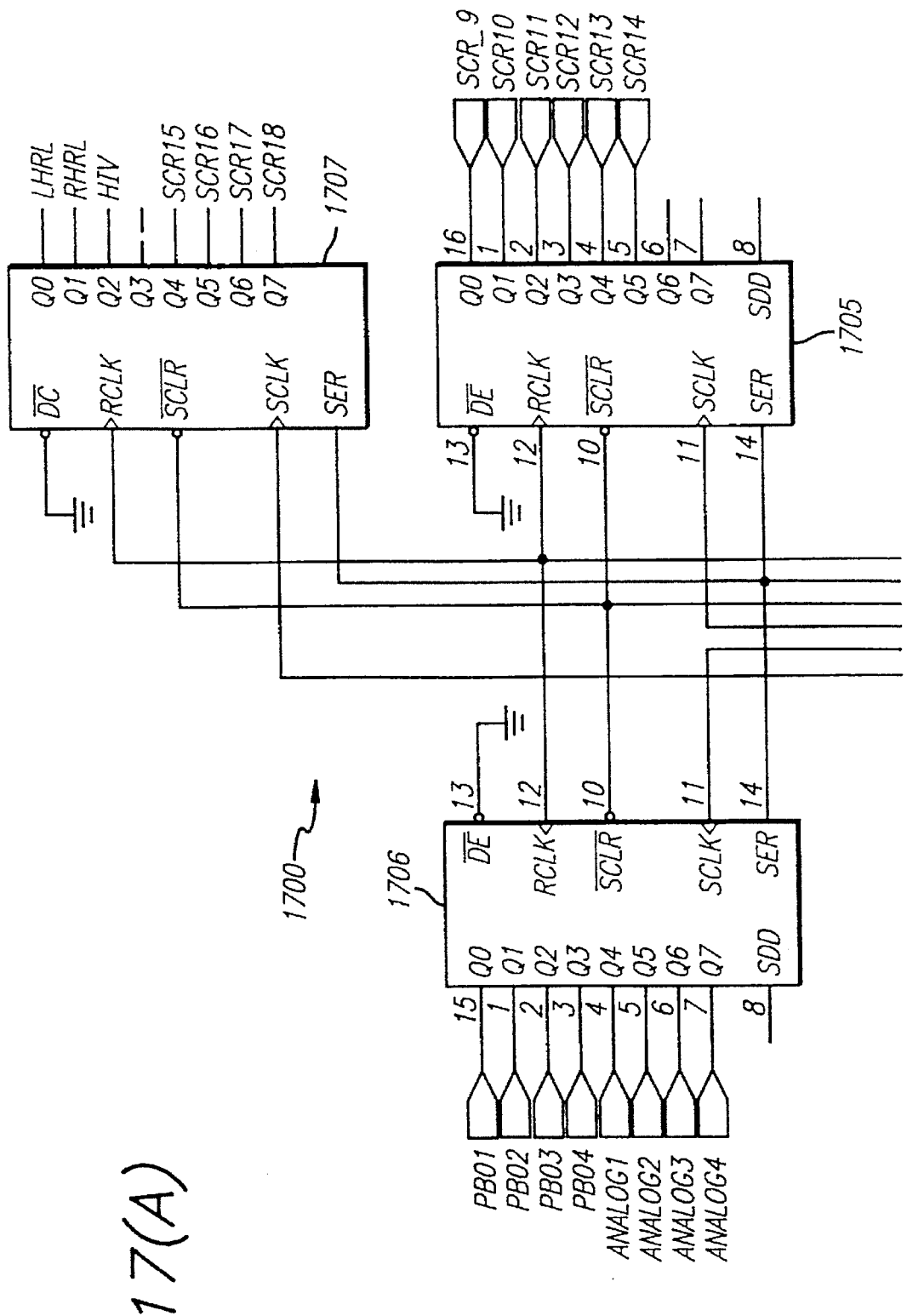
FIG. 17 is a schematic diagram of an alternative microprocessor-based digital control circuit.
Figure 17B:
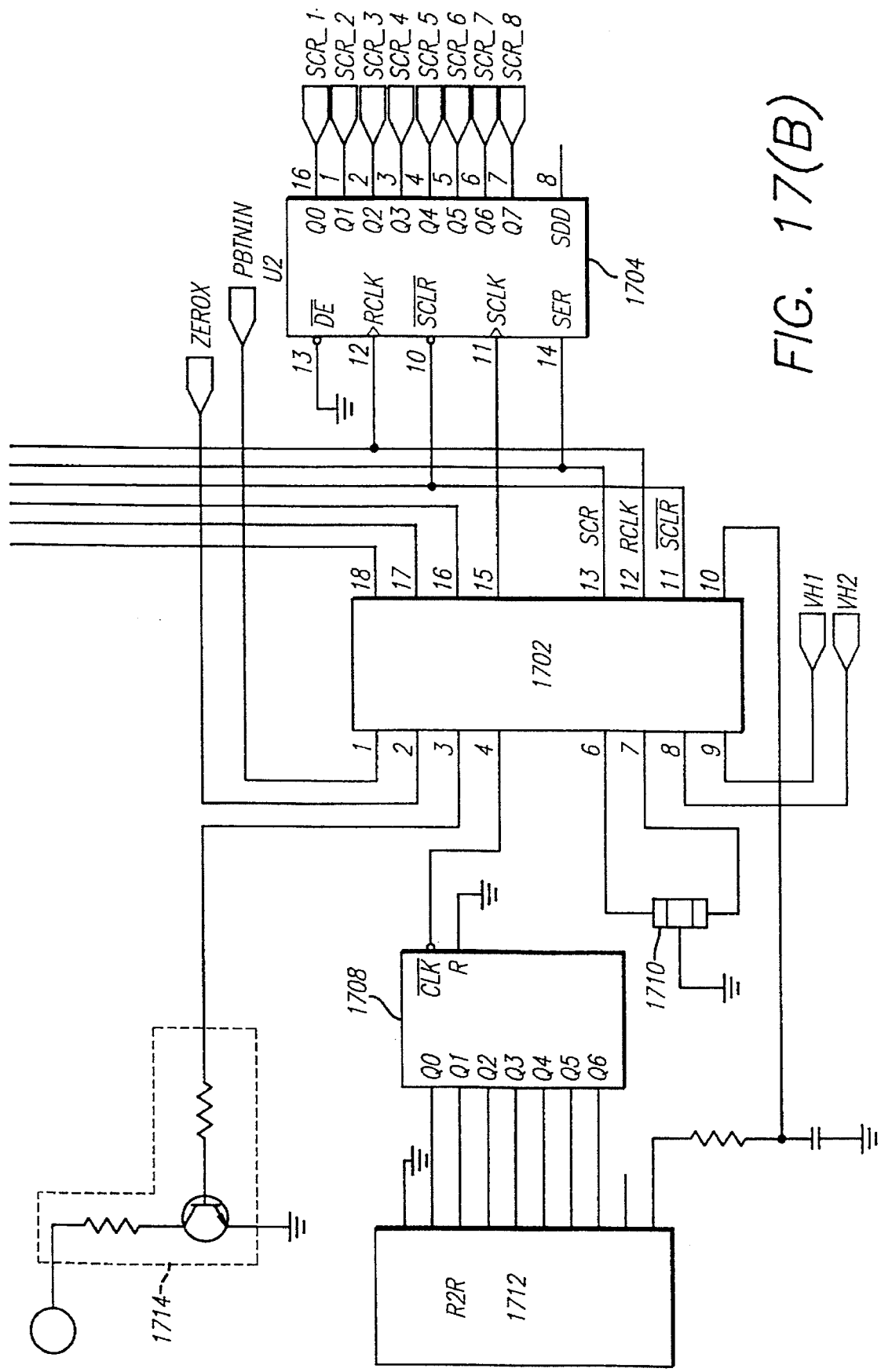

Conversely, since the speed of engine 12 can be lowered without reducing frequency, the speed of engine 12 can be varied as a function of output drawn. Thus, varying the speed of the engine as a function of load (DC or AC) to provide decreased noise and increased fuel economy is accommodated without adversely affecting inverter operation. Voltage feedback signal Vac, indicative of the signal drawn at outlet 1526, can be utilized in the same manner as the Rvolt signal (indicative of DC rail voltage) as the control reference for the pulse width of the signal provided to driver 1714 (FIG. 17).

Figure 32:
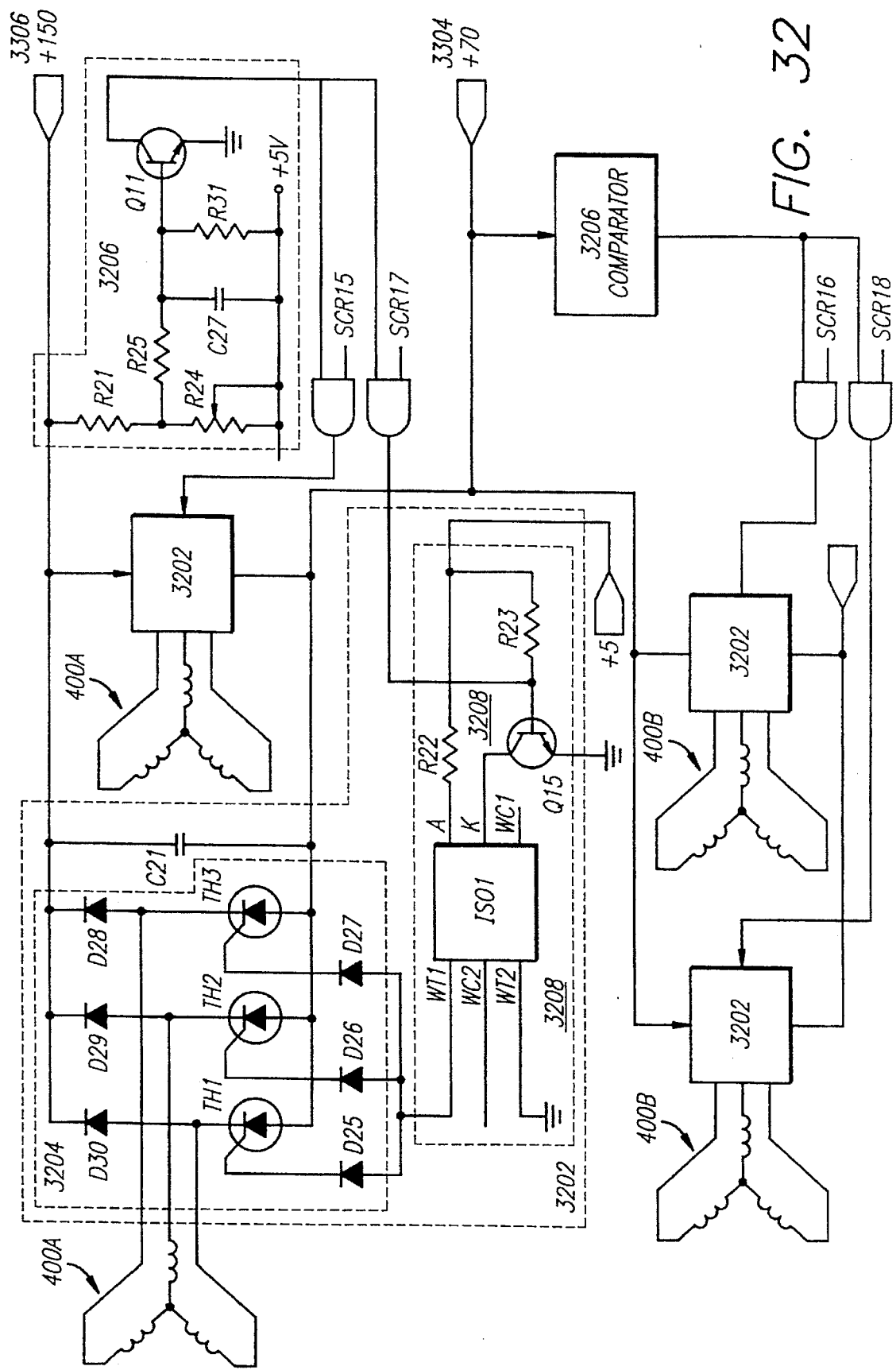
FIG. 32 is a block schematic diagram of an inverter rail generator suitable for use in the system of FIG. 15.
Figure 33:
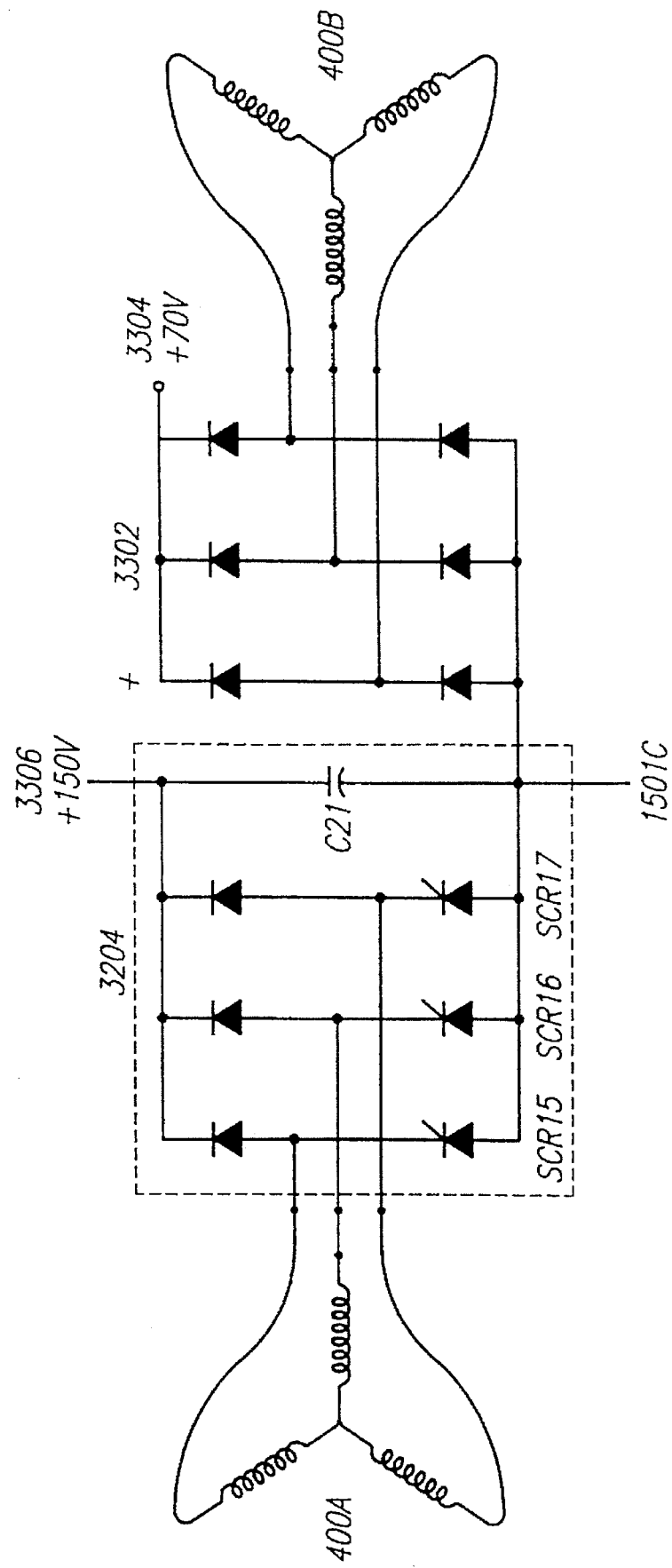
FIGS. 33 and 34 are a block schematic representations of alternative inverter rail generators suitable for use in the system of FIG. 15.
Figure 34:
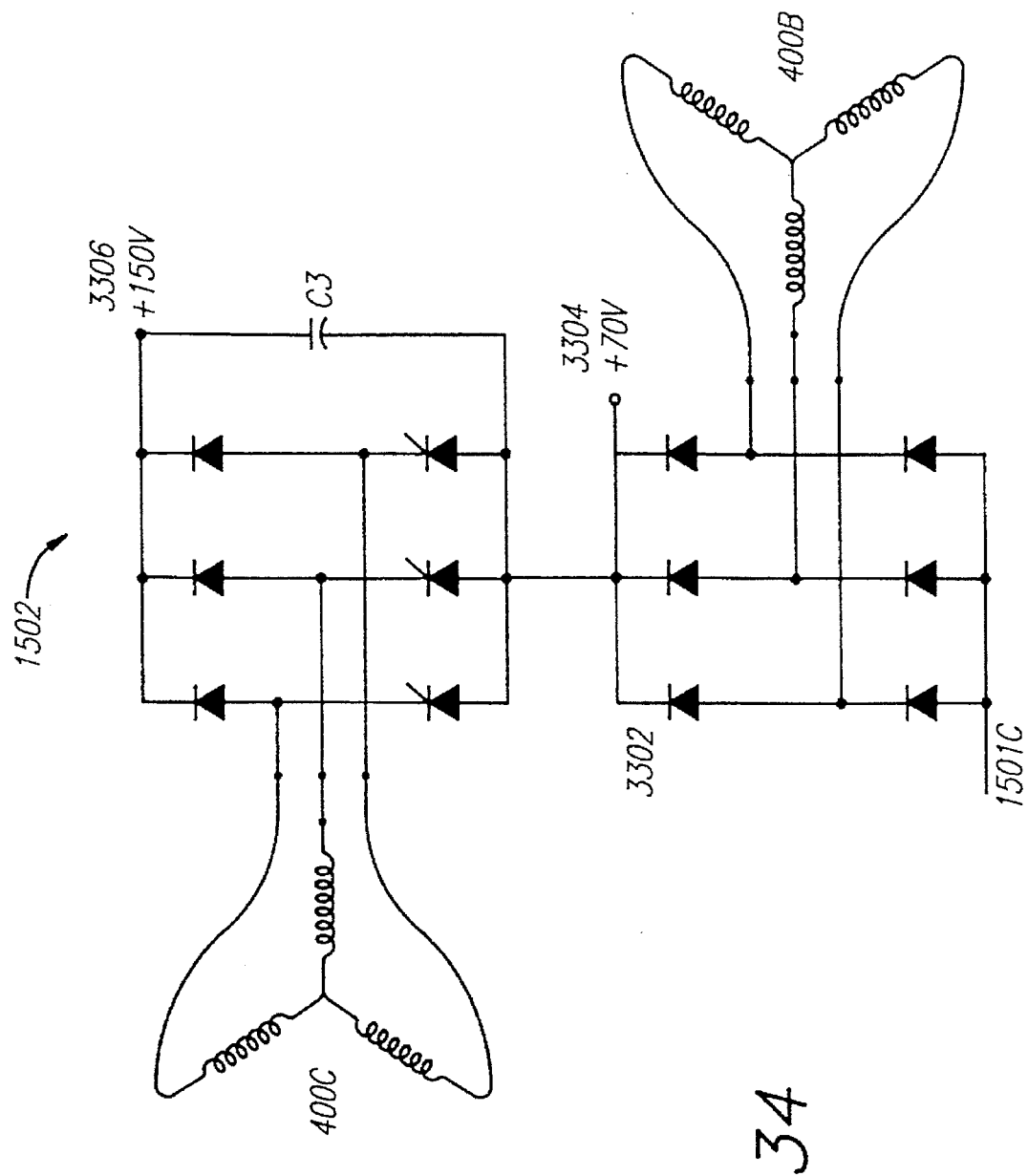

Inverter rail generation system 3300, as will be more fully described in conjunction with FIGS. 32, 33, and 34, suitably comprises a separate set of one or more (e.g., 4) winding groups 400A, 400B and cooperating three-phase rectifiers (e.g., regulated rectifier bridges and/or unregulated rectifier bridges), which do not contribute to the voltages on DC rails 1501A or 1501B, but rather establish separate, generally independent inverter rails (3304, 3306). Use of independent winding groups 400A, 400B and cooperating rectifiers to establish substantially independent DC voltage(s) to supply inverter 3100 facilitates concurrent operation of inverter and, e.g., welder operation.

For example, a controller similar to controller 1100 (FIG. 11) can be employed, with the respective sensor inputs selectively applied through analog switches 1516 and 1518 to pin P31 of microprocessor 1102. The zero crossing signal (ZEROX) would be applied to microcomputer 1102 through bidirectional latch 1120. Additional latches would be included in data bus 1126 to selectively provide control signals to the analog switches, and to the additional SCRs.

Other microcomputer controller configurations can also be employed. For example, referring to FIG. 17, an alternative microcomputer controller 1700 comprises a suitable microcomputer chip 1702; a pre-determined number of suitable eight-bit, serial input, latched parallel output registers (serial input counters) 1704, 1705, 1706 and 1707, such as 74HC595 devices; a conventional seven stage counter 1708; a suitable ceramic oscillator 1710 providing a clock signal at pre-determined frequency, e.g., 8 MHz, to microcomputer 1702; and a resistive ladder 1712, analogous to resistive ladder 1104. If desired, circuit 1700 can also include a suitable throttle control driver 1714.

Microcomputer 1702 may be a conventional microcomputer chip including internal counters, registers, random access memory (RAM) and read only memory (ROM). The registers may be separately addressable hardware registers or may be implemented as locations in RAM. Conversely, the microcomputer RAM may be implemented as separately addressable hardware registers. Preferably the microcomputer chip includes also internal comparators capable of generating interrupt commands in response to external signals. External comparators, providing inputs to interrupt ports of the microcomputer chip can also be utilized.

Microcomputer chip 1702 suitably performs a sequence of operations in accordance with a program maintained e.g. in ROM. The operations are effected using the internal processor, registers and comparators of (or cooperating with) the chip.

In certain microcomputer chips the amount of random access memory is relatively limited. Such microcomputers typically include a pre-determined number of fixed function processor registers, and a plurality of individually addressable registers that effectively serve as RAM. In some instances, however, the registers are divided into nominal groups (pages) that are accessible only on a mutually exclusive basis. In general, each routine effected by the microcomputer operates within a particular page of registers. However, when the routine requires a data value (variable) stored in a different page of registers, since the respective pages of registers can be accessed only on a mutually exclusive basis, a page change process must be effected. For example, the desired value is placed in a buffer included among the fix processor registers (particularly a stack), a page change process effected to return to the original page, and the data value transferred from the buffer (stack) to the register on the original page (the transfer process is referred to as passing data between pages).

Certain variables, referred to herein as universal variables, are so widely accessed, that they are routinely passed to a new page when it is accessed. Each of the universal variables is, in effect, assigned a dedicated register in each of the various pages of register. Generally, a plurality of universal variables are involved and the data passing is effected employing a last-in, first-out (LIFO) stack.

For example, microcomputer 1702 is suitably a Zialog Z86E04 chip which includes a bank of fixed function registers, at least one processor defined fixed function stack, and 16 pages of 16 addressable registers each. The respective pages of memory, however, are accessible only on a mutually exclusive basis, and conventional page change processes are effected as necessary.

In control circuit 1700, microcomputer 1702 is suitably configured to include two internal comparators, which compare respective selected sensor voltages (provided at microcomputer pins 8 and 9, respectively) to a common reference signal applied at pin 10.

The common reference signal is suitably a controlled substantially linear (albeit stepped) ramp voltage ranging from 0 to 5 volts, generated by applying an incremented count to resistive ladder 1712 (as in the case of ladder 1104 of control 1100). The digital count applied to ladder 1712 is suitably generated by counter 1708, in response to a clock signal from microcomputer 1702 (pin 4). The voltage across resistive network 1712 is filtered and applied at pin 10 of microcomputer 1702.

To facilitate sensing a plurality of external parameters with a limited number of microcomputer comparator input terminals, the sensor outputs are selectively applied to the comparator inputs through analog switch sets 1516 and 1518 (FIG. 15). The sensed parameters are divided into a number of groups equal to the number of available microcomputer inputs, e.g., two for the present embodiment, pins 8 and 9 of microcomputer 1702 (FIG. 17). Analog switches 1516 and 1518 are selectively actuated, under control of microcomputer 1702 to apply a selected one of the group of parameters to the associated microcomputer input. Analog multiplexer chips (e.g., 8 to 1) can be utilized to accommodate larger numbers of sensor inputs. Switch sets (MUXs) 1516 and 1518 apply each parameter in the associated group to the microcomputer input sequentially, in successive measurement cycles. In the present embodiment, indicia of the DC rail voltage (Rvolt) from sensor 1522, and indicia of the voltage across control coil 1504 (Cvolt) from sensor 1524 are grouped together through switch set 1516, and selectively applied to microcomputer pin 8. Indicia of output current ISEN from sensor 1514, and indicia of the temperature of the unit (Tvolt) from sensor 704 (FIG. 7) are grouped together and selectively supplied through switch set 1518 to microcomputer pin 9. If system 1500 includes inverter 3100, signals Vac, indicative of the load on (average voltage of) inverter 3100 and Iac, indicative of the current output of inverter 3100 are applied as part of the groups associated with pins 8 and 9, respectively.

Comparisons of the selected sensed parameter indicia against the ramp signal are employed to generate digital indicia of the parameters; at the point when the reference voltage ramp reaches the parameter indicia, an accumulated count (AtoD), paralleling the contents of counter 1708 that generate the ramp, is indicative of the value of the parameter. As will be explained, the capture of the parameter value is effected by initiating an appropriate interrupt.

Microcomputer 1702 cooperates with serial-input-parallel-output registers 1704–1707 to generate control signals to the SCRs of regulators 1502 and 1506, analog switches 1516 and 1518 and push button input switches 1520, and an inverter circuit, if employed. One of the output pins (e.g., pin 13) of microcomputer 1702 may be effectively employed as a serial data bus; a desired bit pattern is serially provided on the line and applied at the data inputs of all of the output registers. Serial data clock signals (SCLK) are selectively provided at respective output pins (e.g., 15–17) synchronously with the serial data. The serial data clock signals are provided only at the output pins corresponding (coupled) to a selected one of registers 1704–1707 to select, and load the data into, the appropriate register. A subsequent control signal (RCLK) is provided at pin 12 of microcomputer 1702 and applied concurrently to each of registers 1704–1706 to load the accumulated pattern into an output latch, and hence, apply the bit pattern as control signals to the designated recipient devices. Each of the serial counters is also receptive of a disable signal from microcomputer 1702.

For example, serial-input-parallel-output registers 1704 and 1705 cooperate with microcomputer 1702 to generate the control signals SCR1–SCR14 to the various control SCRs of three-phase regulators 1502 and single phase regulator 1506. A data bit pattern corresponding to the desired states of SCRs 1–8 is provided serially at pin 13 of microcomputer 1702. Serial clock input pulses (SCLK) are concomitantly generated at the microcomputer output pin (e.g., pin 18) corresponding to serial register 1704, to shift the bit pattern into register 1704. Once register 1704 has captured the serial bit pattern, a latch output signal (RCLK) is generated at pin 12 of microcomputer 1702. The latch output signal (RCLK) causes each of registers 1704–1706 to load the bit pattern contained in the serial input register into the output latch of the device, and hence, apply the bit pattern as control signals to the corresponding devices, in the case of counter 1704, SCRs 1–8. The latch output signal (RCLK) is concurrently applied to each of registers 1704–1706. However, only the input shift register of counter 1704 accumulated any new data; the contents of the input registers of the other counters remained unchanged.

Analogous processes are effected: with respect to counter 1705 (utilizing a serial clock signal generated at microcomputer pin 16) to provide the control signals to SCRs 9–14; with respect to counter 1706 (utilizing a serial clock signal generated at microcomputer pin 17) to provide the excitation signals (PB01–PB04) to input switches 1520 and to provide control signals (ANALOG1–ANALOG4) to analog switches 1516 and 1518 to select the desired sensor input; and, in applications where an inverter is employed, with respect to counter 1707 (utilizing a serial clock signal generated at microcomputer pin 18) to provide the control signals to inverter circuit 3100.

Input push button switches 1520 (FIG. 15) are employed to provide operator input to the system with respect to, e.g. desired mode of operation, desired output voltage, and desired output current. For example, in the context of a multi-mode welder, push button switches 1520 would include: a welding-mode button, which would be sequentially depressed to sequence through the different types of welding operations; an increment button, which is depressed to increment the target value for current or voltage, depending upon the chosen operational mode; and a decrement button, which is depressed to decrement the target value of current or voltage depending upon the selected mode. Briefly, input switches 1520 are each connected to a respective output pin (PB01–PB04) of register 1706, and, connected in common, to a push button input line (PBTNIN) to microcomputer 1702 (pin 1, FIG. 17). Serial data and concomitant clock signals are generated by microcomputer 1702 to generate a bit pattern in register 1706 that provides a logic high signal on a particular one of switches 1520. The state of input signal (PBTNIN) is read at pin one of microcomputer 1702. If the particular switch corresponding to the logic high bit is closed, a high level PBTNIN input signal will be provided to pin 1 of microcomputer 1702. If the switch is not closed, the PBTNIN signal will be logic low. The state of a bit corresponding to the designated switch in a register (PBNT) is responsively adjusted, as appropriate. The serial data applied to register 1706 is varied to cycle through each input switch 1520 in sequence.

Referring to FIG. 18, microcomputer 1702 suitably includes among the fixed function registers: a timer mode register 1802, respective timers, timer zero (T0) 1804 and timer one (T1) 1806; respective pre-scalers (PRE0, PRE1) 1808, 1810 employed to set the timer output intervals; respective registers 1820, 1822, 1824 employed to control the mode (input or output) of the respective device I/O ports (P2M, P3M, P01M); an interrupt mask register (IMR) 1826 for enabling or disabling the respective interrupts; an interrupt priority register (IPR) 1828 for setting relative priority of interrupts; an interrupt request register (IRQ) 1830 for reading and controlling the status of the interrupts; a stack pointer (SPL) 1832 for controlling access to the fixed function stack; a register pointer (RP) 1834 for identifying the currently accessible page of registers; and a register 1836 of various flags.

Microcomputer 1702, as will be more fully explained, develops and/or maintains a number of variables in RAM. As noted above, depending upon the particular microcomputer chip employed as microcomputer 1702, separate hardware registers may be utilized for each variable. If the registers are organized in separate pages, conventional universal variable and page changing techniques would be employed. Referring to FIG. 19, exemplary variables include:

TABLE 1

| VARIABLE | REGISTER | CONTENT |
|---|---|---|
| AtoD | 1902 | Analog to digital AtoD conversion count, indicative of the reference ramp voltage |
| Rvolt | 1904 | Indicia of the average DC high rail voltage |
| Cvolt | 1906 | Indicia of the voltage generated by control winding 1504 |
| Vac | 1907 | Indicia of the voltage generated by at AC terminals L1, L2 |
| ISEN | 1908 | Indicia of the current output |
| Tvolt | 1909 | Indicia of the temperature of the unit from temperature sensor 704 |
| Iac | 1912 | Indicia of the AC current output from sensor 3110 |
| RPM | 1912 | Count indicative of the instantaneous phase of the rotor cycle; incremented every Timer 0 Interrupt (125 microseconds); reset upon zero crossing after updating winding firing phase counts |
| POINT | 1920 | Indicia of the particular input to the microcomputer comparators, i.e., which of analog switches 1516 are actuated |
| SCR1–8 | 1922 | 2-byte SCR Control word containing a bit pattern indicative of the desired status of the respective SCRs corresponding to each phase and control winding. 1st byte of the SCR control word SCRs 1–8; 2nd byte of the SCR control word for SCRs 9–14 |
| SCR9–14 | 1924 | |
| INVCTRL | 1925 | Inverter control byte; lower nibble contains bits corresponding to switching control signals (LHRL, RHLL, HIV) and upper nibble contains enable bits for the respective inverter winding groups 400A, 400B |
| SCRLEN | 1926 | SCR Enable word: Enable registers for SCRs 1–8 and SCRs 9–14, respectively. Contains a pattern indicative of the particular windings 400 desired to be operative in the system |
| SCRHEN | 1928 | |
| PHAZ1CNT | 1930 | Phase Counts; count indicative of relative firing phases of the phase one, phase 2, and phase 3 windings. Phase counts 1930–1934 are, in effect, count down timers set to establish the firing angle for each of the respective phases by establishing a count corresponding to the zero crossing point for the phase, minus a phase factor offset |
| PHAZ2CNT | 1932 | |
| PHAZ3CNT | 1934 | |
| CNTRLCT | 1936 | The count indicative of the firing phase of control winding 1504 |
| Rvolt1–Rvolt8 | 1938 | Respective arrays of 8 locations |

TABLE 1-continued

| | | |
|---|---|---|
| Cvolt1–Cvolt8 | 1940 | each, containing successive measurements of Rail voltage, control winding voltage, and AC output voltage. The Rvolt, Cvolt and Vac arrays are preferably interleaved to facilitate relative addressing |
| Vac1–Vac8 | 1941 | |
| FLAG ONE | 1942 | Process flag register |
| byte | 1942bits 6,7 | Used in connection with the serial output of the SCR control word and inverter control byte to develop the control signals for the SCR's and inverter; identifies which byte (1922 or 1924 or 1925) is being operated upon |
| 1st cycle | 1942bit5 | Signifies that any initial partial cycle has been completed and a RPM count started at zero crossing is indicative of rotor cycle phase |
| ½ cycle | 1942bit4 | Indicates history of zero crossing signal to identify negative going zero crossing (180 degrees) |
| I mode | 1942bit3 | Indicates selection of current mode of operation |
| V mode | 1942bit2 | Indicates selection of voltage mode of operation |
| INC | 1942bit1 | Indicates that the increment push button has been depressed |
| DEC | 1942bit0 | Indicates that the decrement push button has been depressed |
| MODEREG | 1943 | Indicates the operational mode of the system |
| PBTN | 1944 | Push Button Register with bits indicative of the state of push buttons 1520 |
| OLDPBTN | 1946 | Push Button Memory; indicia of the prior states of the respective push buttons |
| PBTNCT | 1948 | Push Button Count Register: a count indicative of the sampling cycle of push buttons |
| TPW | 1950 | Throttle Pulse Width; a count indicative of the desired width of the throttle pulse |
| TPWCNT | 1951 | Count controlling throttle state |
| Vtarget | 1952 | Indicia of the desired rail output voltage |
| Itarget | 1954 | Current target; indicia of the desired current level |
| PHZFTR | 1956 | Phase offset; phase factor subtracted from the zero crossing to establish the firing angles of the SCRs in regulators 1502 and control the rail voltage |
| CPHZFTR | 1957 | Phase offset; phase factor subtracted from the zero crossing to establish the firing angles of the SCRs in single phase regulator 1506 and control the supply voltages |
| OUTPUT SHIFTREG | 1958 | Register that generates serial output on pin 13 of microcomputer chip 1702 |
| SHIFTCNT | 1960 | A count indicative of the shifting position of SHIFTREG 1958 |
| AC CNT | 1962 | Count representative of the cycle (instantaneous phase) of AC output signal 3102 of inverter 3100 |
| T1 | 1964 | A count indicative of the trailing edge (T1 on FIG. 16) of the foundation switching pulses |
| T2 | 1966 | A count indicative of a half cycle of the output frequency of inverter 3100 |
| T3 | 1968 | A count indicative of the leading edge of the HIV step |
| T4 | 1970 | A count indicative of the trailing edge of the HIV step |

In the preferred embodiment, microcomputer 1702 is interrupt driven; various interrupt signals are generated in response to pre-determined to effect predetermined functions. For example, the interrupts set forth in the following Table 2 are generated in the preferred embodiment:

TABLE 2

| INTERRUPT | TRIGGER | EFFECT |
|---|---|---|
| IRQ0 | Reference ramp voltage at pin 10 exceeds sensor voltage applied at microcomputer pin 8 (comparator 1) | Update measurement of sensor output voltage provided by first set of analog switches 1518 to pin 8 (Rvolt or Cvolt). |
| IRQ2 | Reference ramp voltage at pin 10 exceeds sensor voltage applied at microcomputer pin 9 (comparator 2) | Update measurement of sensor output voltage provided by second set of analog switches 1518 to pin 9 (ISEN or Tvolt). |
| IRQ4 | Timer 0 time out (e.g., every 130 μsec) | Selectively generate SCR control signals; update firing angles for SCRS, update inverter switching control signals |
| IRQ5 | Timer 1 time out (e.g., every 8.2 msec) | If in current mode: adjust firing angle of SCRs to vary voltage to maintain constant current value. If in voltage mode: vary number of winding groups 400 in operative circuit to vary current to maintain a constant voltage value. Update user input; throttle control |

In addition to various routines initiated in response to the various interrupts, various subroutines may be employed. Use of subroutines is particularly advantageous in instances where hardware registers are employed, to facilitate page changing. Exemplary subroutines are described in Table 3.

TABLE 3

| NAME | Denomination | FUNCTION |
|---|---|---|
| Inverter Update | 2340 | Update status of inverter switching control signals LHRL, RHLL, HIV |
| ZEROX | 2400 | Zero (0) Crossing Detector: Detects zero crossings, determines RPM, and sets the phase angle employed to set firing angle. |
| Throttle | 2900 | Sets the throttle pulse width in accordance with RPM and rail voltage |
| Push Button | 2800 | Updates the status readings on the push button input switches 1520 to determine modes and set parameters for voltage and current |
| Power Out | 2700 | Updates the phase factor (firing angle) in accordance with the rail voltage when in voltage mode, and updates the SCR enable word in accordance with current output when in the current mode |
| Serial Output | 2500 | Generates a serial output in accordance with data contents of the SCR control registers |

Microcomputer 1702 suitably operates in a continuous primary loop (simple race track) program for implementing the generation of the ramp reference voltage. Other functions are driven by the interrupts set forth in Table 2.

Figure 20:
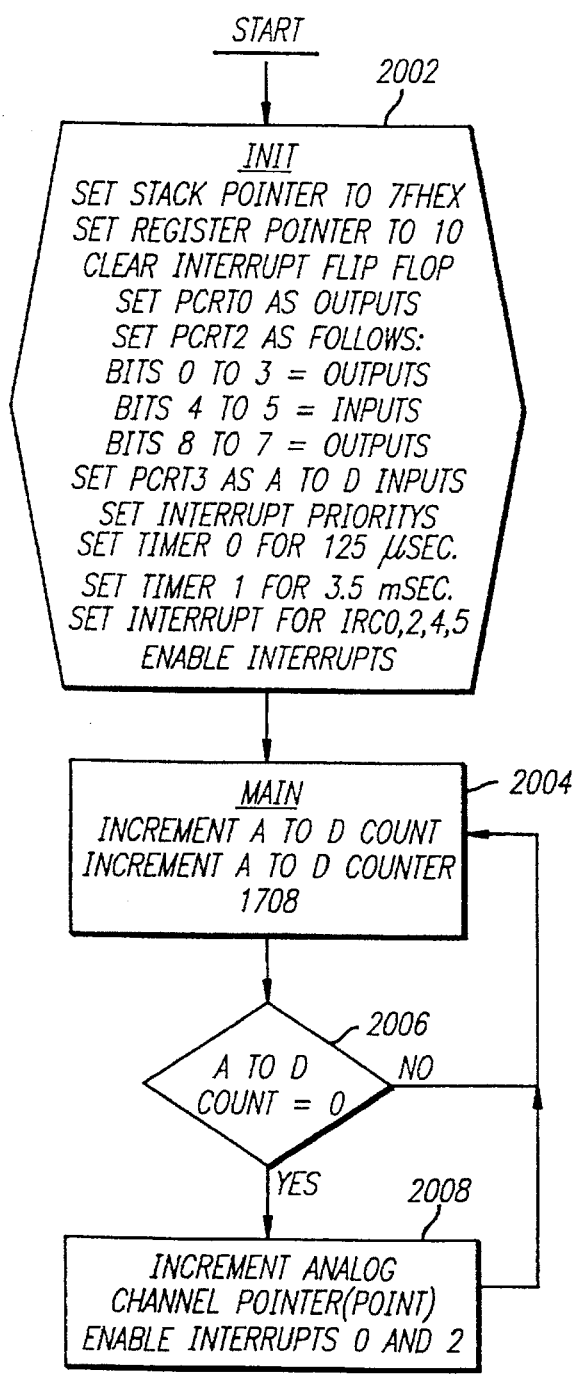
FIG. 20 is a functional flow chart of a MAIN routine effected by the microcomputer of FIG. 17.

Referring now to FIG. 20 when power is first supplied to microcomputer 1702, the various timers, registers, ports, and designated variables (e.g., throttle pulse with, throttle pulse with minimum and maximum values, first cycle flag, inverter switching times T1, T2, T3, T4) are initialized (step 2002). After initialization, microcomputer 1702 effects a continuous primary loop to generate the ramp reference voltage used to develop indicia of the sensed external parameters (e.g., rail voltage, output current, etc.), and increment POINT in register 1920 to cycle through the various sensed parameters (through the addresses of analog MUXs 1516, 1518), applying each to microcomputer 1702 in successive cycles.

As previously noted, the ramp difference voltage is generated by developing a count in counter 1708, and applying that count to resistive ladder 1712. A controlled ramp voltage ranging from zero to 5 volts is thus generated and applied at pin 10 of microprocessor 1702. A commensurate analog to digital conversion count AtoD is maintained in register 1902. More specifically, the AtoD count in register 1902, is incremented, and a clock signal to counter 1708 generated at pin 4 of microcomputer 1702 (step 2004). The AtoD count suitably runs from zero to 256, then rolls over to zero. (Counter 1708 similarly rolls over.) Each time the AtoD count is incremented, the count is tested to determine if a roll over has occurred (step 2006). Assuming a roll over has not occurred, the AtoD count is again incremented and another clock signal generated to counter 1708 (step 2004). When a roll over occurs (indicating a new sensing cycle) the contents of the interrupt mask (IMR) in register 1826 (FIG. 18) are modified to re-enable interrupts IRQ0 and IRQ2 (the sensor comparison interrupts) (step 2008). As will be explained, the sensor voltage interrupts are permitted to occur only once per ramp cycle to avoid spurious readings.

As previously noted, a pointer to the analog switches to be actuated is maintained as universal variable POINT in register 1920. A single pointer is used to, in effect, provide for relative addressing within each group of switches (MUX); the contents of the point register are used to derive the bit pattern provided to serial register 1706 and presented as control signals (ANALOG1–ANALOG4; FIG. 17) to switch sets 1516 and 1518. The respective sensors in a group are coupled to microcomputer 1702 in sequence. Accordingly, analog channel pointer POINT is incremented (step 2008).

As previously noted, a measurement of the parameters selected from the first group of parameters, (e.g., rail voltage Rvolt, control coil voltage Cvolt, or AC output voltage Vac) is effected in response to each IRQ0 interrupt. Similarly, a measurement of a selected parameter from the second group (e.g., DC output current ISEN, temperature Tvolt or AC current Iac) is effected in response to the IRQ2 interrupt. The IRQ0 interrupt is generated when the reference ramp at pin 10 of microcomputer 1702 initially exceeds the indicia of the selected first group parameter at pin 8 during the reference ramp cycle. Similarly, the IRQ2 interrupt is generated when the reference ramp initially exceeds the indicia of the selected second group parameter at pin 9.

Figure 21:
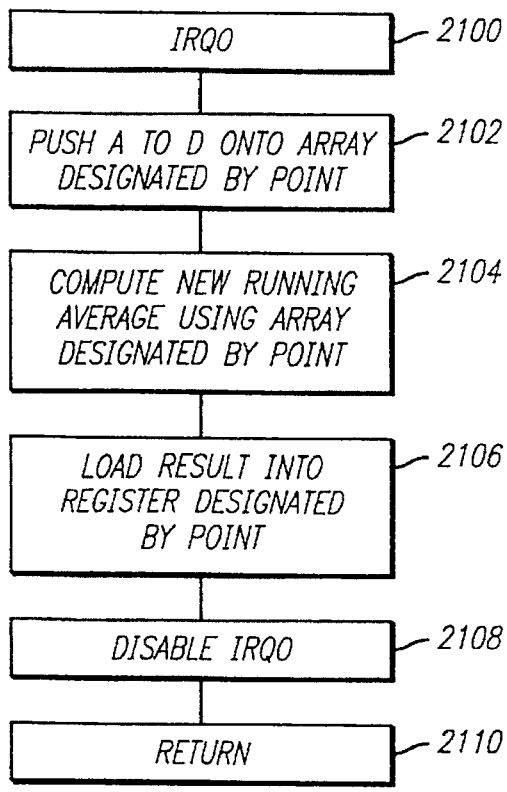
FIG. 21 is a functional flow chart of a IRQ0 (in) routine effected by the microcomputer of FIG. 17.

Referring now to FIGS. 21 and 19, an IRQ0 routine 2100 is effected in response to the occurrence of IRQ0 interrupt. Since the interrupt is generated when the ramp voltage initially exceeds the selected sensed voltage, the AtoD count in register 1902 is indicative of the sampled value of the sensed parameter (e.g., the rail voltage or coil voltage). However, to avoid the effects of spurious readings, the parameters are suitably averaged over a pre-determined number of samples, e.g., eight (8).

More specifically, a respective array of registers (1938, 1940 and 1941), is established for each parameter to be averaged, suitably each sensed parameter in the group, e.g., rail voltage (Rvolt), control coil voltage (Cvolt) and AC voltage (Vac). Each array suitably includes a register corresponding to each of the predetermined number of samples. The particular array operated upon during the routine is identified by the contents POINT of analog channel indicator register 1920, (suitably the state of a particular bit e.g., bit 0 of the register). The respective registers of arrays 1938 and 1940 are suitably interleaved and the registers in which the average values are maintained (e.g., 1904 or 1906) are at successive addresses, to facilitate relative addressing using the contents of POINT register 1920 (e.g., the address of the designated register is that of the lower address corresponding register plus the value of POINT bits 0, 1).

The average is suitably determined by first pushing the contents of the AtoD register into the designated array (1938, 1940, and 1941), i.e. loading each register in the array with the contents of the next succeeding register in the array, and the contents of the AtoD register into the top register in the array (step 2102). The contents of each register in the designated array are summed and the sum divided by the pre-determined number (e.g., 8) (step 2104). The resultant running average value is then loaded into the register designated by the contents of POINT register 1920) (e.g., registers 1904, 1906 or 1907) (step 2106). The mask bit corresponding to IRQ0 in IMR 1826 is then set to disable IRQ0 for the remainder of the ramp cycle (step 2108) and a return to the main routine effected (step 2110).

Figure 22:
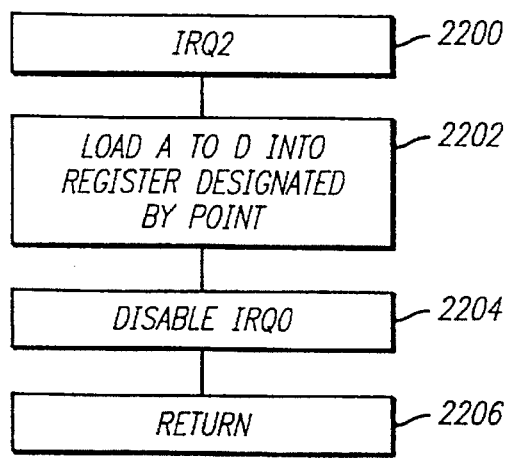
FIG. 22 is a functional flow chart of a IRQ2 (in) routine effected by the microcomputer of FIG. 17.

The IRQ2 routine is similar to the IRQ1 routine except that the IRQ2 routine develops data pertaining to the second group of input parameters provided at microcomputer pin 9, e.g., input current ISEN, and temperature TSEN. If desired, an averaging function can be performed on a sequence of samples. In the preferred embodiment, however, the averaging is foregone. The registers in which the current and temperature values are maintained (e.g., 1908 or 1909) are suitably at successive addresses, to facilitate relative addressing using the contents of POINT register 1920. More specifically, referring to FIG. 22, since the interrupt is generated when the ramp voltage initially exceeds the selected sensed voltage, the AtoD count in register 1902 is indicative of the sampled value of the sensed parameter (e.g., input current ISEN, and temperature TSEN). Accordingly, the contents of AtoD register 1902 are loaded into the register (e.g., 1908 or 1909) designated by the contents of POINT register 1920 (step 2202). The mask bit corresponding to IRQ2 in IMR 1826 is then set to disable IRQ2 for the remainder of the ramp cycle (step 2204) and a return to the main routine effected (step 2206).

As previously noted, the control signals to the respective SCRs of regulators 1502 and 1506 (and switching control signals for inverter 3100) are generated as a serial data stream, captured by the appropriate serial input parallel output register 1704 and 1705 (and 1707) which provide the control signals to the SCRs (and inverter 3100). The states of the SCRs are controlled in accordance with the instantaneous phase of the cycle (rotor rotation), and, depending upon whether the system is in current mode and/or voltage mode operation, deviations of the system output signal current and/or voltage from respective target values (Itarget in register 1954 and Vtarget in register 1952). In current mode operation SCRs corresponding to respective coils are activated or de-activated to provide a desired level of current. In voltage mode operation the firing angles of the SCRs are varied to control voltage output.

Switching control signals for inverter 3100 (LHRL, RHLL, HIV) and enable signals for the respective inverter winding groups 400A, 400B are likewise generated as a serial data stream, captured by the appropriate serial input parallel output register 1707 which provides the control signals to inverter 3100. The states of the switching control signals are controlled in accordance with count AC CNT representing the instantaneous phase of the AC cycle. The control signals are suitably turned on and off at predetermined points in the cycle, represented by counts T1, T2, T3, and T4, as will be more fully described.

The desired status of the SCRs, reflected in the SCR control word registers 1916 and 1918 (and desired status of the inverter switching control signals, reflected in the lower nibble of register 1925) are updated and output signals to the SCRs refreshed on a periodic basis, suitably at 130 microsecond intervals in response to the timer zero interrupt.

Figure 23:
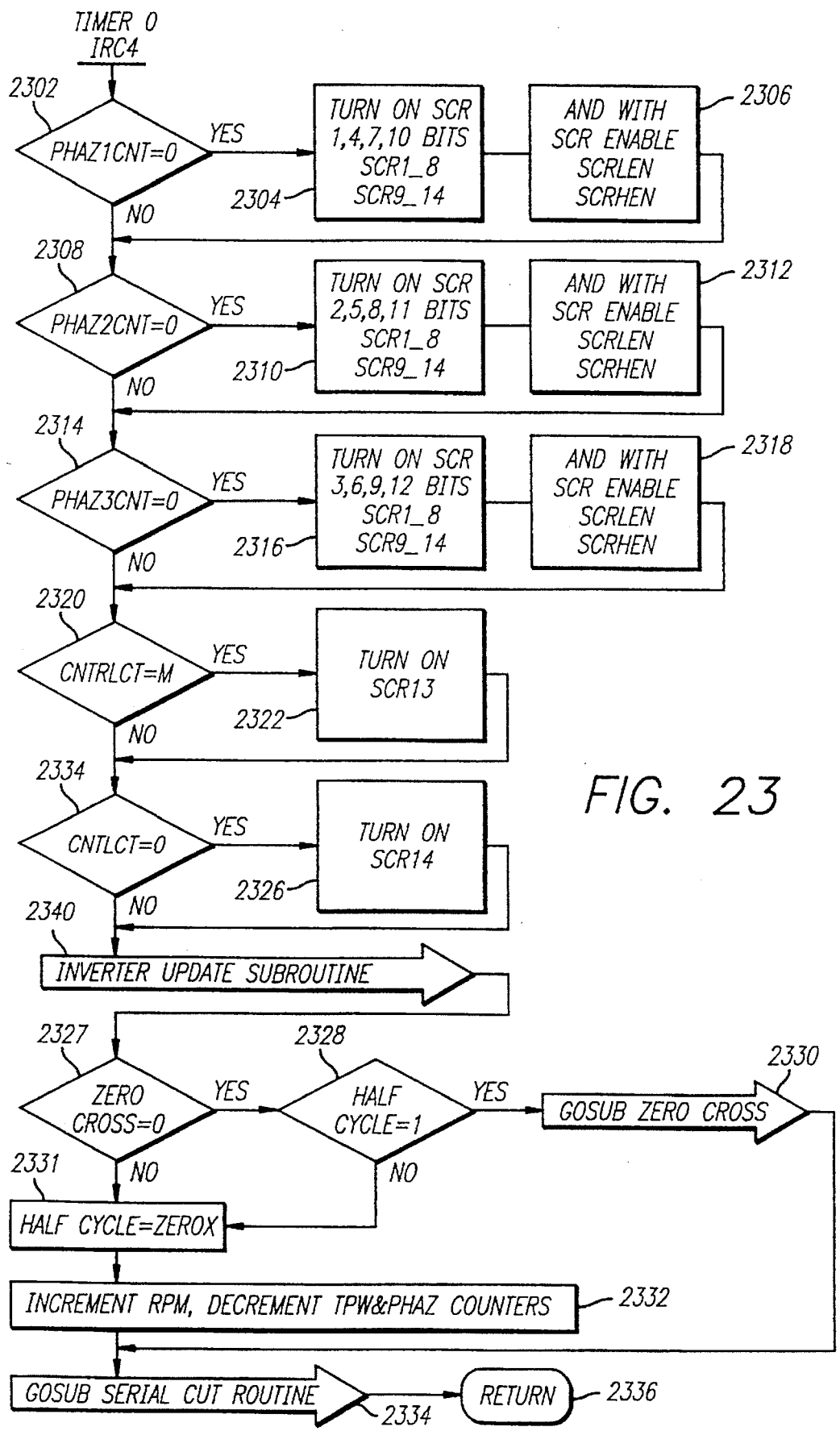
FIG. 23 is a functional flow chart of a TIMER0 routine effected by the microcomputer of FIG. 17.

Referring to FIG. 23, timer zero interrupt routine 2300 is effected in response to the timing out of timer zero on a periodic basis, e.g., every 130 microseconds. As previously noted, a count RPM indicative of the rotor cycle phase is maintained in register 1912, and counts indicative of the relative points in the cycle when the respective phases of the stator windings should be rendered conductive are maintained in registers 1930, 1932, and 1934. The firing phase counts in registers 1930, 1932, and 1934 are each checked in turn (steps 2302, 2308 and 2314) to determine if the firing angle for the phase has been reached, i.e., the count has reached zero. If the firing angle for the phase has been reached, the bits of SCR control registers 1922 and 1944 corresponding to the SCRs associated with the particular phase (e.g., phase one SCRs 1, 4, 7, and 10; phase 2 SCRs 2, 5, 8, and 11; phase three SCRs 3, 6, 9, and 12) are turned on (steps 2304, 2310 and 2316). The updated contents of SCR control registers 1922 and 1924 are then masked with (i.e., a logical AND function is performed with) the corresponding bits of the SCR enable registers 1926 and 1928, and the result written back into SCR control registers 1922 and 1924 (steps 2306, 2312 and 2318). The result is that only the bits in SCR control registers 1922 and 1924 that correspond to SCRs for which the firing angle has been reached, and are associated with windings that are intended to be in the operative system are at logic one.

After the status of control registers 1922 and 1924 update has been completed for all three phases, the status of the bits corresponding to the SCRs associated with control winding 1504, e.g., SCRs 13 and 14, are updated. More specifically, the contents of the control count register 1936 is checked to determine if it is negative, indicative of the negative half of the cycle (step 2320). If the control count is negative, the bit in SCR control register 1924 corresponding to SCR 13 is turned on and the bit in SCR control register 1924 corresponding to SCR 14 is tuned off (step 2322). If the control count in register 1936 is not negative, the control count is checked to determine if it is equal to zero (step 2324) and if so, the bit in SCR control register 1924 corresponding to SCR 14 is set and the bit corresponding to SCR 14 is turned off (step 2326).

After SCR control register 1924 has been updated with respect to the desired status of SCRs 13 and 14, SCR control registers 1922 and 1924 contain a bit pattern corresponding to the desired states of the various SCRs in regulators 1502 and 1506.

Figure 23A:
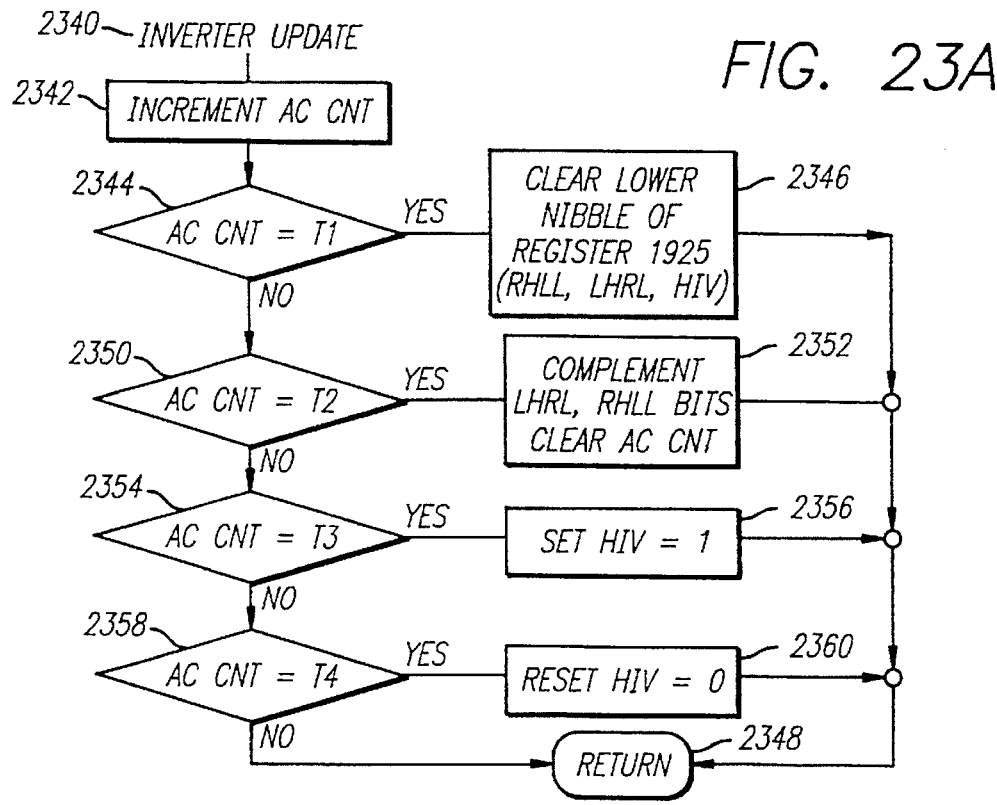
FIG. 23A is a functional flow chart of an INVERTER UPDATE routine effected by the microcomputer of FIG. 17.

Inverter update subroutine 2340 is then effected to update the contents of inverter control register 1925. Referring briefly to FIGS. 23A and 16B, AC cycle count AC CNT in register 1962 is incremented (step 2342), then tested against respective counts corresponding to T1, T2, T3 and T4 in FIG. 16B, and the bits in register 1925 corresponding to switching signals LHRL, RHLL, and HIV set accordingly. If AC CNT equals T1 (corresponding to the trailing edge of the base pulse) (step 2344), the lower nibble of register 1925 is cleared (LHRL, RHLL, and HIV all turned off) (step 2346), and a return effected (step 2348). If ACCNT equals T2 (corresponding to a half cycle point) (step 2350), the bits corresponding to switching control signals LHRL and RHLL are complemented, and the ACCNT count cleared (step 2352), then a return effected (step 2348). If ACCNT equals T3 (corresponding to the leading edge of the boost pulse) (step 2354), the bit in register 1925 corresponding to the HIV signal is set to 1 (step 2356) and a return effected (step 2348). If ACCNT is equal to T4 (corresponding to the trailing edge of the boost pulse) (step 2358), the bit corresponding to HIV is reset to 0 (step 2360) and a return effected (step 2348). If ACCNT is not equal to any of counts T1, T2, T3, or T4, a return is effected (step 2348) without changing the state of any of the switching control signals.

The respective phase counts are then updated, as appropriate. As previously noted, the ZEROX signal, provided by zero crossing detector 1512 to pin 2 of microcomputer chip 1702, changes logic level in accordance with the polarity of the signal generated by control winding 1504. Since control winding 1504 is physically wound with one of the phases (e.g., phase 3) of a winding group 400, winding 1504 is in phase with the group windings of that phase (since physical disposition is fixed, the respective corresponding phase windings of each group are in phase with each other). The indicia of zero crossings (transitions in the state of ZEROX) generated by zero crossing detector 12 can thus be utilized to derive the relative phases of the respective windings of groups 400 as well as control winding 1504. Accordingly, the state of the ZEROX input at pin 2 of microcomputer chip 1702 is sampled, to determine if a zero crossing has occurred (step 2327) to initiate the resetting and updating of the phase counts, as appropriate.

However, the phase counts are preferably reinitialized only once, at the beginning of the cycle. Accordingly, the system must discriminate between zero crossings occurring at 180 degrees and zero crossings occurring at 360 degrees (flag register 1942 bit 5) is employed to this end. When a zero crossing is detected, the ½ cycle flag is tested (step 2328), to determine if the zero crossing is e.g., negative going. When ZEROX is logic low and the ½ cycle flag is a logical one, a negative going zero crossing (360 degrees) is indicated. If a negative going zero crossing has occurred, zero crossing subroutine 2400 is effected (step 2330) to reinitialize and update the firing angle counts for each of the respective phases contained in registers 1930–1934, and the firing angle count for control winding 1504 contained in register 1936 and initialize the RPM count in register 1912. Zero crossing subroutine 2400 will be more fully explained in conjunction with FIG. 24. If no zero crossing is detected, or if the ½ cycle bit is indicates the wrong variety of zero crossing, the ZEROX value is loaded into the ½ cycle flag (step 2331). The RPM count in register 1912 and is incremented and the firing phase counts in registers 1930–1936 and throttle control count in register 1951 decremented (step 2332) to reflect the advance in rotor cycle phase.

Serial output routine 2500 is then called to output the updated contents of the SCR control registers 1922 and 1924 to serial input parallel output registers 1704 and 1705 (step 2334). A return is then effected (step 2336).

Figure 24:
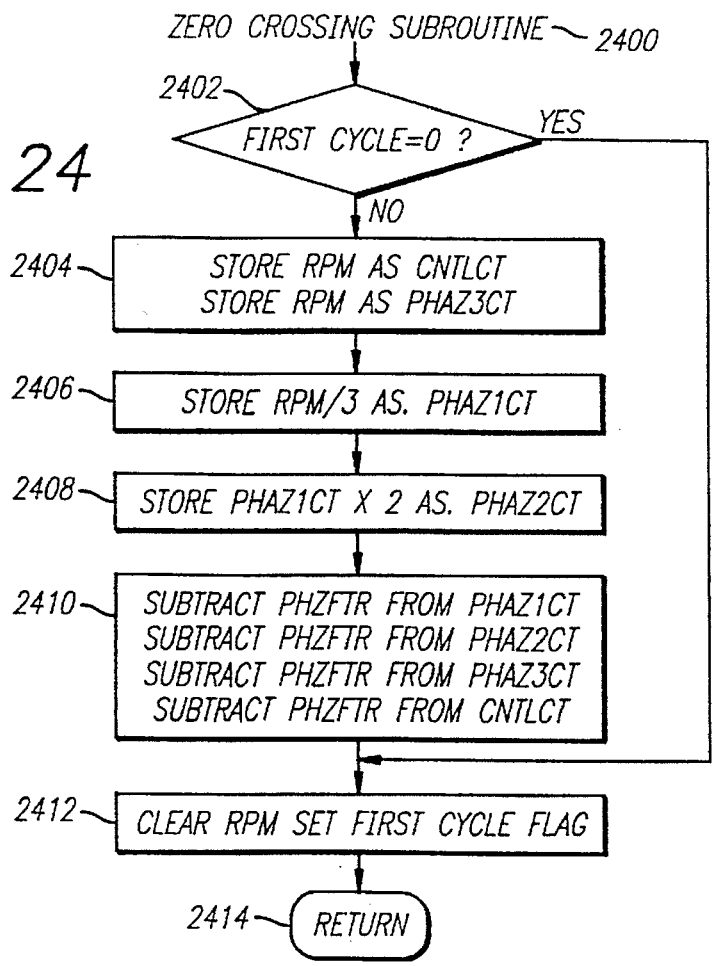
FIG. 24 is a functional flow chart of a zero crossing subroutine effected by the microcomputer of FIG. 17.

As previously noted, zero crossing subroutine 2400 is effected (step 2330) to reinitialize and update the firing angle counts for each of the respective windings contained in registers 1930–1936, at the end of each cycle and reset the RPM count in register 1912. Referring now to FIG. 24, when zero crossing subroutine 2400 is initially called, a check is made to ensure that the RPM count started at the beginning of a cycle and thus accurately represents rotor cycle phase. Specifically, the first cycle flag (register 1942 bit 6) is checked (step 2402). The first cycle flag was initialized to zero during start-up (step 2002) and is set to 1 only after the zero crossing routine has been initiated. Accordingly, if the first cycle flag is not zero, the system has completed at least one complete cycle, and the RPM count in register 1912 represents the period of the rotor cycle.

Assuming the first cycle flag is not zero, the respective firing phase counts in registers 1930–1936 are then recalculated in accordance with the updated RPM (cycle) data. Suitably, the RPM count is loaded into register 1934 as the phase 3 count (indicative of 360 degrees), and also into register 1936 as CNTRLCNT (step 2404). The phase 3 count is then divided by 3 and the result stored as the phase 1 count (indicative of 120 degrees) (step 2406). The contents of phase 1 count in register 1930 are then multiplied by two and the result (indicative of 240 degrees) stored as the phase two count in register 1932 (2408). Thus, respective counts reflecting the expected zero crossings in each of the winding phases and control winding 1504 are established in phase counters 1930–1936.

The respective counts are then adjusted to reflect the desired firing angle (step 2410). More specifically, the phase factor PHZFTR, representing the offset from zero crossing necessary to achieve the desired phase winding firing angle, is contained in register 1956, and is subtracted from each of the firing phase counts in registers 1930–1934. Similarly, the phase factor CPHZFTR, representing the offset from zero crossing necessary to achieve the desired control firing angle, is contained in register 1957, and is subtracted from each of the firing phase count in register 1936.

After the updated firing angles have been established in registers 1930–1936, the RPM count in register 1912 is cleared in preparation for tracking rotor phase and through the next cycle, and the first cycle flag set (step 2412), and a return effected (step 2414).

If, when the zero crossing subroutine is initially called, the first cycle flag is zero (step 2402), indicative of an initial, possibly incomplete, cycle, the RPM and phase count updating steps (2404–2410) are by-passed; the RPM count in register 1912 is cleared, and the first cycle flag set (step 2412) in preparation for tracking rotor phase through the next cycle, and a return effected (step 2414).

As previously discussed, microcomputer 1702 cooperates with serial-input-parallel-output registers 1704–1707 to generate control signals to the SCRs of regulators 1502 and 1506, analog switches 1516 and 1518 and push button input switches 1520, (and an inverter circuit, if employed). A desired bit pattern is serially provided on one of the output pins (e.g., pin 13) of microcomputer 1702 and applied at the data inputs of all of the output registers. Serial data clock signals (SCLK) synchronous with the serial data are provided only at the output pin (e.g., one of pins 15–17) corresponding (coupled) to the particular register 1704–1707 corresponding to the destination device. Thus the data is loaded into only the appropriate register. A subsequent control signal (RCLK) is provided at pin 12 of microcomputer 1702 and applied concurrently to each of registers 1704–1706 to load the accumulated pattern into an output latch, and hence, apply the bit pattern as control signals to the designated recipient devices.

Figure 25A:
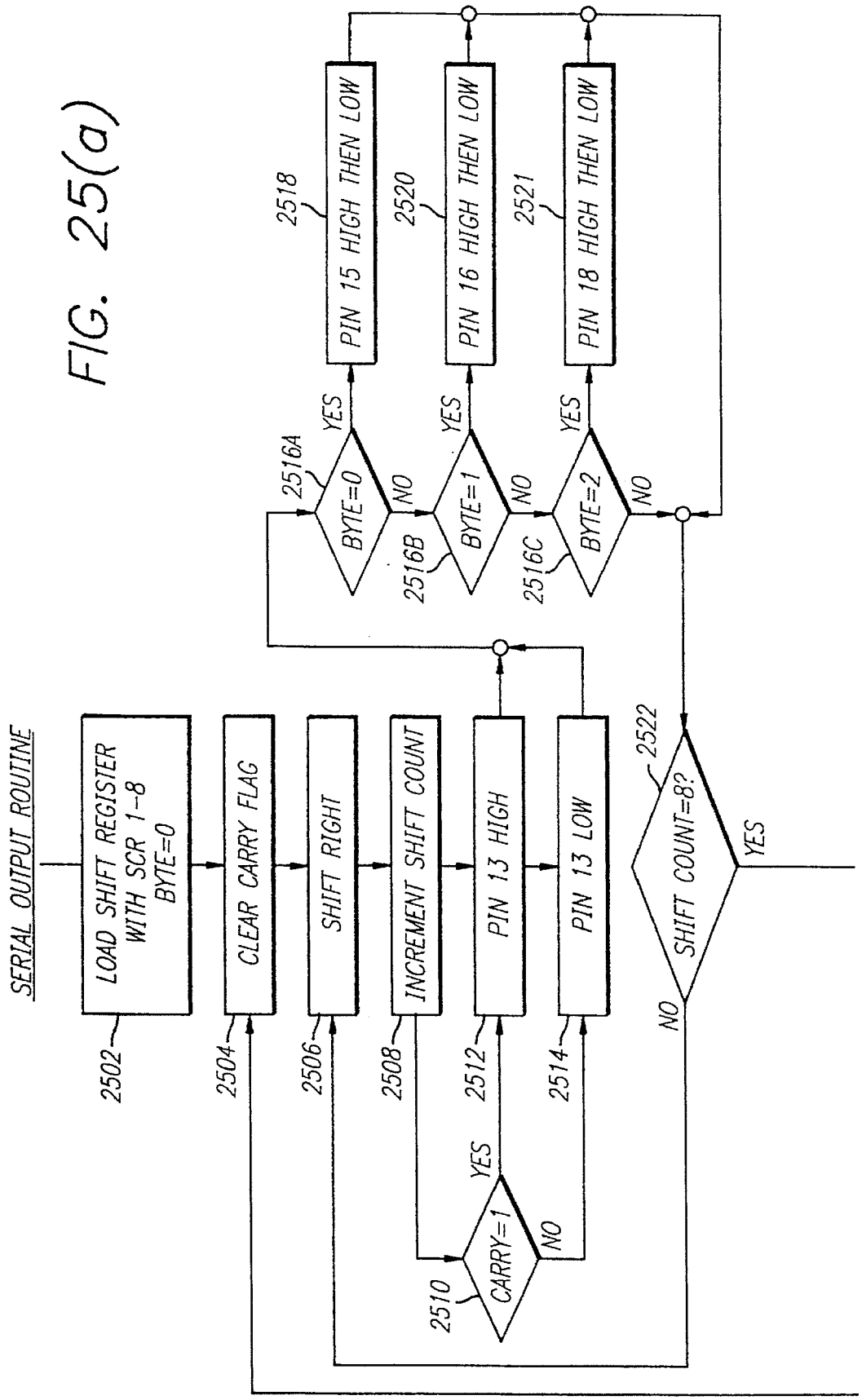
FIG. 25 is a functional flow chart of a serial output routine effected by the microcomputer of FIG. 17.
Figure 25B:
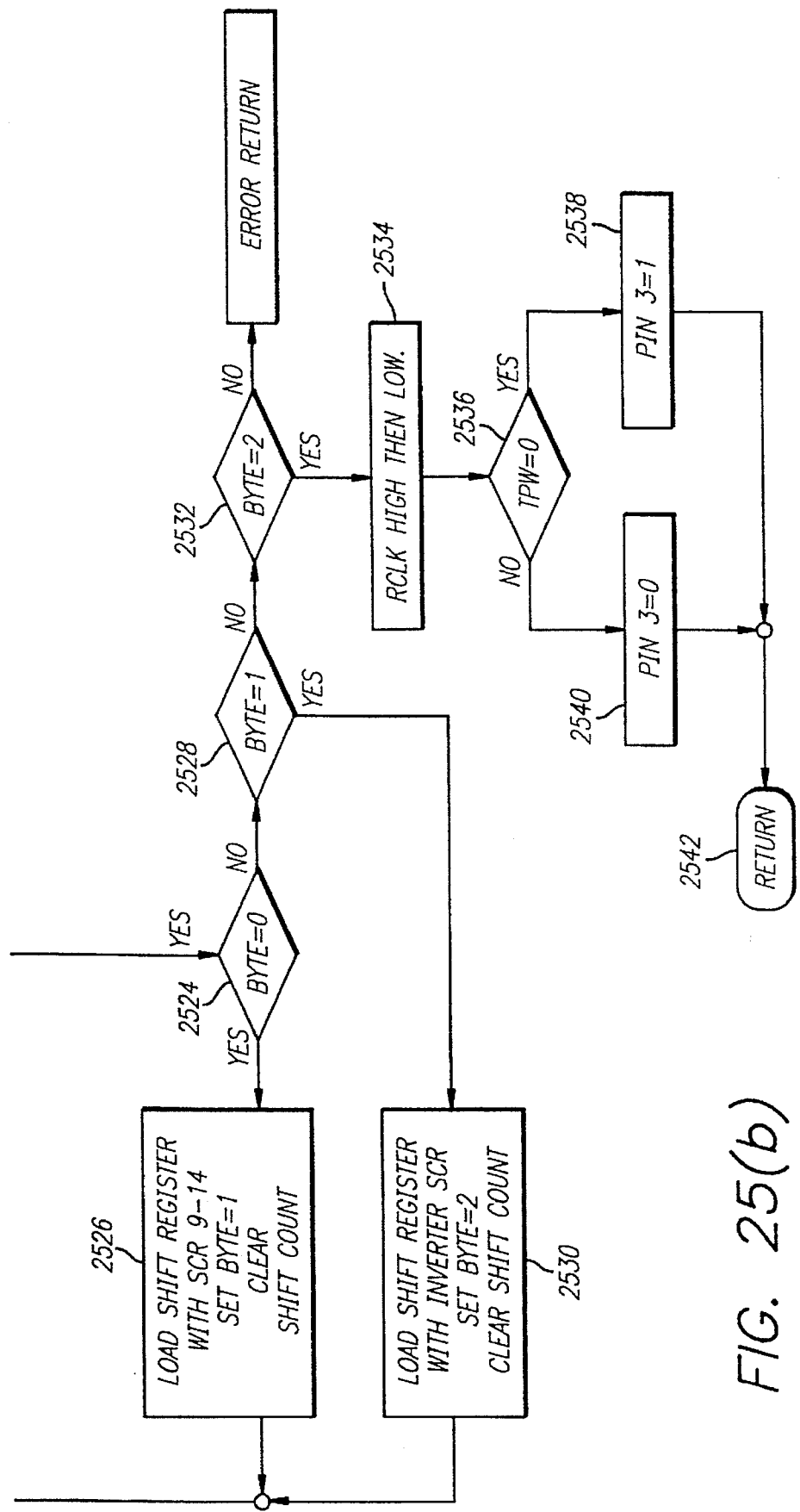

Serial output routine 2500 is employed to transfer the updated contents of SCR control registers 1922 and 1924 to serial-input-parallel-output registers 1704 and 1705 on a periodic basis, (step 2334), here, every 130 microseconds in response to the TIMER 0 interrupt. More specifically, referring to FIG. 25, output shift register 1958 is initially loaded with the contents of SCR control register 1922, corresponding to the desired states of SCRs 1–8 and the byte (register 1942 bit 7) is set to 0, indicating operation upon the first byte of the control word (step 2502).

The carry flag of processor 1702, typically maintained in a fixed function flags register 1836 (FIG. 18), provides indicia of whether shifting the contents of output register 1958 causes a one to carry, i.e. the bit shifted out of the least significant bit of the register is a one. The carry flag is initially cleared (step 2504). The contents of output shift register 1958 are then shifted right, causing the least significant bit of output shift register 1958 to be reflected in the state of the carry flag (step 2506).

A count indicative of the number of bits are shifted out of the output shift register is maintained in shift count register 1960. After the shift right operation is effected, shift count register 1960 is incremented (step 2508).

The carry flag is then tested to determine its state (step 2510) and the value of the SER output at pin 13 set accordingly. If the carry flag is 1, the SER signal at pin 13 is set high (step 2512). If the carry bit is 0, SER is likewise a low value (step 2514).

After the appropriate value of the serial data is established at pin 13, the Sclock signal to the appropriate one of registers 1704, 1705 or 1707 is generated. More specifically, BYTE (register 1942 bits 6, 7) is checked (steps 2516A, 2516B, 2515C). If the byte is zero, indicating SCR control register 1922 (corresponding to SCRs 1–8), the output pin, e.g. pin 15, corresponding to the Sclock input of corresponding register, 1704, is pulsed high, then low, to cause the data bit to be shifted into register 1704 (step 2518). Similarly, if BYTE is one, indicating SCR control register 1924 corresponding to SCRs 9–14, then the pin, e.g., pin 16 of microcomputer 1702 corresponding to the Sclock input of register 1705 is pulsed (step 2520). Likewise, if BYTE is two, indicating the inverter control register 1925, then the pin, e.g., pin 18 of microcomputer 1702 corresponding to the Sclock input of register 1707 is pulsed (step 2521).

The process is repeated for each bit in output shift register 1958. More specifically, the shift count in register 1960 is incremented each time a bit is output. The shift count is checked after each clock output to determine if all the bits have been output (step 2522). If all of the bits have not been output, the shifting processing (steps 2506–2522) is repeated.

Once all of the bits in the output register have been output, a determination is then made as to whether both SCR control registers 1922 and 1924 and inverter control register 1925 have been output. More specifically, BYTE in register 1942 is checked to determine if it is equal to 0, i.e., if register 1922 associated with SCRs 1–8 was just output (step 2524). If so, output shift register 1958 is loaded with the contents of SCR control register 1924, indicative of the desired states of SCRs 9–14, BYTE is set to 1, the shift count in register 1960 cleared (step 2526) and the output process (steps 2504–2526) are then repeated. If BYTE does not equal 0, it is checked to determine if it is equal to 1, i.e., if register 1924 associated with SCRs 9–14 was just output (step 2528). If so, output shift register 1958 is loaded with the contents of inverter control register 1925, indicative of the desired states of switching signals LHRL, RHLL, and HIV, and group enable signals SCR15–SCR18, BYTE is set to 2, the shift count in register 1960 cleared (step 2530) and the output process (steps 2504–2526) again repeated.

If BYTE does not equal 1, it is checked to determine if it is equal to 2, i.e., both SCR control registers and the inverter control register have been output (step 2532). If so, a capture signal (RCLK) is generated at pin 12 of microcomputer 1702 to transfer the accumulated data bytes in the serial input registers to the output latches of registers 1704 and 1705 (step 2534).

To facilitate fuel economy and noise abatement, automated throttle control in accordance with load is suitably effected; rotor RPM is suitably maintained at the lowest value necessary to provide the desired rail voltage to the load. This is achieved by utilizing an electromagnetic governor cooperating with the throttle of engine 12 and driver circuit 1714 (FIG. 17). A suitable governor will be described in conjunction with FIGS. 30A and 30B.

In general, a pulse width modulated signal is provided at e.g., pin 3 of microcomputer 1702 (e.g., port p2, bit 6) to driver 1714. Referring briefly to FIG. 17, when the signal at pin 3 is high, transistor Q11 in driver 1714 is rendered conductive, actuating the electromagnetic governor. The signal at pin 3 of microcomputer 1702 reflects the state of the throttle control count TPWCNT in register 1951. TPWCT in register 1951 is counted down from the desired throttle pulse width TPW in register 1950 to zero, i.e., register 1951 is periodically loaded with TPW from register 1950 (e.g., in connection with throttle control subroutine 2900 called in timer 1 interrupt routine 2600), and, as previously noted, decremented during timer 0 interrupt routine (FIG. 23, step 2332).

Accordingly, after inverter control register 1925 has been output, the throttle control signal is refreshed. The throttle control count is checked to see if it has counted down to zero (step 2536). If TPWCNT is not zero, a high signal is provided at pin 3 of microcomputer 1702 (e.g., port p2, bit 6) (step 2538). Conversely, if TPWCNT is zero, a low signal is provided at pin 3 of microcomputer 1702 (step 2540). It will remain zero until TPW is again loaded into register 1951 by throttle control subroutine 2900 during the next successive execution of timer 1 interrupt routine 2600. After the throttle control signal has been refreshed, a return is then effected (step 2542).

Figure 26A:
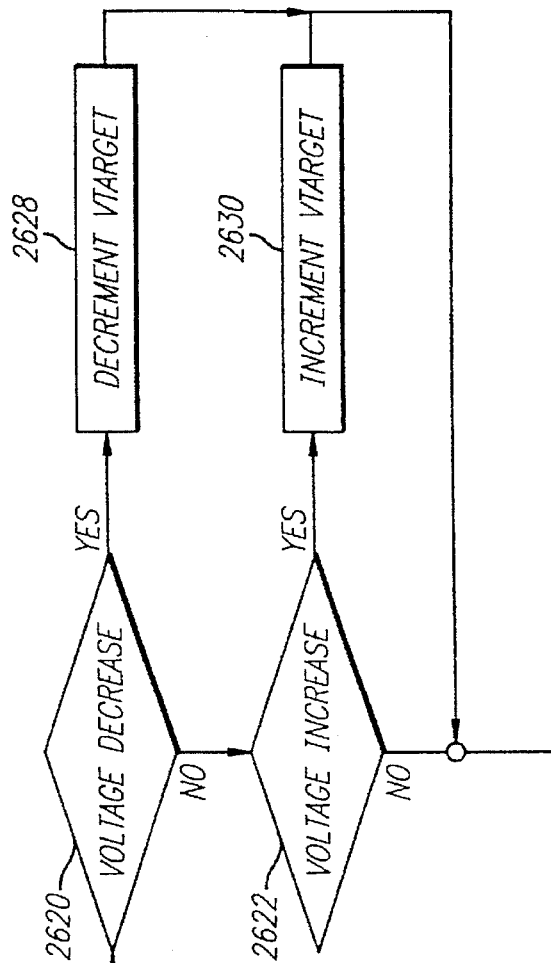
FIG. 26 is a functional flow chart of a TIMER1 routine effected by the microcomputer of FIG. 17.
Figure 26B:
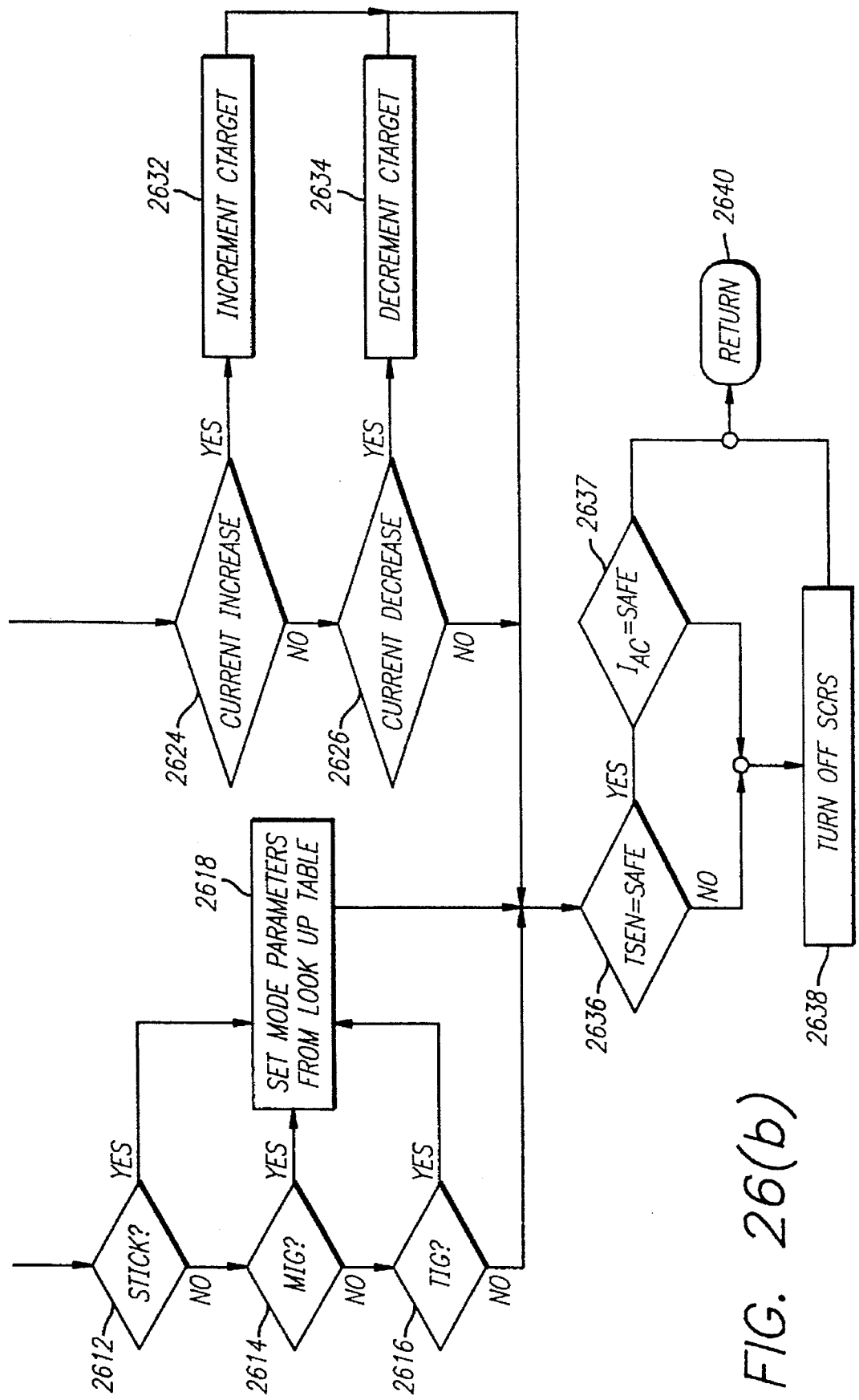

Updating of the phase factor, operating parameters (user input information), and throttle setting are also made on a periodic basis. Timer 1 interrupt routine 2600 is suitably employed to effect these functions. Referring now to FIG. 26, Timer 1 interrupt routine 2600 is initiated upon time out of timer 1806, e.g., every 8.2 milliseconds. Power out subroutine 2700 is called (step 2602) to make the appropriate adjustments in: the number of winding groups 400 in the operative circuit in accordance with the deviation of the output current from a desired target value; the firing angle of SCRs regulators 1502 in accordance with the deviation of rail voltage Rvolt from a desired target value; the firing angle of SCRs in regulators 1504 in accordance with the deviation of control coil voltage Cvolt from a desired target value; and/or the number of winding groups 400A, 400B in the operative circuit in accordance with the deviation of the AC output current Iac from a desired target value. Power out subroutine 2700, will be more fully described in conjunction with FIG. 27.

Operating parameters are then updated in accordance with any changes in user input information; push button subroutine 2800 is called (step 2604) to capture user input through push button input switches 1520, determine and store indicia of the desired mode of operation (Op 0, 1, in flag register 1942), and set target values for voltage (Vtarget, register 1952) and current (Itarget, register 1954). Push button routine 2800 will be more fully described in conjunction with FIG. 28.

Throttle subroutine 2900 is then called to adjust the throttle pulse width in accordance with rotor RPM and rail voltage. Throttle subroutine 2900 will hereinafter be more fully described in conjunction with FIG. 29.

Various parameters then set to pre-determined values in accordance with the designated mode of operation. For example, a multi-mode welder could operate in one of three different modes: ARC (stick); metal inert gas (MIG) (wire feed) and tungsten inert gas (TIG). Arc welding requires an inverse slope of current to voltage, whereas, MIG welding requires constant voltage and a variable current, and TIG welding requires variable current and variable voltage.

The desired mode of operation is input by the operator through push buttons 1520 and, at this point, reflected in the I and V mode flags (FLAG1 register 1942 bits 0, 1) and in bits 0 and 1 of OLDPBTN register 1946. For example, ARC, TIG, and MIG operation are suitably designated by current and voltage flag (I, V) settings of 11, 01, and 10, respectively. The mode prior to the last read cycle is reflected as MODEREG in register 1943.

Accordingly, bits 0 and 1 of OLDPBNT are tested against bits 0 and 1 MODEREG to determine if there was a change in the desired mode (step 2608). If a change in mode is detected, OLDPBNT in register 1946 is loaded into register 1943 as MODEREG (step 2610), then checked against the values corresponding to ARC, (e.g., 1,1), TIG (e.g., 0,1) and MIG (e.g., 1,0) (steps 2612, 2614, and 2616), and the Itarget and Vtarget values in registers 1952 and 1954 set to initial values accordingly, for example, as set forth in Table 4 (step 2618).

TABLE 4

| WELDING MODE | I MODE | V MODE | Itarget (Amps) | | Vtarget (Volts) | |
|---|---|---|---|---|---|---|
| | | | Initial | Operating Range | Initial | Operating Range |
| Arc (1,1) | 1 | 1 | 10 | 10–300 | 75 | 22–25 |
| TIG (01) | 0 | 1 | 10 | 10–300 | 30 | 15–30 |
| MIG (10) | 1 | 0 | 300 | | 25 | 22–25 |

The Vtarget and Itarget values in registers 1952 and 1954 are initially set to pre-determined values e.g., those shown in Table 4, when a new mode of operation is entered. Thereafter, the target values are adjusted by depression of the increment and decrement buttons. In operation the Itarget and Vtarget values can be varied over substantial ranges, e.g., those shown in Table 4.

If no mode change has occurred, determinations are made as to whether adjustments to target voltage or current are indicated, i.e. an unserviced depression of the increment button, or decrement button has occurred (steps 2620, 2622, 2624, 2626), and the Vtarget and/or Itarget values in registers 1952 and 1954 incremented or decremented accordingly by a pre-determined unit amount, e.g., corresponding to ten amps or ten volts (steps 2628, 2630, 2632, 2634). More specifically, the state of the voltage mode, decrement and increment flags are tested (steps 2620, 2622), and Vtarget in register 1952 adjusted accordingly (steps 2628, 2630). The state of the current mode, decrement and increment flags are then tested (steps 2624, 2626), and Vtarget in register 1954 adjusted accordingly (steps 2632, 2634).

If only one or the other of the voltage and current control modes is active, depression of the increment or decrement button will adjust the voltage or current target value, respectively. However, if both voltage and current control modes, are active, as in the ARC welding mode, depression of the increment or decrement button will adjust both the voltage or current target value.

It is possible that the mode button and one of the increment or decrement buttons will be depressed concurrently. When this occurs the mode change is serviced first, and the change in target parameter serviced in the next successive cycle. Since the period between cycles is extremely short (e.g., 8.2 milliseconds) compared to human reaction times, there is no substantial risk that the depression of the increment button, or decrement button would be missed.

Safety checks are then made to ensure that the device is not overheated or in an over current condition; the indicia of measured temperature is compared against indicia of a maximum permitted operating temperature (suitably a pre-determined value incorporated into the program) (step 2636) and the indicia of measured AC output current (Iac, register 1910) is compared against indicia of a maximum permitted AC current (step 2637). If the temperature or AC current has exceeded the maximum values, SCR enable registers 1926 and 1928 are cleared, to effectively disable operation (2638) and a return is effected (step 2640).

As previously noted, respective counts reflecting the expected zero crossings in each of the winding phases (and control winding 1504), are established in the firing phase counters 1930–1936, and adjusted to reflect the desired firing angle (step 2408), by subtracting the phase factor, representing the offset from zero crossing necessary to achieve the desired firing angle, contained in register 1956. The offset, PHAZFTR, in register 1956, is periodically recalculated, e.g. through Powerout subroutine 2700, called every 8.2 milliseconds during Timer 1 interrupt routine 2600.

Figure 27A:
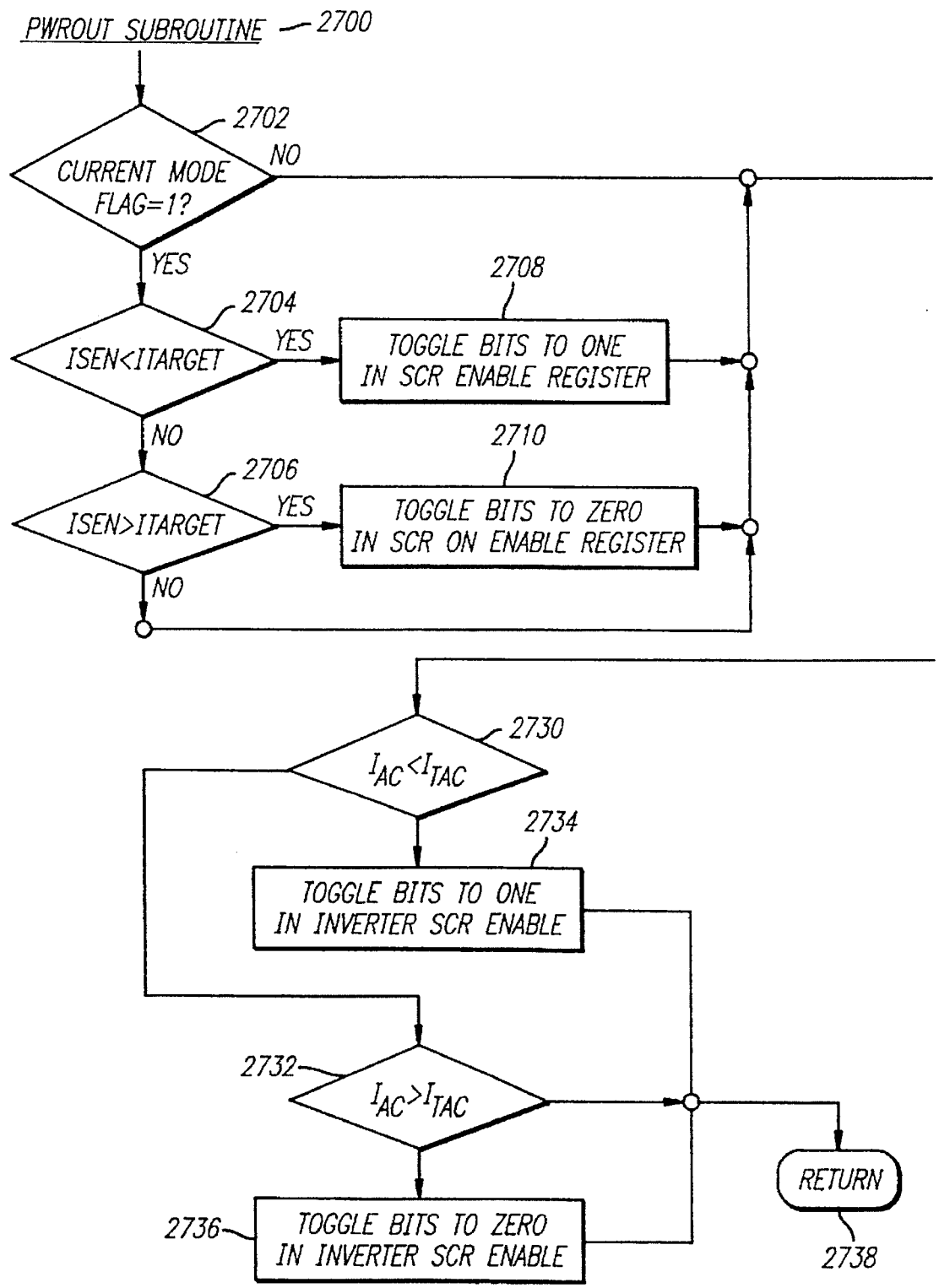
FIG. 27 is a functional flow chart of a power out subroutine routine effected by the microcomputer of FIG. 17.
Figure 27B:
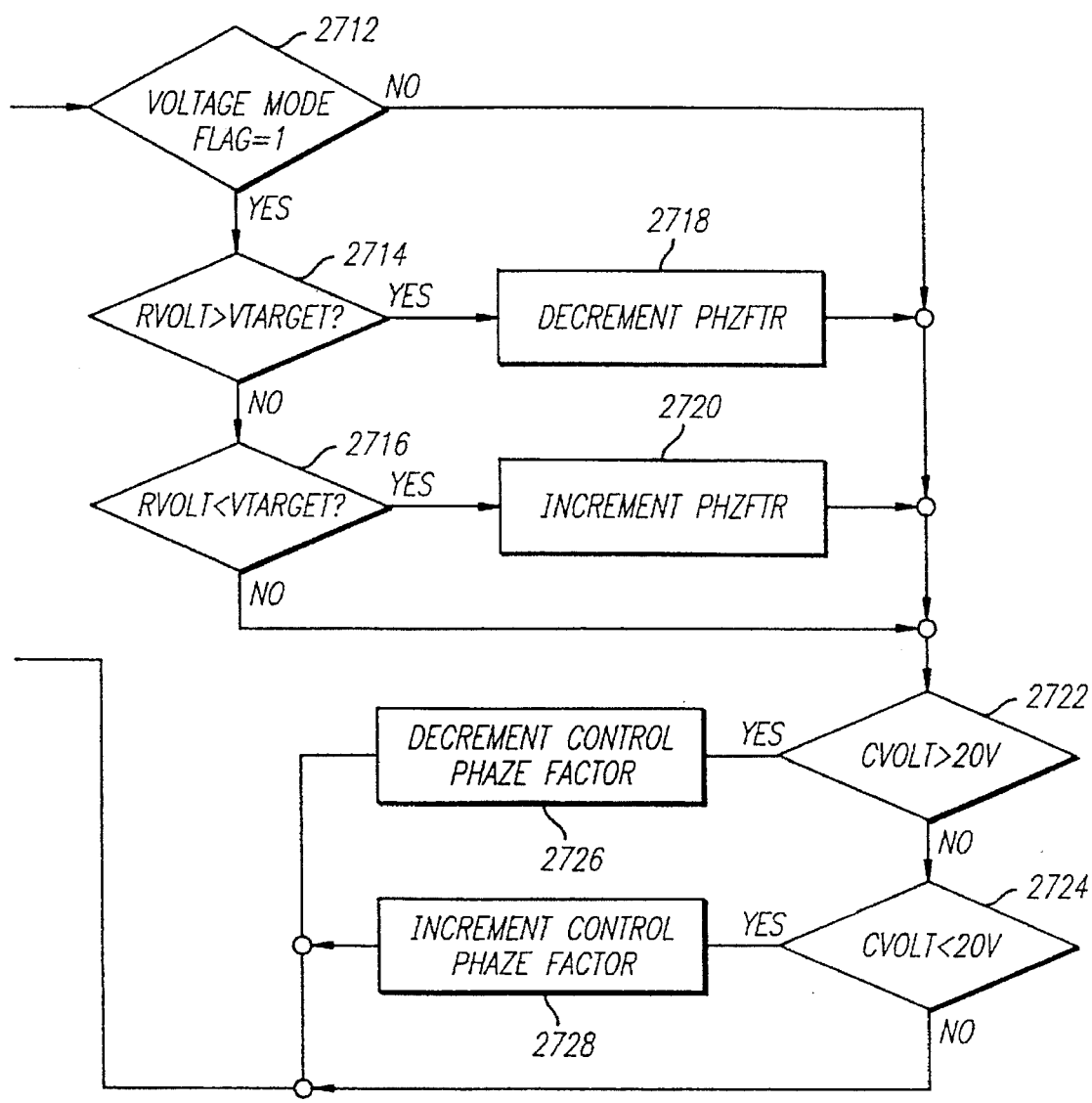

Referring briefly to FIG. 27, when power output routine 2700 is called (step 2602, FIG. 26), the current mode flag (Imode) in flag one register 1942 is checked to determine the desired mode of operation of the device (step 2702). For example, the system can operate in a current mode in which current is kept constant, and/or in a voltage mode in which input voltage is kept constant; e.g., in a welder, the current mode or voltage mode would be selected according to the particular type of welding operation desired.

As previously noted, if current mode is selected, the number of winding groups in the system is adjusted to maintain the desired current level. More specifically, the indicia of current level (ISEN) maintained in register 1908 is compared against the current target (I Target) in register 1954 (steps 2704 and 2706). The desired current value Itarget is established in accordance with user input through push buttons 1520, as discussed in conjunction with FIG. 26. If the sensed current value is less than the target current, the number of winding groups 400 in the operative circuit is increased (step 2708); a pre-determined number of, e.g. at least one, additional bits in SCR enable registers 1926 and 1928 is toggled from zero to one, to enable generation of an output signal to those SCRs (see steps 2306, 2312, and 2318, of timer zero interrupt routine 2300). Conversely, if the sensed current value ISEN is greater than desired value Itarget, the number of winding groups 400 in the operative circuit is decreased; the predetermined number of bits in SCR enable registers 1926 and 1928 are toggled from one to zero to disable output signals to the corresponding SCRs (step 2710). The pre-determined number of bits toggled is suitably one, two, three (all three phases of a winding group), or a multiple of three. If desired, the particular bits in SCR enable registers 1926 and 1928 toggled in steps 2708 and 2710 can be chosen in accordance with a pre-determined algorithm to ensure that no particular winding group is used significantly more or less than the others, and to evenly distribute heat generated in the stator, and/or control noise. After the contents of SCR enable registers 1926 and 1928 are adjusted as appropriate, or if the sensed DC current value ISEN is equal to the desired value I Target, the firing angle PHZFTR in register 1956 is adjusted as appropriate.

A check (step 2712) is made to determined whether voltage mode operation has been selected. If so, the firing angle of the respective phases is varied in accordance with the deviation of the voltage level from a pre-determined desired value. More specifically, the measured rail voltage (Rvolt) in register 1904 is compared against a target voltage, Vtarget in register 1952 (steps 2714, 2716) and the phase factor count in register 1956 adjusted accordingly. If it is determined that the measured value of rail voltage (Rvolt) is greater than the desired voltage level (V Target) (step 2714), the count indicative of the firing angle in register 1956 is decremented by a pre-determined unit amount (e.g., corresponding to 10 degrees) to decrease the firing angle (step 2718). Conversely, if it is determined that the rail voltage (Rvolt) is less than the desired voltage the target (step 2716) the phase factor count in register 1956 is incremented to increase the firing angle and thus increase voltage (step 2720). If desired, the size of the adjustment increment can be varied with RPM over a range of e.g., 1 to 10 degrees.

After the phase factor for the SCRs of regulators 1502 has been adjusted, or it is determined that the rail voltage is equal to the desired voltage and no adjustment to the firing angle is necessary, the firing angle CPHZFTR for single phase regulator 1506 in register 1957 is adjusted in accordance with the deviation of the control voltage level from a pre-determined desired value. More specifically, the measured control voltage (Cvolt) in register 1906 is compared against a predetermined target voltage, e.g. 20 v (steps 2722, 2724) and the phase factor count in register 1957 adjusted accordingly. If it is determined that the measured value of control voltage (Cvolt) is greater than the desired voltage level (e.g., 20 V) (step 2722), the count indicative of the firing angle in register 1957 is decremented by a pre-determined unit amount (e.g., corresponding to 10 degrees) to decrease the firing angle (step 2726). Conversely, if it is determined that the control voltage (Cvolt) is less than the desired voltage, e.g. 20 V (step 2724), the phase factor count in register 1957 is incremented to increase the firing angle and thus increase voltage (step 2728). If desired, the size of the adjustment increment can be varied with RPM over a range of e.g., 1 to 10 degrees.

After the control winding phase factor has been adjusted, or it is determined that the rail voltage is equal to the desired voltage and no adjustment to the firing angle is necessary, the inverter system is adjusted to maintain a desired AC current level. More specifically, the indicia of AC current level (Iac) maintained in register 1910 is compared against a predetermined desired AC current value Itac (suitably a pre-determined value incorporated into the program) (steps 2730 and 2732). If the indicia current value is less than target current Itac, the number of winding groups 400A, 400B in the operative circuit is increased (step 2734); a predetermined number of, e.g. at least one additional bit in upper nibble of register 1925 (preferably pairs of bits corresponding to a cooperating pair of windings 400A, 400B) is toggled from zero to one, to enable operation of regulator. Conversely, if the indicia current value Iac is greater than desired value Itac (step 2732), the number of winding groups 400A, 400B in the operative circuit is decreased (step 2736); the pre-determined number of bits in inverter control register 1925 are toggled from one to zero to disable operation of regulator. The pre-determined number of bits toggled is suitably one, two, three (all three phases of a winding group) or a multiple of three. If desired, the particular bits in inverter control register 1925 toggled in steps 2734 and 2736 can be chosen in accordance with a pre-determined algorithm to ensure that no particular winding group is used significantly more or less than the others, and to evenly distribute heat generated in the stator, and/or control noise. After the contents of inverter control register 1925 are adjusted as appropriate, or if the indicia current value Iac is equal to the desired value Itac, a return is effected (step 2738).

As previously noted, operator input is provided through push button switches 1520. For example, in the context of a multi-mode welder, push button switches 1520 suitably includes: a welding-mode button, which would be depressed to sequence through the different types of welding operations; and increment and decrement buttons which are depressed to decrement the voltage or current target value, depending upon the chosen operational mode.

As also previously noted, microcomputer 1700 includes: a push button (PBTN) register 1944 with a bit corresponding to each push button switch 1520; an old push button (OLDPBTN) register 1946 likewise, including a bit corresponding to each switch 1520, and push button counter (PBTNCT) 1948. OLDPBTN register 1946 maintains indicia of the state of the respective push buttons prior to the read cycle. Push button counter (PBTNCT) 1948 maintains a count indicative of the sampling cycle of the push buttons.

Briefly, as previously described, push buttons 1520 are each connected to a respective output pin (PB01-PB04) of register 1706 (FIG. 17) and connected in common to a push button input line (PBTNIN) to an input, here pin 1, of microcomputer 1702 (FIG. 17). Serial data and synchronous clock signals are generated by microcomputer 1702 to generate a bit pattern in register 1706 that provides a logic high signal to a single designated switch 1520, and logic low to the others. If the particular switch receptive of the logic high bit is depressed, a high level PBTNIN input signal will be communicated to pin 1 of microcomputer 1702. If the switch is not closed, the PBTNIN signal will be logic low. The state of the bit in PBTN register 1944 corresponding to the designated switch is set accordingly. The serial data applied to register 1706 is then varied to designate the next input switch, so that each switch is provided the logic high in sequence. This process is effected through push-button sub-routine 2800, on a periodic basis, e.g., every 8.2 milliseconds in response to the timer 1 interrupt (step 2604, FIG. 26). The period between read cycles is preferably chosen to be short enough, relative to the typical operator response times, to ensure that any depression of the push buttons is detected, but not so short as to be susceptible to bounce.

Figure 28:
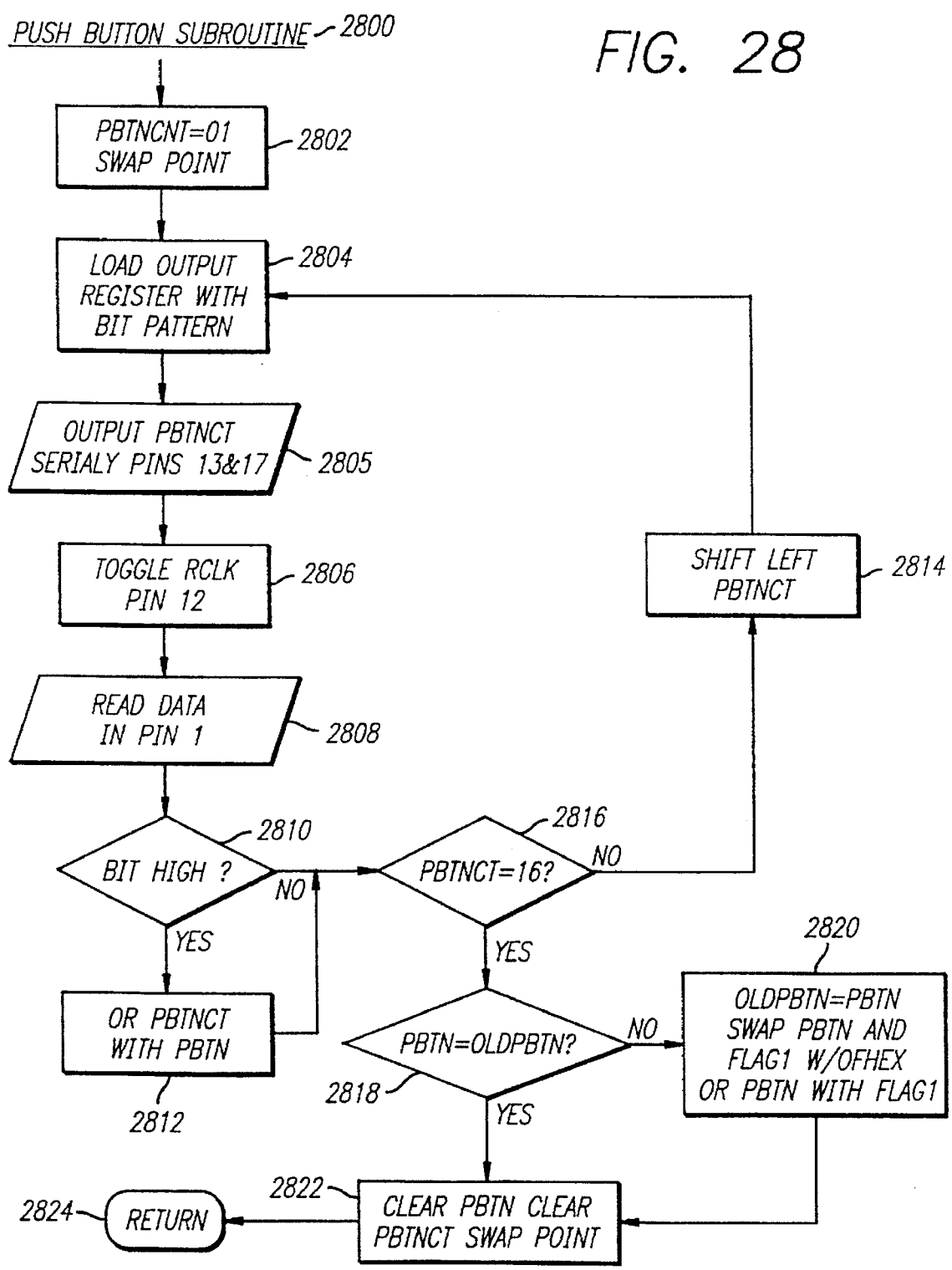
FIG. 28 is a functional flow chart of a PUSH BUTTON routine effected by the microcomputer of FIG. 17.

Referring now to FIG. 28, when push button subroutine 2800 is called, the involved registers are initialized; e.g., push button counter (PBTNCT) in register 1948 is initially set to one, and push button state indicia PBNT in register 1948 is cleared in preparation for the update cycle (step 2802). A bit pattern establishing a 1 in the bit corresponding to a designated push button, and zeros in the bits corresponding to the other push buttons is then established in output register 1958 (step 2804). In the preferred embodiment, since register 1706 also provides control signals to the analog switch sets 1516 and 1518, the bit pattern corresponding to the states of the switch sets (reflected in point register 1920) is also reflected in the bit pattern. More specifically, the relevant contents of point register 1920 are loaded into the four most significant bits of output shift register 1958, and the contents of push button counter PBTNCT register 1948, indicating the particular switch to be read, is loaded into the four least significant bits of shift register 1958. Where the POINT data resides in the least significant four bits (nibble) of register 1920, the concatenation of the POINT and PBTNCT data in output register 1958, is suitably effected by swapping the nibbles (4 bit sections) of register 1920 (preferably as part of initializing step 2802), then performing a logical OR function on contents of registers 1920 and 1948 and loading the result into register 1958. POINT register 1920 would be reswapped (restored) prior to returning from the subroutine.

The contents of output shift register 1958 are then shifted out onto the serial data line (pin 13) and clocked into serial-in parallel-out register 1706 by synchronous clock signals generated at pin 17 of microcomputer 1702 (step 2805). A latch (RCLK) signal is then generated at pin 12 of microcomputer 1702, causing the bit pattern accumulated in the serial input register to be acquired by the output latch of register 1706 (step 2806). The resultant high output signal is applied at the designated push button, low signals provided to the other push buttons, and control signals provided to analog switch sets 1516 and 1518 in accordance with the contents of point register 1920 (step 2806).

The state of PBTNIN at pin 1 of microcomputer 1702, indicative of whether or not the particular button is depressed is then sampled/latched (step 2808). Since the high bit is provided only at one switch, PBTNIN will be high only if that particular push button is depressed.

The contents of push button register PBTN 1944 are then updated. More specifically, determination is made as to whether the PBTNIN signal at pin 1 of microcomputer 1702 is high (step 2810). If the push button input signal is high, a logical OR function is performed on the contents PBNTCT of the push button counter in 1948 and the push button register 1944, with the result that if PBNTIN is high, a 1 is loaded into the particular bit in push button register 1944 corresponding to the selected push button (step 2812).

The contents of push button counter 1948 are then tested to determine if the states of all of the switches have been read, e.g., the 1 has been shifted into the fifth bit (contents equal to digital 16) (step 2816). If the push button count does not indicate that the cycle is complete, the contents of push button counter 1948 are then shifted left (step 2814) to place logic 1 in the bit corresponding to the next successive push button and zeroes in the remaining bits and the read cycle is repeated. The contents of push button counter 1948 and point register 1920 are concatenated in output shift register 1958 (step 2804), clocked out as serial data into register 1706 (step 2805), and output to the push buttons (and analog switches) (step 2806). The push button input signal is read (step 2808). Push button state register 1944 is updated (steps 2810 and 2812), and push button counter 1948 again tested (step 2816). This process is repeated until the contents of push button counter 1948 reflect a complete reading sequence.

When all of the push buttons have been read, a determination is made as to whether or not there has been a change in state in any of the push buttons (step 2818). More specifically, the contents of push button state register 1944, reflecting the present state of the switches, is tested against the previous state of the push buttons reflected in register 1946. If a change is detected, i.e., PBTN is not equal to OLDPBTN, OLDPBTN and the relevant flags in register 1942 are updated (step 2820); the contents of push button register 1944 are loaded into old push button register 1946; and established in bits 0–3 of flag 1 register 1942, by first clearing those bits (perform a logical AND of Flag 1 and 0fhex), then performing a logical OR function of the contents of push button status register 1942 and Flag1 register 1942. After the flags have been updated, if necessary, various of the involved registers are restored (PBTN and PBNTCT are cleared, and the nibbles of POINT reswapped) (step 2822) and a return is effected (step 2824).

As previously noted, to conserve energy and control noise, engine speed control is suitably effected in accordance with load; rotor RPM is suitably maintained at the lowest value necessary to provide the desired rail voltage to the load. Rotor RPM is controlled by varying the pulse width of the signal provided at pin 3 of microcomputer 1702 to driver 1714. That pulse width is established by the value of TPW in register 1950. Changes in load are reflected as a variation of the values of the DC rail voltage Rvolt and AC output voltage Vac from predetermined target values, e.g., Vtarget and Vtac. If the output voltages are less than the target values, the load permits the RPM to be lowered, i.e., the pulse width of the signal provided to driver 1714 is decreased. Conversely, if the rail voltage is higher than the target value, the load requires that the RPM be increased, i.e., the pulse width of the signal provided to driver 1714 is increased. This is effected through throttle control subroutine 2900.

Figure 29:
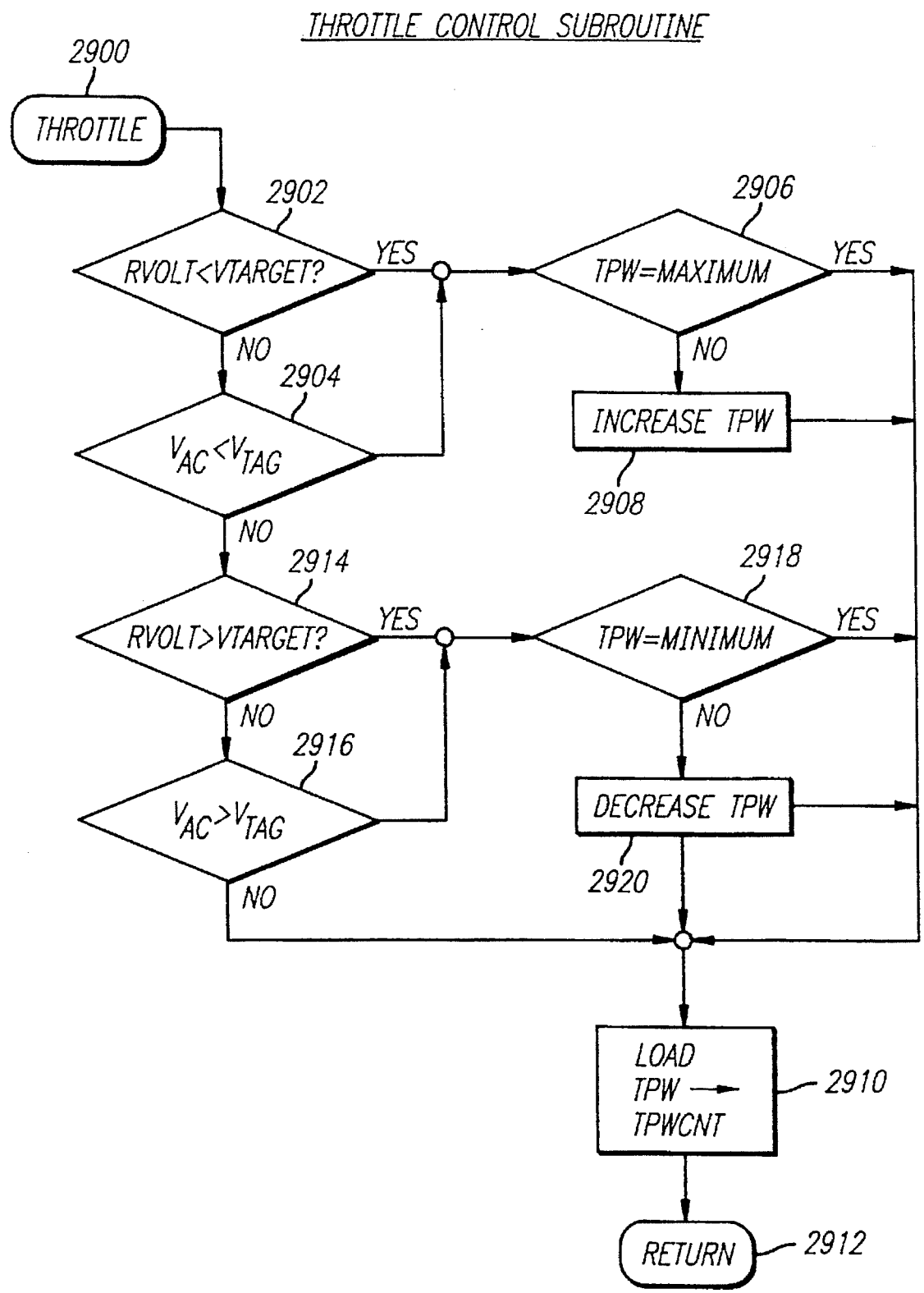
FIG. 29 is a functional flow chart of a THROTTLE routine effected by the microcomputer of FIG. 17.

Referring now to FIG. 29, when throttle control subroutine 2900 is called, the indicia of rail voltage (Rvolt) contained in register 1904 is tested against, e.g., Vtarget in register 1952 (step 2902). Vtarget is initially set in accordance with the selected welding mode (see Table 4), and thereafter adjusted by depressing the increment and decrement buttons. The indicia of AC voltage (Vac) contained in register 1907 is likewise tested against a predetermined value, e.g., Vtag (suitably a pre-determined value incorporated into the program) (step 2904). If either the DC rail voltage or AC voltage is less than the corresponding target value, the throttle pulse width indicia (TPW) in register 1950 is tested against a predetermined maximum (suitably a pre-determined value incorporated into the program code) (step 2906), and so long as the pulse width has not reached the maximum value, the pulse width TPW is incremented by one pre-determined unit, (step 2908), the updated TPW value in register 1950 is loaded into the pulse width counter 1951 (step 2910) and a return effected (step 2912).

If neither the DC rail voltage or AC voltage are greater than the corresponding desired values, a test is effected to see if the loads have decreased, i.e., the DC rail voltage or AC voltage has increased to above the corresponding target value (steps 2914, 2916). If the DC rail voltage or AC voltage is greater than the corresponding target value, the throttle pulse width is decreased, down to a minimum value. The indicia of throttle pulse width contained in register 1950 is tested against the pre-determined minimum value (again, suitably hard programmed) (step 2918), and, if greater than the minimum, decremented by a pre-determined unit value (step 2920). The updated TPW value is then loaded into TPWCT register 1951 (step 2910) in preparation for the next output cycle (steps 2332, 2530–2534) and a return effected (step 2912). Throttle control can be effected, if desired, as a function of either DC rail voltage or AC voltage alone.

Figure 30A:
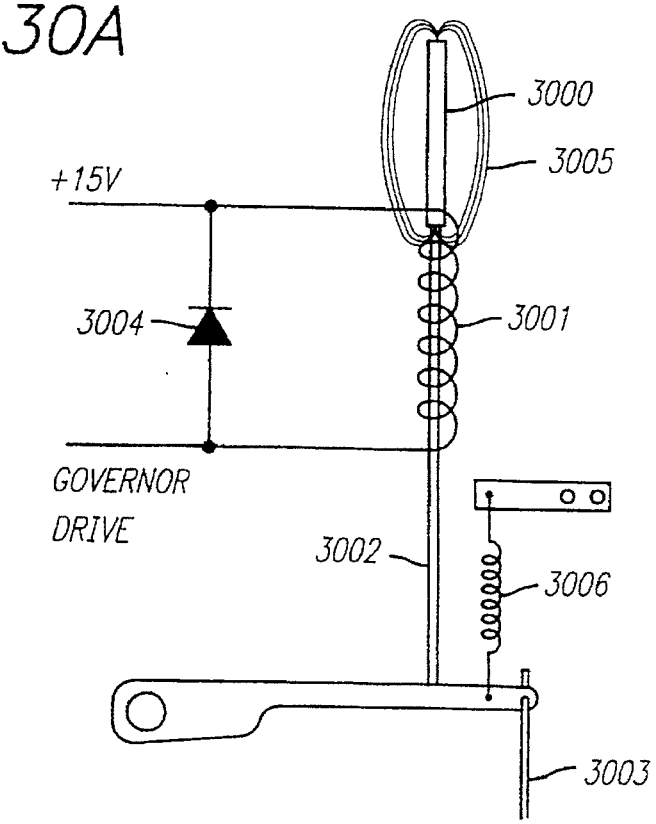
FIGS. 30A and 30B are schematic illustrations of a throttle control in respective states routine effected by the microcomputer of FIG. 17.
Figure 30B:
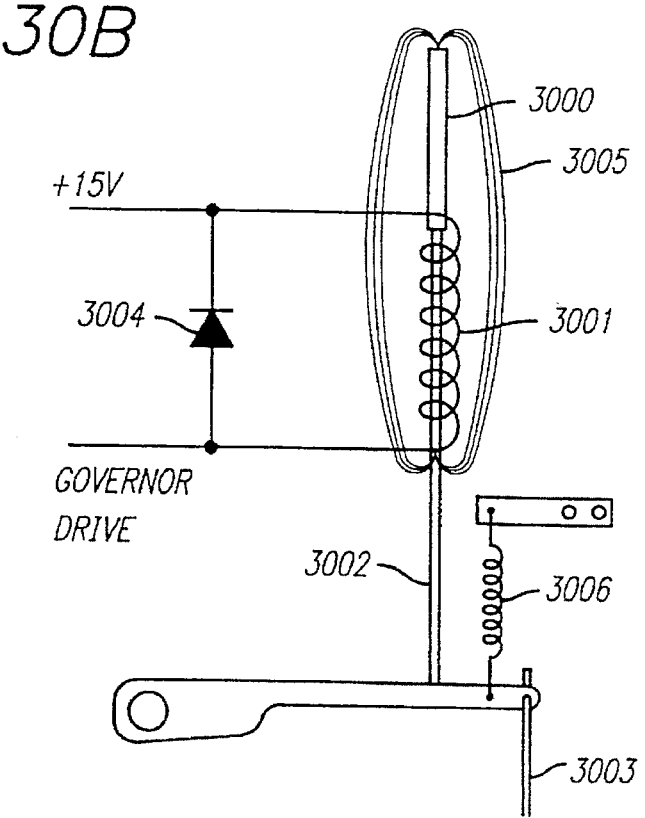

Referring to FIGS. 30A and 30B, a particularly advantageous load demand governor control comprises a cylindrical magnet 3000, magnetized through the length, suitably formed of Alnico, cooperating with a non-magnetic push rod 3002, for example, formed of nylon, and a winding 3001 wound around a suitable core, e.g., formed of cast nylon. Push rod 3002 cooperates with throttle lever arm 3003. A spring 3006 biases throttle arm 3003 into an idle position.

When the signal at pin 3 is generated, and transistor Q11 rendered conductive, a current path is formed through winding 3001 causing magnetic interaction with cylindrical magnet 3000. The magnetic interaction between coil 3001 and magnet 3000, causes magnet 3000 to move forward (FIG. 30B) against the bias of spring 3006, throttling up (increasing the RPM) of engine 12. As previously noted, the control signal generated at pin 3 of microcomputer 1702 is suitably pulse-width modulated. The wider the pulse width, the more power to coil 3001, and concomitantly, the greater the movement of magnet 3000, push rod 3002, and throttle arm 3003. If desired, a fly-back diode 3004 can be provided across coil 3001.

As previously noted, referring again briefly to FIG. 17, microcomputer 1702 suitably cooperates with serial-in-parallel output register 1707 to generate respective switching signals LHRL (Left High, Right Low), and RHLL (Right High, Left Low) to power converter 3100. In response, power converter 3100 effects controlled application of the DC rail voltage(s) to output terminals L1 and L2. More specifically, microcomputer 1702 and register 1707 cooperate to generate, (at pins Q0 and Q1 of register 1707), respective alternative pulses of controlled pulsewidth, relative timing, and repetition rate as switching signals LHRL and RHLL. Microcomputer 1702 and register 1707, may also generate, if desired, further a switching signal HIV (High Voltage) (at pin Q2 of register 1707), to power converter 3100 to effect advantageous shaping of output signal 3102.

Power converter 3100, in response to switching control signals LHRL and RHLL, (and further switching signal HIV, if utilized), selectively applies DC voltage(s) to terminals L1 and L2 of outlet 1526 to generate output signal 3102 with a predetermined waveform. Referring to FIG. 31, a suitable basic power conversion circuit 3100A comprises: respective high-side isolated power switch circuits 3102 and 3104; respective low-side non-isolated power switch circuits 3106 and 3108.

High-side isolated power switch circuits 3102 and 3104 and low-side non-isolated power switch circuits 3106 and 3108 each include a power transistor (Q1, Q2, Q3, and Q4, respectively) and a suitable firing circuit for turning the power transistor on and off in accordance with switching signals LHRL and RHLL. Power switch circuits 3102–3108 are interconnected in an H-configuration: high-side isolated power switch circuits 3102 and 3104 define controlled current paths to output terminals L1 and L2, respectively, electrically connected together at a high-side terminal 3103 (e.g., the drains of power transistors Q1 and Q2 are connected at terminal 3103); and low-side non-isolated power switch circuits 3106 and 3108 define controlled current paths to output terminals L1 and L2, respectively, electrically connected together at a low-side terminal 3107 (e.g., the sources of power transistors Q3 and Q4 are connected at terminal 3107).

In the basic configuration of FIG. 31, high-side terminal 3103 is connected to a positive DC source of predetermined nominal (+150 V) and low-side terminal 3107 is connected, to negative rail 1501C (and through isolation diode D7 to system ground). The positive DC source may be e.g. a signal derived from intermediate DC rail 1501B, or, preferably, separate inverter rail 3306.

Power switch circuits 3102–3108 effectively operate as an electronically controlled double throw, double pole switch, selectively connecting the DC source to terminals L1 and L2 in response to switching control signals LHRL and RHLL. More specifically, switching signal LHRL is applied to high-side isolated driver 3102 and low-side non-isolated driver 3108, and switching signal RHLL is applied to high-side isolated driver 3104 and low-side non-isolated driver 3106. When LHRL is of a predetermined state, (e.g., low), high side terminal L1 is connected to positive DC rail 1501A by driver 3102, and low side terminal L2 is connected to negative DC rail 1501C by driver 3108. Conversely, when RHLL is of a predetermined state, (e.g., low), high side terminal L1 is connected to negative DC rail 1501C by driver 3104, and low side terminal L2 is connected to positive DC rail 1501A by driver 3106. By alternately generating switching signals LHRL and RHLL, a simulated sine wave 3102, shown in FIG. 16, can be produced; one pair of drivers is turned off time T1 and the opposing pair is thereafter turned on at time T2. The RMS value of the signal is controlled by the period of time ("dead time") between turning off one pair of drivers (time T1) and the turning on of the opposing pair (time T2). Control of the dead time in relationship to the voltage levels provides an RMS value approximately equal to that of the desired sine wave.

It is desirable that the firing circuits of isolated drivers 3102 and 3104 quickly the associated power transistor Q1, Q2 into a saturated state when the associated switching signal LHRL, RHLL changes state to minimize power dissipation during the switching interval. A particularly economical firing circuit that provides advantageous turn on and turn off characteristics comprises: a resistor R13 (R19); an NPN transistor Q9 (Q10); a diode D2 (D3); a capacitor C4 (C2); and respective resistor R9 (R15) and R6 (R10). If desired, respective capacitors C8 (C10) and C6 (C9) may be connected between the drain and source and gate and source of power transistor Q1 (Q2) to prevent any high frequency oscillations, and a Zener diode Z4 (Z7) connected between the drain and source of power transistor Q1 (Q2) to limit the gate voltage to no more than a predetermined value, e.g. 15 v.

In the preferred embodiment control signals LHRL and RHLL are at a low level when actuated and a high level when nonactuated. When the associated control signal LHRL (RHLL) is nonactuated, i.e. high, transistor Q9 (Q10) is rendered conductive. This, in effect, grounds the gate of power transistor Q1 (Q2) and renders it nonconductive. However, a current path is created from the 15 volt supply through diode D2 (D3) and resistor R6 (R10); approximately 15 v is thus dropped across resistor R6 (R10). With transistor Q9 (Q10) conductive, capacitor C4 (C2) is effectively in parallel with resistor R6 (R10) and is therefore charged to a level (approximately 15 v) somewhat in excess of the threshold gate voltage (e.g., 8 v) necessary to place power transistor Q1 (Q2) into saturation.

When the associated control signal LHRL (RHLL) changes to an actuated state, i.e. goes low, transistor Q9 (Q10) is rendered nonconductive. This, in effect, places the gate of power transistor Q1 (Q2) at 15 v and renders it conductive. When power transistor Q1 (Q2) is rendered conductive, the device exhibits very little resistance, and the source voltage approaches the voltage of the drain (e.g., 150 volts) the negative terminal of capacitor C4 (C2) thus assumes a voltage approximating the rail voltage (150 volts). Since capacitor C4 (C2) is already charged to approximately 15 volts, the positive side of the capacitor is at a voltage approaching the rail voltage plus the charge voltage, i.e., 165 volts. This, in effect, reverse biases diode D2 (D3), rendering the diode non-conductive and effectively blocking the 15 volts. However, since capacitor C4 (C2) is charged to a level above the set saturation threshold gate voltage of power transistor Q1 accordingly, transistor Q1 continues to conduct. The level of the source voltage (15 volts) and the level to which capacitor C4 (C2) is initially charged, is chosen to initially place power transistor Q1 (Q2) into a hard full conduction. However, once diode D2 is blocked, capacitor C2 begins to discharge through resistor R9 (R10). The time constant of capacitor C4 (C2) and resistor R9 (R10) is chosen such that the charge on capacitor C4 (hence the gate voltage) approaches (is only slightly above) the threshold value of power transistor Q1 (Q2) at the point in time when the associated control signal LHRL (RHLL) changes state. In those systems where the frequency varies, the time constant is chosen such that the gate voltage is approaching (slightly higher than) the threshold value at the lowest frequency at which the system is intended to operate. When the associated control signal (RHLL) initially resumes a non-actuated state, i.e., goes high, transistor Q9 (Q10) is again rendered conductive, grounding the gate of, and turning off, power transistor Q1 (Q2) and the cycle is repeated. By discharging capacitor C4 (C9) to a point approaching the threshold voltage (eliminating excess charge), the turn off speed of power transistor Q1 (Q2) is increased.

As previously noted, converter 3100 may derive power from one or more of DC rails 1501A and 1501B, or from one or more independent inverter rails 3304, 3306 established by inverter rail generation system 3300. Inverter rail generation system 3300 suitably comprises one or more winding groups 400A, 400B wound on stator core 302 (e.g., two sets, four coils) and cooperating three-phase rectifiers (e.g., regulated rectifier bridges and/or unregulated rectifier bridges). The outputs of the rectifiers preferably do not contribute to the voltages on DC rails 1501A or 1501B, but rather establish separate, generally independent inverter rails (3304, 3306). Use of independent winding groups 400A, 400B and cooperating rectifiers to establish substantially independent DC voltage(s) to supply inverter 3100 facilitates concurrent operation of inverter and, e.g., welder operation.

Inverter winding groups 400A, 400B may be wound concurrently on stator core 302 with the corresponding windings of winding groups 400. In such case, although physically wound with a winding group 400, winding 400A, 400B would be independently controlled (by system 3300), and may be operatively connected in the system irrespective of the status of the winding group 400 with which it is wound. Winding inverter rail windings 400A, 400B in the same physical space and in continuous thermal contact with DC rail windings 400 can provide particularly advantageous heat dissipation characteristics; the close proximity of the respective coils effectively makes the entire mass of the skein available to dissipate the heat generated by the working winding(s). Alternatively, inverter winding groups 400A, 400B may be respective ones of winding groups 400. Where a plurality of winding groups 400A, 400B are used, the groups are preferably disposed angularly equidistant about stator core 302.

Regulators 3202 can, if desired (and microcomputer capacity) permitting, substantially replicate regulators 1502, with the SCRs controlled in a manner analogous to the control of 1502. Alternatively, regulators 3202 may be "self-timing." Referring to FIG. 32, a suitable self-timing regulator 3202 comprises: a rectifier bridge 3204; a leveling capacitor C21; a comparator 3206; and an opto-isolator 3208. Rectifier bridge 3204 is suitably formed of respective diodes D28, D29 and D30 and respective SCR's TH1, TH2, and TH3. Comparator 3206 suitably comprises transistor Q11 and a voltage divider formed of resistors R21 and R24.

The output leads from 3-phase winding 400A (400B) provides 3-phase input signals to bridge 3204. The output signals of winding 400A (400B) are of variable voltage and frequency in accordance with the RPM of the engine. Comparator 3206 selectively generates an activating signal to opto-isolator 3208 (AND gated with the enable signal (SCR15–SCR18) from controller 1700) to turn on SCR's TH1, TH2, and TH3 to generate a regulated output across DC rails 905A and 905B. In essence, comparator 3206 provides active feedback to maintain the rail voltage at the predetermined level, e.g., 150 volts. Indicia of the rail voltage is derived, and compared against a reference voltage (a stable regulated DC voltage provided by regulator 914). Assuming the winding to be in the system, (i.e., the associated enable signal SCR15–SCR18 is high), when the rail drops below the designated voltage, e.g., 150 volts, comparator 3206 activates opto-isolator 3208 to turn on SCRs TH1–TH3.

In some instances, one or more of the rectifiers 3202 can be unregulated. For example where the outputs of all rectifiers associated with windings 400A are connected in parallel, the outputs of all rectifiers associated with windings 400B are connected in parallel, and the parallel groups connected in series, the rectifiers associated with windings 400B can be unregulated.

As previously noted, a closer approximation to a desired sine wave output can be achieved by shaping the waveform of output signal 3102. Referring to FIG. 16B, such a waveform may be generated by controllably applying first and second DC signals through the activated high side power transistor to the associated output terminal. The simulated sine wave waveform of FIG. 16B is generated by, in effect, connecting the active terminal (L1, L2) to signals derived from intermediate positive rail 3304, and positive rail 3306, in sequence. Alternatively, the first and second DC may be signals derived in whole or in part from high positive rail 1501A and intermediate positive rail 1501B, respectively.

Referring to FIGS. 16B, 33, 34, and 35, additional winding groups 400B and 400A are wound on stator 210. Winding 400B cooperates with a conventional three-phase diode bridge 3302 to generate an independent intermediate positive rail 3304 of predetermined voltage (e.g., 70 v). Winding 400A cooperates with a three-phase regulated bridge 1502 to generate an independent high positive rail 3306 of predetermined voltage (e.g., 150 v).

The intermediate voltage can be alternative to the high voltage provided by winding 400A, or it can be additive. For example, referring to FIG. 33, the intermediate positive rail and positive rail voltages can be independently developed, e.g., winding 400B generates the intermediate voltage, and winding 400A generates the entirety of the high voltage, substantially independently from winding 400B. If desired, however, windings 400A and 400B can be utilized to cooperatively generate the desired voltage at high positive rail 3306. Referring briefly to FIG. 34, in such an arrangement winding 400B would include a predetermined number of windings corresponding to the desired voltage and intermediate rail 3304, and diode bridge 3302 would be interposed between regulator 1502 and negative rail 1501C. A winding 400C, corresponding to winding 400A, but including a predetermined number of turns corresponding to the difference between the desired voltage at intermediate rail 3304 and the voltage, e.g., 150 volts, at positive rail 3306 is provided.

Figure 35A:
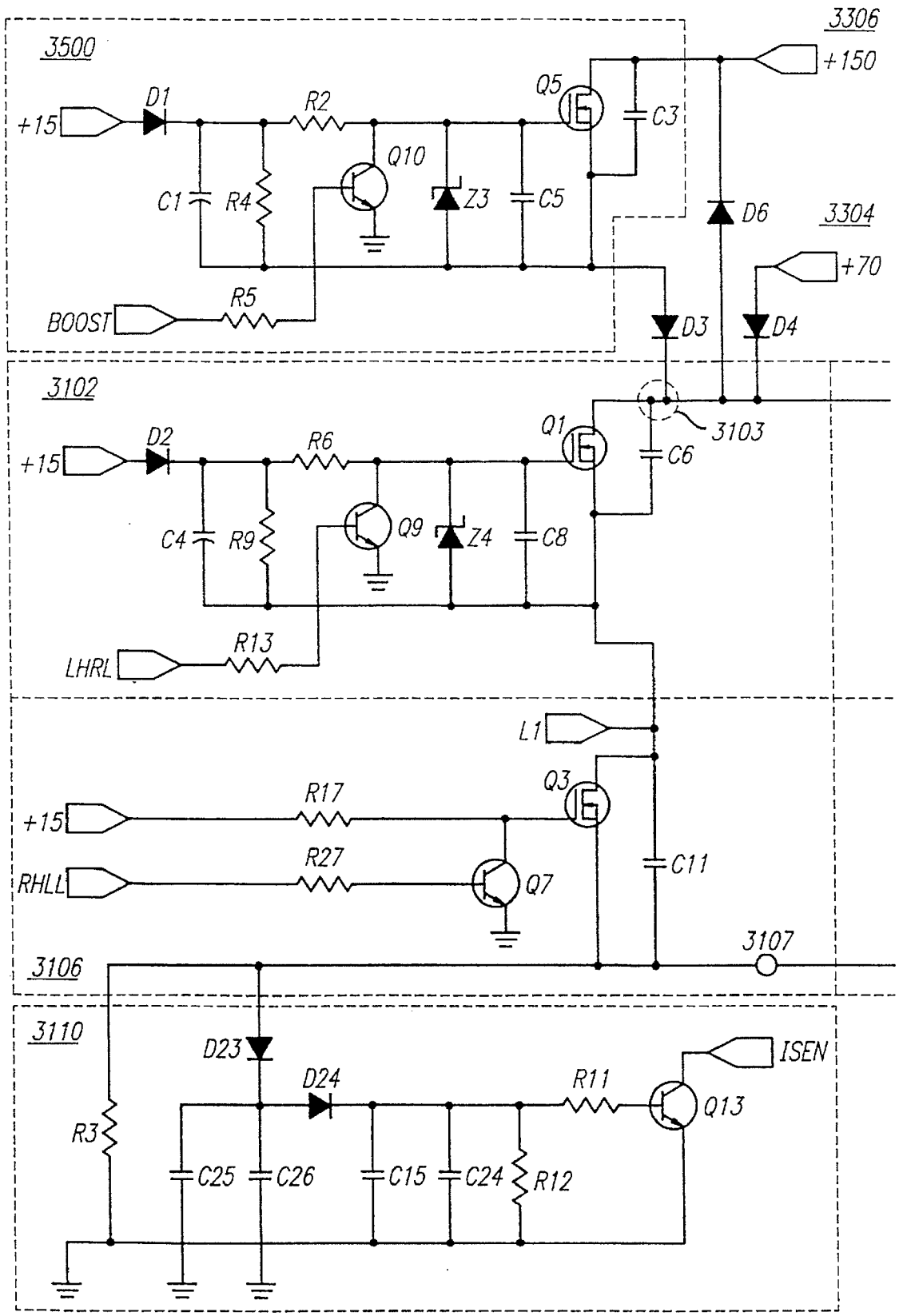
FIGS. 35 and 36 are schematic diagrams of alternative power converters suitable for use in the system of FIG. 15.
Figure 35B:
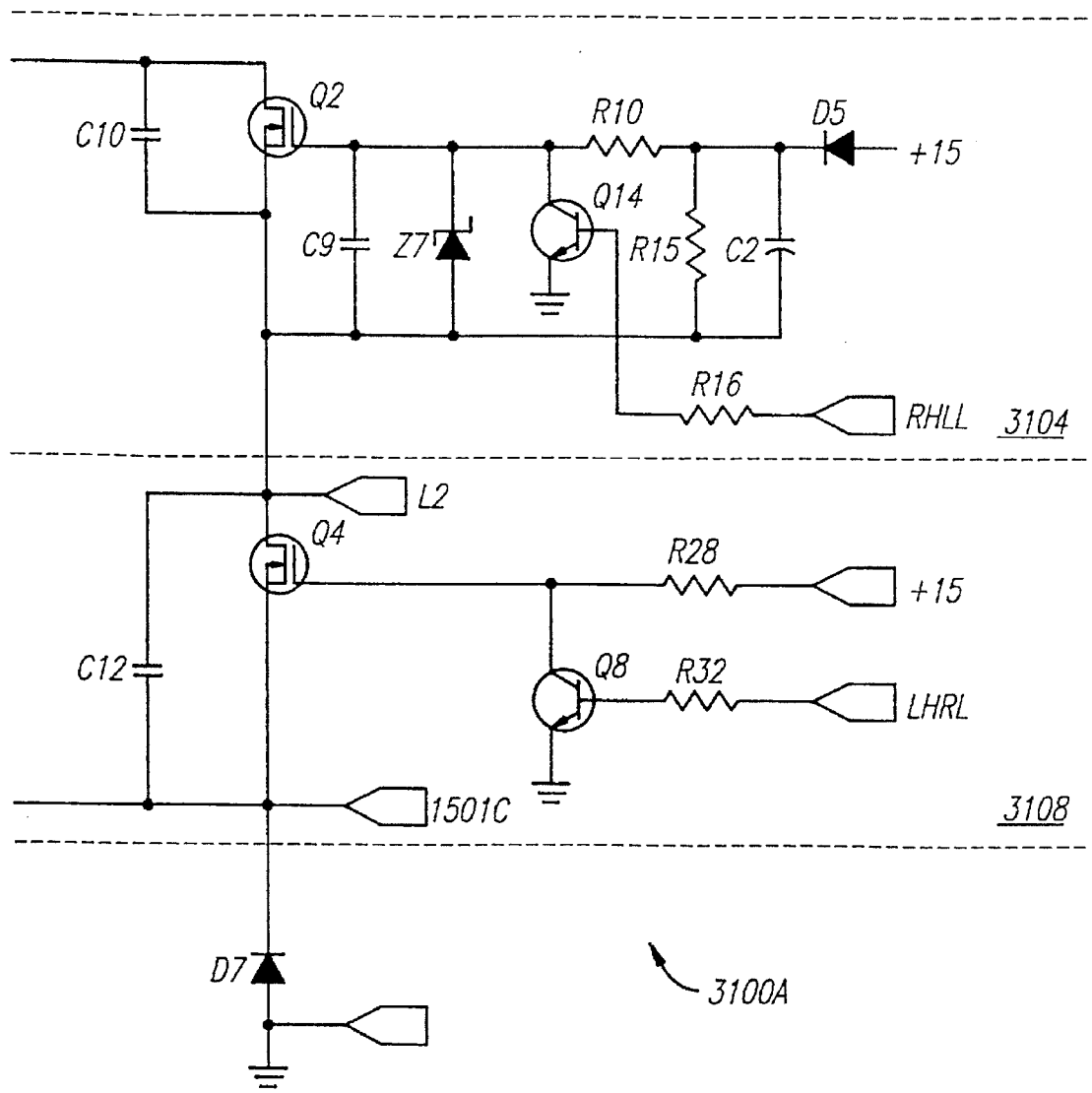

Referring to FIG. 35, the intermediate voltage (70 v) rail 3304 is connected high side terminal 3103 of basic power converter 3100A (i.e., to the drains of power transistors (FET's) Q1 and Q2 in high side isolated power switches 3102 and 3104), through a suitable isolation diode D4. High voltage (e.g., 150 v) positive rail 3306 is selectively coupled to high side terminal 3103 of basic power conversion circuit 3100A through a booster circuit 3500. Booster circuit 3500 is substantially identical to high side isolated power switching circuits 3102 and 3104, including an FET Q5, and an associated firing circuit. Booster circuit 3500, however, is responsive to control signal HIV from controller 1700, corresponding to 1614 (T3–T4) in FIG. 16B. The drain of booster circuit FET Q5 is connected to high voltage positive rail 1501A. The source of the power transistor is connected through an isolation diode D3 to the drains of the power transistors Q1 and Q2 in high side power switching circuits 3102 and 3104. A reverse polarity flyback diode D6 may be provided if desired.

Figure 36A:
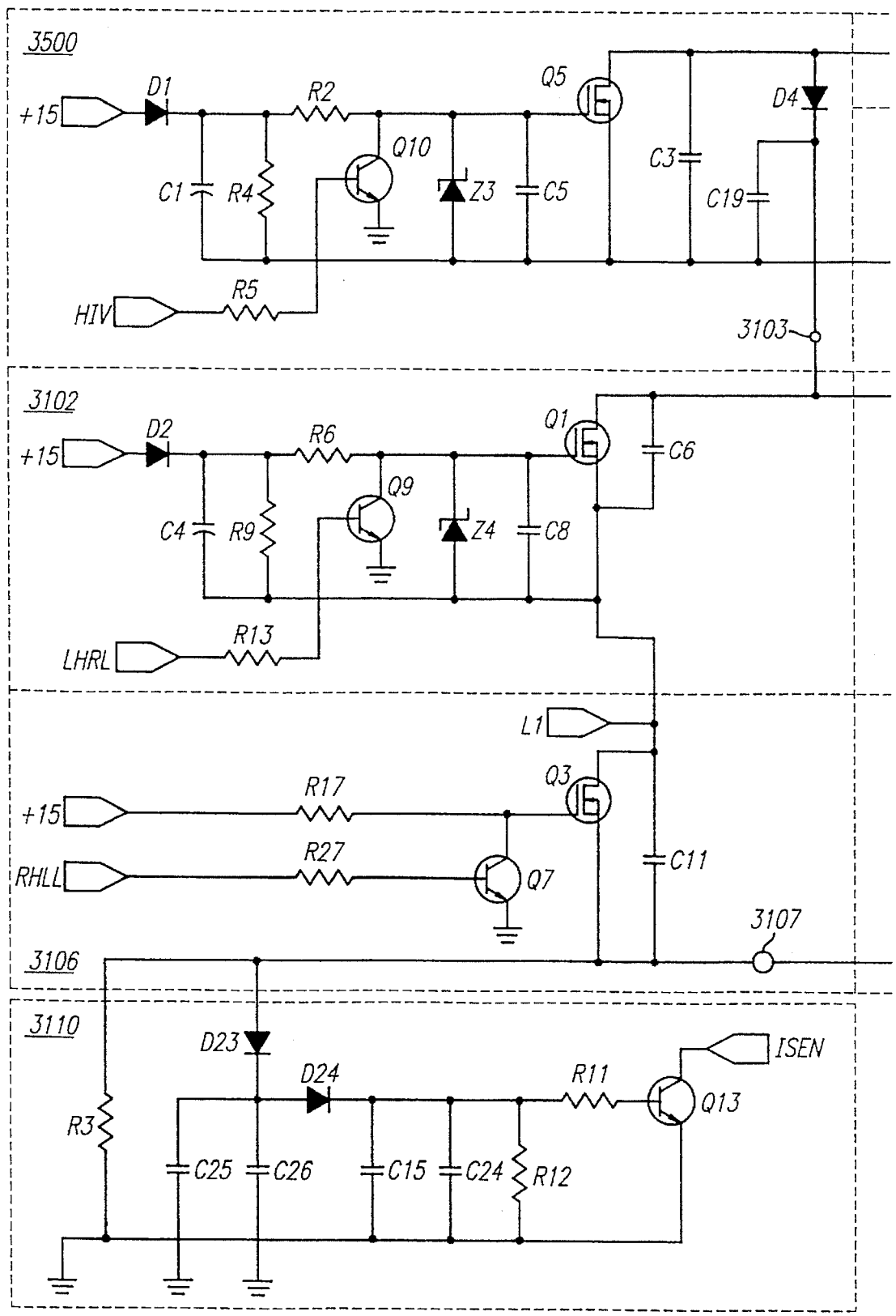
Figure 36B:
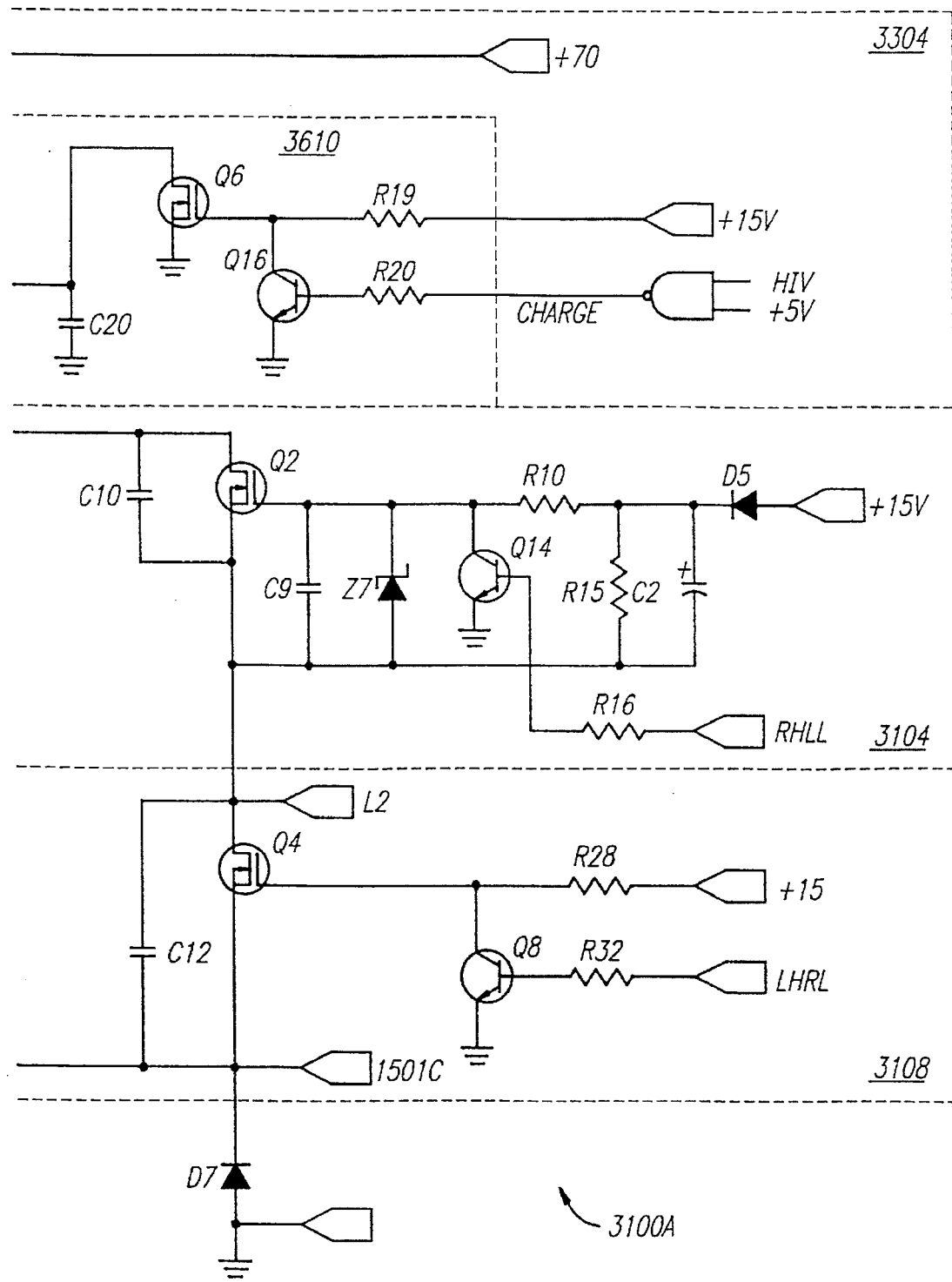

An auxiliary (BOOST) voltage can also be generated without the addition of an auxiliary winding 400A from, for example, the energy generated during the output signal dead time. This is accomplished by, in effect, storing the energy generated during the output signal dead time (which otherwise would be wasted) in a capacitor, and controllably discharging the capacitor to generate the booster pulse. Specifically, referring briefly to FIGS. 16B and 36, a separate control signal (CHARGE) is generated by inverting (through NAND Gate 3602) the HIV control signal, i.e.,the CHARGE signal is active during those periods from the trailing edge of a booster pulse (T3) to the leading edge of the booster pulse in the next successive half-cycle. The CHARGE signal is applied to a controlled storage/discharge circuit 3610 which effects charging and discharging of a capacitor to generate the booster pulse. Circuit 3610 suitably comprises an NPN transistor Q16, an FET Q6 and a capacitor C19. The CHARGE control signal is applied to the base of transistor Q16. When the charge signal is activated (e.g., low), FET Q6 is rendered conductive, effectively connecting capacitor C19 to positive rail 3306. (The use of the dead time energy to generate the booster pulse permits a lower rail voltage to be employed.) When the HIV (BOOST) control signal is actuated and hence control signal CHARGE de-actuated, FET Q6 is rendered non-conductive, and capacitor C19 additively discharges to the high side terminal 3103 of basic power convertor 3100A to provide the boost pulse.

It will be understood that while various of the conductors and connections are shown in the drawing as single lines, they are not so shown in a limiting sense, and may comprise plural connections or connectors as understood in the art. Similarly, various power connections and various control lines and the like various elements had been omitted from the drawing for the sake of clarity. Although the present invention has been described in conjunction with various exemplary embodiments, the invention is not limited to the specific forms shown, and it is contemplated that other embodiments of the present invention may be created without departing from the spirit of the invention. Variations in components, materials, values, structure and other aspects of the design and arrangement may be made in accordance with the present invention as expressed in the following claims.

We claim:

1. A control system for a generator, said generator having a plurality of substantially magnetically independent windings generating electricity and a connector for connecting a load to the windings, comprising:

a plurality of switches, wherein each of said switches is connected between one of the generator windings and the load connector such that said switch may connect and disconnect the windings to the load connector; and a controller connected to said plurality of switches for selectively activating and deactivating said switches to vary the number of windings connected to the load connector in accordance with an operating parameter of the generator.

2. The control system of claim 1, further comprising a sensor responsive to the operating parameter of the generator for generating indicia of said operating parameter, wherein said controller is responsive to said sensor indicia.

3. The control system of claim 2, wherein said operating parameter is the output voltage of the generator.

4. The control system of claim 2, wherein said operating parameter is the output current of the generator.

5. The control system of claim 2, wherein said operating parameter is temperature of a portion of the generator.

6. A control system for a generator having a plurality of windings generating electricity and a connector for connecting a load to the windings to receive the electricity, comprising:

a plurality of switches, wherein each of said switches is connected to selectively effect a current path between respective windings and the load connector; and a controller connected to said plurality of switches for selectively activating and deactivating said switches wherein said controller varies the sequence of said selective activation and deactivation of said switches to distribute heat generation among the generator windings.

7. The control system of claim 6, wherein at least one of said switches comprises a silicon controlled rectifier (SCR).

8. The control system of claim 6, wherein said controller includes a microprocessor.

9. The system of claim 8 wherein at least some of the windings are selectively connected across by-pass diodes, the by-pass diodes effectively connected to the load connector in series.

10. The system of claim 8 wherein at least some of the windings are effectively connected to the load connector in parallel.

11. The system of claim 8 wherein the plurality of windings comprise a plurality of groups of stator windings disposed such that rotation of the rotor induces current in the stator windings, the plurality of groups of windings being substantially magnetically independent from each other.

12. The system of claim 8 wherein:

the windings comprises a plurality of three-phase windings;

the switches constitute part of at least one controlled rectifying circuit cooperating with each winding group; and the system further comprises a respective supplemental diode connected across each rectifying circuit, the supplemental diodes being connected in series.

13. The system of claim 12 wherein the switching circuit further includes a capacitance connected in parallel with the output terminals.

14. The system of claim 8 wherein the windings include a first set of individual groups of windings arranged for selective connection in parallel, and a second set of individual groups of windings arranged for selective connection in parallel, the first and second sets being connected in series.

15. The system of claim 11 wherein:

the generator includes a rotor and a stator;

the rotor has a predetermined number of poles; and the stator includes a soft magnet core having a crenelated inner periphery with a predetermined number of equally spaced teeth and slots, equal to a predetermined multiple of the number of rotor poles times the number of phases, with a predetermined number of said windings wound through the slots about predetermined numbers of the teeth.

16. The system of claim 8 wherein the switches constitute a portion of a controlled rectifier.

17. The system of claim 16, further including an inverter cooperating with the rectifier.

18. The system of claim 8 wherein the controller comprises a microcomputer.

19. The system of claim 8 wherein:

the generator includes a rotor and a stator; and the stator includes a soft magnet core having a crenelated inner periphery with a predetermined number of equally spaced teeth and slots, with a predetermined number of said windings wound through the slots about predetermined numbers of the teeth.

20. The system of claim 19 wherein the rotor comprises a predetermined number of poles and the windings comprise groups of respective phase windings connected together at one end in a star configuration, and the winding corresponding to each phase wound about a predetermined number of teeth corresponding to a rotor pole, with each successive phase winding shifted by one slot, and wound in the opposite direction from the preceding phase winding.

21. The system of claim 19 wherein the rotor comprises:

a core having a surface proximate to the stator with insets and portions between the insets forming respective consequence poles, each consequence pole having a predetermined surface area proximate to the stator; and a plurality of permanent high energy product magnets mounted in the insets separated from adjacent consequence poles by a predetermined distance, the magnets having a predetermined surface area proximate to the stator greater than the surface area of the consequence poles proximate to the stator, separated from the stator by a predetermined gap distance such that relative motion of the rotor and stator causes magnetic flux from the magnets to interact with and induce current in the stator windings.

22. The generator of claim 21 wherein the surface area of the permanent magnets proximate to the stator is greater than the surface area of the consequence poles proximate to the stator by the ratio of the flux density produced by the permanent magnet to the allowed flux density of the consequence pole.

23. The apparatus of claim 21 wherein the magnets have a flux density of at least on the order five kilogauss.

24. The apparatus of claim 21 wherein the distance separating the magnets from the consequence poles is greater than the predetermined gap distance separating the rotor surface from the stator.

25. The system of claim 8 further comprising at least one sensor for generating indicia of a control parameter, and wherein the control circuit, responsive to said indicia, generates control signals to the switches to vary the number of windings connected to the load connector in accordance with the control parameter.

26. The system of claim 25, wherein the control parameter is the speed of rotation of the rotor.

27. The system of claim 11 further comprising at least one sensor for generating indicia of a control parameter, and wherein the control circuit, responsive to said indicia, generates control signals to the switches to vary the number of individual groups of stator windings connected to the load connector in accordance with the control parameter.

28. The system of claim 27, wherein the control parameter is the speed of rotation of the rotor.

29. The system of claim 8 further comprising at least one sensor for generating a feedback signal indicative of a control parameter, and wherein the control circuit, responsive to said feedback signal, generates control signals to the switches to vary the number of windings connected to the load connector in accordance with the control parameter.

30. The system of claim 29, wherein the control parameter is the magnitude of the current drawn at the load connector.

31. The system of claim 29, wherein the control parameter is the magnitude of the voltage at the load connector.

32. The system of claim 29 wherein the controller comprises a microcomputer.

33. The system of claim 29 wherein the controller comprises:
   a voltage divider with a predetermined number of steps, having a signal indicative of the control parameter applied thereto; and,
   a respective comparator associated with each step of the divider, the comparator generating an output signal indicative of a comparison of the voltage at the associated divider step and a predetermined reference voltage associated with the step;
   the output signals of the comparators being applied as the control signals to the switches.

34. The system of claim 33 wherein the predetermined number of steps corresponds to the number of stator windings.

35. The system of claim 33 wherein the controller further comprises means for altering the sequence in which the windings are activated.

36. The system of claim 11 further comprising at least one sensor for generating a feedback signal indicative of a control parameter, and wherein the control circuit, responsive to said feedback signal, generates control signals to the switches to vary the number of individual groups of stator windings with current paths to the load connector in accordance with the control parameter.

37. The system of claim 36, wherein the control parameter is the magnitude of the current drawn at the load connector.

38. The system of claim 36, wherein the control parameter is the magnitude of the voltage at the load connector.

39. The system of claim 36 wherein the controller comprises:
   a voltage divider with a predetermined number of steps, having a signal indicative of the control parameter applied thereto; and,
   a respective comparator associated with each step of the divider, the comparator generating an output signal indicative of a comparison of the voltage at the associated divider step and a predetermined reference voltage associated with the step;
   the output signals of the comparators being applied as the control signals to the switches.

40. The system of claim 39 wherein the predetermined number of steps corresponds to the number of stator windings.

41. The system of claim 39 wherein the controller further comprises means for altering the sequence in which the windings are activated.

42. The system of claim 36 wherein the controller comprises a microcomputer.

43. The system of claim 25 wherein the control circuit comprises:
   a microcomputer, generating an output signal indicative of a count, incremented at predetermined intervals, and responsive to interrupt signals, generating control signals to the switching circuit to vary the number of individual groups of stator windings with current paths to the output terminals;
   a resistor ladder;
   a bus selectively coupling the microcomputer to the resistor ladder and to the switching circuit;
   the resistor ladder, responsive to the microcomputer count, generating a ramp reference signal reflecting that count; and
   at least one comparator, responsive to the ramp reference signal and to indicia of the control parameter, for generating a microcomputer interrupt signal in accordance with a comparison of the control parameter with the ramp signal, the instantaneous value of the microcomputer count when the parameter indica and reference ramp signal voltage are equal being indicative of the value of the control parameter;
   the microcomputer generating control signals to the switching circuit to vary the number of individual groups of stator windings with current paths to the output terminals in accordance with the value of the control parameter indicated by such instantaneous value of the microcomputer count.

44. The system of claim 43 wherein the comparator is internal to the microcomputer.

45. The system of claim 43 further including means for selectively applying indicia of one of a plurality of control parameters to the comparator.

46. The system of claim 43 further including respective input switches for providing operator input to the microcomputer, and a latch, connected to the bus, for capturing the state of the switches.

47. The system of claim 43 wherein the controller further comprises:
   at least one output register having a respective bit corresponding to each of the switches, the register being selectively receptive of input signals from the microcomputer; and
   an output latch corresponding to each output register, responsive to control signals from said microcomputer and selectively receptive of indicia of the contents of the output register, providing control signals to the switches.

48. The system of claim 47 wherein:
   the output register is a serial-input-parallel-output register; and
   the microcomputer provides a bit pattern corresponding to the desired states of the switches as serial data, and a load command signal to the output register.

49. The system of claim 43 wherein:

the controller includes a plurality of serial-input-parallel-output registers having respective bits corresponding to an associated group of switches; and the microcomputer provides a serial bit pattern, corresponding to the desired states of a group of switches, applied as data inputs to all of the output registers; and serial data clock signals, selectively provided synchronously with the serial data, the serial data clock signals being applied to a selected one of the output registers to select, and load the data into, the such register; and a latch control signal, applied to each of the output registers, subsequent to the serial bit pattern data, to load the accumulated pattern into a corresponding output latch, and hence, apply the bit pattern as control signals to designated switches.

50. Apparatus for converting mechanical energy into electrical energy at respective output terminals, comprising:

a rotor, adapted for selective rotation;

a stator, including a plurality of groups of stator windings disposed such that rotation of the rotor induces current in the stator windings, the plurality of groups of windings being substantially magnetically independent from each other;

a switching circuit, responsive to control signals applied thereto, selectively completing current paths between individual groups of stator windings and the output terminals; and a control circuit for generating control signals to the switching circuit to vary the number of individual groups of stator windings with current paths to the output terminals to achieve a desired output.

51. The apparatus of claim 50 wherein the switching circuit comprises a controlled rectifier.

52. The apparatus of claim 50 further comprising at least one sensor for generating indicia of a control parameter, and wherein the control circuit, responsive to said indicia, generates control signals to the switching circuit to vary the number of individual groups of stator windings with current paths to the output terminals in accordance with the control parameter.

53. The apparatus of claim 52, wherein the control parameter is the speed of rotation of the rotor.

54. The apparatus of claim 50 further comprising at least one sensor for generating a feedback signal indicative of a control parameter, and wherein the control circuit, responsive to said feedback signal, generates control signals to the switching circuit to vary the number of individual groups of stator windings with current paths to the output terminals in accordance with the control parameter.

55. The apparatus of claim 54, wherein the control parameter is the magnitude of the current drawn at the output terminals.

56. The apparatus of claim 54, wherein the control parameter is the magnitude of the voltage at the output terminals.

57. The apparatus of claim 56 wherein the control circuit comprises:

a voltage divider with a predetermined number of steps, having a signal indicative of the output voltage applied thereto; and, a respective comparator associated with each step of the divider, the comparator generating an output signal indicative of a comparison of the voltage at the associated divider step and a predetermined reference voltage associated with the step;

the output signals of the comparators being applied as the control signals to the switching circuit.

58. The apparatus of claim 57 wherein the predetermined number of steps corresponds to the number of stator windings.

59. The apparatus of claim 57 wherein the control circuit further comprises a respective buffer circuit electrically interposed between the voltage divider steps and associated comparators.

60. The apparatus of claim 57 wherein the control circuit further comprises a Zener diode of pre-determined breakdown voltage corresponding to the divider input voltage indicative of a maximum permitted output voltage, connected in parallel with the voltage divider.

61. The apparatus of claim 57 wherein the control circuit further comprises means for providing over-current protection.

62. The apparatus of claim 57 wherein the control circuit further comprises a second voltage divider, including a manually adjustable potentiometer, and connected to an internal, substantially constant voltage and ground, for generating the reference voltages to the comparators.

63. The apparatus of claim 57 wherein the control circuit further comprises means for altering the sequence in which the windings are activated.

64. The apparatus of claim 50 wherein the control circuit comprises a microcomputer.

65. The apparatus of claim 52 wherein the control circuit comprises a microcomputer.

66. The apparatus of claim 52 wherein the control circuit comprises:

a microcomputer, generating an output signal indicative of a count, incremented at predetermined intervals, and responsive to interrupt signals, generating control signals to the switching circuit to vary the number of individual groups of stator windings with current paths to the output terminals;

a resistor ladder;

a bus selectively coupling the microcomputer to the resistor ladder and to the switching circuit;

the resistor ladder, responsive to the microcomputer count, generating a ramp reference signal reflecting that count; and at least one comparator, responsive to the ramp reference signal and to indicia of the control parameter, for generating a microcomputer interrupt signal in accordance with a comparison of the control parameter with the ramp signal, the instantaneous value of the microcomputer count when the parameter indica and reference ramp signal voltage are equal being indicative of the value of the control parameter;

the microcomputer generating control signals to the switching circuit to vary the number of individual groups of stator windings with current paths to the output terminals in accordance with the value of the control parameter indicated by such instantaneous value of the microcomputer count.

67. The apparatus of claim 66 wherein the comparator is internal to the microcomputer.

68. The apparatus of claim 66 further including means for selectively applying indicia of one of a plurality of control parameters to the comparator.

69. The apparatus of claim 66 further including respective input switches for providing operator input to the microcomputer, and a latch, connected to the bus, for capturing the state of the switches.

70. The apparatus of claim 66 wherein the switching includes at least one switching device for each group of windings, and the controller further comprises:

at least one output register having a respective bit corresponding to each of the switching devices, the register being selectively receptive of input signals from the microcomputer; and an output latch corresponding to each output register, responsive to control signals from said microcomputer and selectively receptive of indicia of the contents of the output register, providing control signals to the switching devices.

71. The apparatus of claim 70 wherein:

the output register is a serial-input-parallel-output register;

the microcomputer provides a bit pattern corresponding to the desired states of the switching devices as serial data, and a load command signal to the output register.

72. The apparatus of claim 66 wherein:

the controller includes a plurality of serial-input-parallel-output registers having respective bits corresponding to an associated group of the switching devices; and the microcomputer provides a serial bit pattern, corresponding to the desired states of a group of switching devices, applied as data inputs to all of the output registers; and serial data clock signals, selectively provided synchronously with the serial data, the serial data clock signals being applied to a selected one of the output registers to select, and load the data into, the such register; and a latch control signal, applied to each of the output registers, subsequent to the serial bit pattern data, to load the accumulated pattern into a corresponding output latch, and hence, apply the bit pattern as control signals to designated switching devices.

73. The apparatus of claim 52 wherein the switching circuit includes at least one switching device for each group of stator windings and the control circuit comprises:

a voltage divider with a pre-determined number of steps corresponding to the number of groups of stator windings, having applied thereto a voltage indicative of the control parameter;

for each step, an associated buffer, an associated comparator, and an associated interface circuit, receptive of the comparator output, for generating control signals to the switching devices to selectively complete current paths between the respective winding groups to the output terminals in accordance with the control parameter.

74. The apparatus of claim 73 wherein the control parameter is the level of output voltage.

75. The apparatus of claim 50 wherein the switching circuit selectively connects individual groups of stator windings in parallel.

76. The apparatus of claim 50 wherein the switching circuit comprises: a capacitance and a at least one controlled rectifying circuits cooperating with each winding group, the rectifying circuits being connected in parallel to the capacitance.

77. The apparatus of claim 50 wherein:

each independent group of windings comprises a plurality of three-phase windings, and the switching circuit comprises:

at least one controlled rectifying circuit cooperating with each winding group; and a respective supplemental diode connected across each rectifying circuit, the supplemental diodes being connected in series.

78. The apparatus of claim 77 wherein the switching circuit further includes a capacitance connected in parallel with the output terminals.

79. The apparatus of claim 50 wherein the switching circuit selectively connects individual groups of stator windings in series.

80. The apparatus of claim 50 comprising a first set of individual groups of stator windings arranged for selective connection in parallel, and a second set of individual groups of stator windings arranged for selective connection in parallel, the first and second sets being connected in series.

81. The apparatus of claim 80 including a first output terminal, associated with the first set of individual groups of stator windings for providing a first regulated DC rail voltage, and a second output terminal associated with the second set of individual groups of stator windings for providing a second regulated DC rail voltage.

82. The apparatus of claim 81 further including an inverter deriving power from at least one of the regulated DC rail voltages.

83. The apparatus of claim 81 further including a third set of individual groups of stator windings, respective rectifiers cooperating with the third set of windings to generate an independent inverter rail voltage, and an inverter deriving power from the independent inverter rail voltage.

84. The apparatus of claim 50 further comprising an energy source disposed to selectively rotate the rotor.

85. The apparatus of claim 84 wherein the energy source comprises an internal combustion engine.

86. The apparatus of claim 85 wherein the engine includes an output shaft and a throttle, the output shaft, in operation, rotating at a speed in accordance with the setting of the throttle and the apparatus further includes:

a circuit for generating indicia of the output of the stator;

an electromechanical actuator, responsive to control signals applied thereto, for controlling the setting of the throttle;

said control circuit, responsive to the indicia of the stator output, generating the control signals to the actuator.

87. The apparatus of claim 86 wherein the control circuit comprises a microcomputer.

88. The apparatus of claim 86 wherein the circuit for generating indicia of the output of the stator comprises a zero crossing detector cooperating with one of the stator windings.

89. The apparatus of claim 84 wherein the energy source and stator are mounted on a common frame.

90. The apparatus of claim 85 wherein the engine and stator are mounted on a common frame.

91. The apparatus of claim 85 wherein the stator is mounted to the engine.

92. The apparatus of claim 50 wherein the rotor is a permanent magnet rotor.

93. The apparatus of claim 85 wherein the engine has an output shaft, and the rotor is mounted for rotation with the engine shaft.

94. The apparatus of claim 93 wherein the stator is mounted to the engine coaxially disposed with the rotor, such that the rotor is rotated in close proximity to the stator.

95. The apparatus of claim 93 wherein the stator is generally annular with a central aperture, disposed such that the rotor rotates within the aperture.

96. The apparatus of claim 50 wherein the rotor comprises:

a core having a surface proximate to the stator with insets and portions between the insets forming respective consequence poles, each consequence pole having a predetermined surface area proximate to the stator; and a plurality of permanent high energy product magnets mounted in the insets separated from adjacent consequence poles by a predetermined distance, the magnets having a predetermined surface area proximate to the stator greater than the surface area of the consequence poles proximate to the stator, separated from the stator by a predetermined gap distance such that relative motion of the rotor and stator causes magnetic flux from the magnets to interact with and induce current in the stator windings.

97. The generator of claim 96 wherein the surface area of the permanent magnets proximate to the stator is greater than the surface area of the consequence poles proximate to the stator by the ratio of the flux density produced by the permanent magnet to the allowed flux density of the consequence pole.

98. The apparatus of claim 96 wherein the magnets have a flux density of at least on the order five kilogauss.

99. The apparatus of claim 96 wherein the distance separating the magnets from the consequence poles is greater than the predetermined gap distance separating the rotor surface from the stator.

100. The apparatus of claim 96 wherein the distance separating the magnets from the consequence poles is at least five times greater than the predetermined gap distance separating the rotor surface from the stator.

101. The apparatus of claim 50 wherein the apparatus provides a predetermined power output, and the ratio of the power output to the weight of the rotor is greater than 150 watts per pound.

102. The apparatus of claim 50 wherein the apparatus provides a predetermined power output, and the ratio of the power output to the weight of the rotor is greater than 200 watts per pound.

103. The apparatus of claim 50 wherein the apparatus provides a predetermined power output, and the ratio of the power output to the weight of the rotor is greater than 500 watts per pound.

104. The apparatus of claim 50 wherein the apparatus provides a predetermined power output, and the ratio of the power output to the weight of the rotor is greater than 700 watts per pound.

105. The apparatus of claim 50 wherein the apparatus provides a predetermined power output, and the ratio of the power output to the weight of the rotor is greater than 800 watts per pound.

106. The apparatus of claim 50 wherein:

the rotor has a predetermined number of poles; and the stator includes a soft magnet core having a crenelated inner periphery with a predetermined number of equally spaced teeth and slots, equal to a predetermined multiple of the number of rotor poles times the number of phases, with a predetermined number of said independent groups of windings wound through the slots about predetermined numbers of the teeth.

107. The apparatus of claim 86 wherein:

the rotor has a predetermined number of poles; and the stator includes a soft magnet core having a crenelated inner periphery with a predetermined number of equally spaced teeth and slots, equal to a predetermined multiple of the number of rotor poles times the number of phases, with a predetermined number of said independent groups of windings wound through the slots about predetermined numbers of the teeth.

108. The apparatus of claim 106 wherein the number of slots is equal to the number of rotor poles times the number of phases.

109. The apparatus of claim 106 wherein the apparatus has 3 phases, the rotor has 12 poles, and the stator core includes at least 36 slots.

110. The apparatus of claim 106 wherein the predetermined number of independent groups of windings is an integer fraction of the number of rotor poles.

111. The apparatus of claim 106 wherein the apparatus has 3 phases, the windings of the groups comprise respective phase windings connected together at one end in a star configuration, and the winding corresponding to each phase is wound about a predetermined number of teeth corresponding to a rotor pole, with each successive phase winding shifted by one slot, and wound in the opposite direction from the preceding phase winding.

112. The apparatus of claim 106 wherein the apparatus further comprises at least one sensor for generating indicia of a control parameter, and wherein the control circuit, responsive to said indicia, generates control signals to the switching circuit to vary the number of individual groups of stator windings with current paths to the output terminals in accordance with the control parameter.

113. A system for generating an electrical output signal responsive to a wide range of input rotational drive speeds, the system comprising:

a rotor, adapted for selective rotation responsive to the input drive;

a stator, including a plurality of groups of stator windings disposed such that rotation of the rotor induces current in the stator windings, each of the plurality of groups of windings being substantially magnetically independent from the other groups of windings;

respective regulators, one associated with each winding group, the regulators including a respective switching device, responsive to control signals applied thereto, associated with each phase, a predetermined number of said regulators being connected in series;

a first sensor for generating a signal indicative of a predetermined system parameter; and a controller, responsive to the signals indicative of output voltage, and indicia of phase, for generating control signals to the regulator switching devices to effectively connect and disconnect respective windings in the operative circuit and adjust the relative firing angles of the regulators to control output voltage.

114. The system of claim 113, further including:

a predetermined number of regulators connected in parallel with said series connected regulators; and a second sensor for generating a signal indicative of output current level;

the controller, responsive to the signals indicative of output current, generating control signals to the 3-phase regulator switching devices to effectively connect and disconnect respective windings in the operative circuit to control output current.

115. The system of claim 113, further including: a power converter, cooperating with at least one of said regulators, for generating an AC signal.

116. The system of claim 113, further including:

AC output terminals; and means, responsive to control signals applied thereto, for selectively effecting and disabling connections between the output of at least one of said regulators and said AC output terminals to create a predetermined wave form simulating the desired AC signal.

117. The system of claim 115 wherein said regulators provide at least a positive and a common DC rail, and the power converter comprises:

first and second converter output terminals;

a first power switch circuit, electrically connected to the positive DC rail, and to the first converter output terminal, disposed to, responsive to control signals applied thereto, selectively effect a current path between the positive DC rail and the first converter output terminal; and a second power switch circuit, electrically connected to the positive DC rail, and to the second converter output terminal, disposed to, responsive to control signals applied thereto, selectively effect a current path between the positive DC rail, and the second converter output terminal;

a third power switch circuit, electrically connected to the common DC rail, and to the first converter output terminal, disposed to, responsive to control signals applied thereto, selectively effect a current path between the common DC rail and the first converter output terminal; and a fourth power switch circuit, electrically connected to the common DC rail, and to the second converter output terminal, disposed to, responsive to control signals applied thereto, selectively effect a current path between the common DC rail and the second converter output terminal.

118. The system of claim 117 wherein the first and second power switch circuits are isolated power switch circuits and the third and fourth power switch circuits are non-isolated power switch circuits.

119. The system of claim 117 wherein each power switch circuit comprises a power switching device and a firing circuit for turning the power switching device on and off in accordance with the control signals.

120. The system of claim 119 wherein the power switching device is a power transistor.

121. The system of claim 119 wherein the firing circuits for the first and second power switch circuits comprise means for quickly driving the associated power switching device into a saturated state when the associated control signal changes state to minimize power dissipation during the switching interval.

122. The system of claim 113, further including:

a single phase control winding disposed on the stator, physically wound with one of the phases of a winding group; and a zero crossing detector, for generating a signal indicative of zero crossings in the signal induced in the control winding for use as the indicia of phase to the controller.

123. The system of claim 122 further including a single phase regulator, cooperating with the control winding.

124. The system of claim 122 further including a single phase regulator, cooperating with the control winding, the single phase regulator including a switching device, responsive to control signals applied thereto, for adjusting the relative firing angle of the single phase regulator to control the output voltage thereof.

125. The system of claim 124 wherein the input rotational drive speed ranges from a predetermined minimum operational value to a predetermined maximum operational value, and the control winding is configured to generate, at the minimum operational value, and with the firing angle of the single phase regulator at a predetermined maximum value, a DC output signal having predetermined voltage and current levels.

126. The system of claim 125 wherein the predetermined minimum operational input rotational drive speed value equals the input drive idle speed.

127. The system of claim 123 further including at least one regulator device cooperating with the single phase regulator to provide a stable regulated DC outputs at a designated level.

128. The system of claim 113, wherein the input rotational drive speed ranges from a predetermined minimum operational value to a predetermined maximum operational value, and:

the windings are configured such that, at the minimum operational value, with a first predetermined number of winding groups connected in the operative circuit, and firing angles of the respective phases of the regulator at a predetermined maximum value, a DC output signal having predetermined voltage and current levels is generated thereby.

129. The system of claim 128, wherein the first predetermined number of winding groups connected in the operative circuit is all of the winding groups, and the predetermined maximum firing angle value is full on.

130. The system of claim 128 wherein the predetermined minimum operational input rotational drive speed value equals the input drive idle speed.

131. The system of claim 113, further including:

at least one further group of stator windings, disposed on the stator such that rotation of the rotor induces current in the stator windings;

a further regulator, associated with the further winding group;

respective converter output terminals; and a power converter, responsive to signals from the controller, for selectively applying the output of the further regulator to the converter output terminals to generate an output signal with a predetermined waveform.

132. The system of claim 131 wherein said regulators provide at least a positive and a common DC rail, and the power converter comprises:

first and second converter output terminals;

a first power switch circuit, electrically connected to the positive DC rail, and to the first converter output terminal, disposed to, responsive to control signals applied thereto, selectively effect a current path between the positive DC rail and the first converter output terminal; and a second power switch circuit, electrically connected to the positive DC rail, and to the second converter output terminal, disposed to, responsive to control signals applied thereto, selectively effect a current path between the positive DC rail, and the second converter output terminal;

a third power switch circuit, electrically connected to the common DC rail, and to the first converter output terminal, disposed to, responsive to control signals applied thereto, selectively effect a current path between the common DC rail and the first converter output terminal; and a fourth power switch circuit, electrically connected to the common DC rail, and to the second converter output terminal, disposed to, responsive to control signals applied thereto, selectively effect a current path between the common DC rail and the second converter output terminal.

133. The system of claim 132 wherein the first and second power switch circuits are isolated power switch circuits and the third and fourth power switch circuits are non-isolated power switch circuits.

134. The system of claim 132 wherein each power switch circuit comprises a power switching device and a firing circuit for turning the power switching device on and off in accordance with the control signals.

135. The system of claim 134 wherein the firing circuits for the first and second power switch circuits comprise means for quickly driving the associated power switching device into a saturated state when the associated control signal changes state to minimize power dissipation during the switching interval.

136. The system of claim 134 wherein the power switching device is a power transistor.

137. The system of claim 113, further including:

a further plurality of groups of stator windings, disposed on the stator such that rotation of the rotor induces current in the stator windings; the further plurality of groups of windings being substantially magnetically independent from each other;

a further set of regulators, one associated with each of the further plurality of winding groups, the regulators including a respective switching device, responsive to control signals applied thereto, associated with each phase;

the further set of regulators being electrically interconnected to provide an inverter DC rail signal;

an inverter, responsive to the inverter DC rail signal and control signals applied thereto, for generating an AC output signal;

a first sensor for generating a signal indicative of AC output voltage;

the controller, responsive to the signals indicative of AC output voltage, and indicia of rotor cycle phase, generating control signals to the regulator switching devices to effectively connect and disconnect respective windings in the operative circuit and adjust the relative firing angles of the respective phases of the further set of regulators to control the inverter DC rail signal voltage;

the controller, responsive to indicia of AC output phase, further generating the control signals to the inverter.

138. The apparatus of claim 50, wherein the switching circuit comprises at least one controlled rectifier, and the apparatus further includes: a power converter, cooperating with said controlled rectifier, for generating an AC signal.

139. The apparatus of claim 50, wherein the switching circuit comprises means for generating a DC signal between first and second DC rails, and the apparatus further includes:

AC output terminals; and means, responsive to control signals applied thereto, for selectively effecting and disabling connections between the first and second DC rails and said AC output terminals to create a predetermined waveform simulating a desired AC signal.

140. The apparatus of claim 138 wherein the switching circuit comprises means for generating a DC signal between a first and a second DC rail, and the power converter comprises:

first and second converter output terminals;

a first power switch circuit, electrically connected to the positive DC rail, and to the first converter output terminal, disposed to, responsive to control signals applied thereto, selectively effect a current path between the positive DC rail and the first converter output terminal; and a second power switch circuit, electrically connected to the positive DC rail, and to the second converter output terminal, disposed to, responsive to control signals applied thereto, selectively effect a current path between the positive DC rail, and the second converter output terminal;

a third power switch circuit, electrically connected to the common DC rail, and to the first converter output terminal, disposed to, responsive to control signals applied thereto, selectively effect a current path between the common DC rail and the first converter output terminal: and a fourth power switch circuit, electrically connected to the common DC rail, and to the second converter output terminal, disposed to, responsive to control signals applied thereto, selectively effect a current path between the common DC rail and the second converter output terminal.

141. The apparatus of claim 140 wherein the first and second power switch circuits are isolated power switch circuits and the third and fourth power switch circuits are non-isolated power switch circuits.

142. The apparatus of claim 140 wherein each power switch circuit comprises a power switching device and a firing circuit for turning the power switching device on and off in accordance with the control signals.

143. The apparatus of claim 142 wherein the power switching device is a power transistor.

144. The apparatus of claim 142 wherein the firing circuits for the first and second power switch circuits comprise means for quickly driving the associated power transistor into a saturated state when the associated control signal changes state to minimize power dissipation during the switching interval.

145. The apparatus of claim 140 wherein the controller comprises a microprocessor and further generates the control signals to the power switch circuits.

146. The apparatus of claim 50, wherein the switching circuit comprises means for generating an intermediate DC rail signal between an intermediate DC rail and a common rail, and a high DC rail signal between a high DC rail and the common rail, and the apparatus further includes:

AC output terminals; and means, responsive to control signals applied thereto, for selectively effecting and disabling connections between the intermediate and common DC rails and said AC output terminals, and between the high and common DC rails and said AC output terminals, to create a predetermined waveform simulating a desired AC signal.

147. The apparatus of claim 146 wherein the power converter comprises:

first and second converter output terminals;

a juncture node, receptive of the intermediate DC rail signal;

a first power switch circuit, electrically connected to the juncture node, and to the first converter output terminal, disposed to, responsive to control signals applied thereto, selectively effect a current path between the juncture node and the first converter output terminal; and a second power switch circuit, electrically connected to the juncture node, and to the second converter output terminal, disposed to, responsive to control signals applied thereto, selectively effect a current path between the juncture node, and the second converter output terminal;

a third power switch circuit, electrically connected to the juncture node, and to the high DC rail, disposed to, responsive to control signals applied thereto, selectively effect a current path between the high DC rail and the juncture node;

a fourth power switch circuit, electrically connected to the common DC rail, and to the first converter output terminal, disposed to, responsive to control signals applied thereto, selectively effect a current path between the common DC rail and the first converter output terminal; and a fifth power switch circuit, electrically connected to the common DC rail, and to the second converter output terminal, disposed to, responsive to control signals applied thereto, selectively effect a current path between the common DC rail and the second converter output terminal.

148. The system of claim 113 wherein the controller comprises:

a microcomputer;

at least one output register having a respective bit corresponding to each of the switching devices of said regulators, the register being selectively receptive of input signals from the microcomputer; and an output latch corresponding to each output register, responsive to control signals from said microcomputer and selectively receptive of indicia of the contents of the output register, providing control signals to the switching devices of said regulators.

149. The system of claim 148 wherein:

the output register is a serial-input-parallel-output register;

the microcomputer provides a bit pattern corresponding to the desired states of the switching devices as serial data, and a load command signal to the output register.

150. The system of claim 148 wherein:

the system includes a plurality of serial-input-parallel-output registers having respective bits corresponding to an associated group of the switching devices; and the microcomputer provides a serial bit pattern, corresponding to the desired states of a group of switching devices, applied as data inputs to all of the output registers;

serial data clock signals, selectively provided synchronously with the serial data, the serial data clock signals being to a selected one of the output registers to select, and load the data into, the such register; and a latch control signal, applied to each of the output registers, subsequent to the serial bit pattern data, to load the accumulated pattern into a corresponding output latch, and hence, apply the bit pattern as control signals to designated switching devices.

* * * * *